(12) United States Patent
Oh et al.

(10) Patent No.: US 11,565,722 B2
(45) Date of Patent: Jan. 31, 2023

(54) VEHICLE TRAJECTORY PREDICTION NEAR OR AT TRAFFIC SIGNAL

(71) Applicant: The Regents of the University of Michigan, Ann Arbor, MI (US)

(72) Inventors: Geunseob Oh, Ann Arbor, MI (US); Huei Peng, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 190 days.

(21) Appl. No.: 17/150,690

(22) Filed: Jan. 15, 2021

(65) Prior Publication Data
US 2021/0276594 A1     Sep. 9, 2021

Related U.S. Application Data

(60) Provisional application No. 62/961,425, filed on Jan. 15, 2020.

(51) Int. Cl.
*B60W 60/00*     (2020.01)
*B60W 40/04*     (2006.01)
(Continued)

(52) U.S. Cl.
CPC ........ *B60W 60/0027* (2020.02); *B60W 40/04* (2013.01); *G06N 3/08* (2013.01);
(Continued)

(58) Field of Classification Search
CPC ............ B60W 60/0027; B60W 40/04; B60W 2554/4042; B60W 2556/65;
(Continued)

(56) References Cited

U.S. PATENT DOCUMENTS

2021/0064057 A1* 3/2021 Eldar .................. G05D 1/0287
2021/0171040 A1* 6/2021 Grubwinkler ... B60W 30/18109
(Continued)

FOREIGN PATENT DOCUMENTS

CN     110880239 A  * 12/2019  ............... G08G 1/01

OTHER PUBLICATIONS

Buhet, "Conditional Vehicle Trajectories Prediction in CARLA Urban Environment", 2019 (Year: 2019).*

*Primary Examiner* — Elaine Gort
*Assistant Examiner* — Brittany Renee Peko
(74) *Attorney, Agent, or Firm* — Reising Ethington P.C.

(57) ABSTRACT

A system and method for determining a predicted trajectory of a human-driven host vehicle as the human-driven host vehicle approaches a traffic signal. The method includes: obtaining a host vehicle-traffic light distance $d_x$ and a longitudinal host vehicle speed $v_x$ that are each taken when the human-driven host vehicle approaches the traffic signal; obtaining a traffic light signal phase $P_t$ and an traffic light signal timing $T_t$; obtaining a time of day TOD; providing the host vehicle-traffic light distance $d_x$, the longitudinal host vehicle speed $v_x$, the traffic light signal phase $P_t$, the traffic light signal timing $T_t$, and the time of day TOD as input into an artificial intelligence (AI) vehicle trajectory prediction application, wherein the AI vehicle trajectory prediction application implements an AI vehicle trajectory prediction model; and determining the predicted trajectory of the human-driven host vehicle using the AI vehicle trajectory prediction application.

20 Claims, 29 Drawing Sheets

(51) Int. Cl.
*G06N 3/08* (2006.01)
*H04W 4/46* (2018.01)
*H04W 4/44* (2018.01)

(52) U.S. Cl.
CPC ............... *H04W 4/44* (2018.02); *H04W 4/46* (2018.02); *B60W 2554/4042* (2020.02); *B60W 2554/4045* (2020.02); *B60W 2554/80* (2020.02); *B60W 2556/65* (2020.02)

(58) Field of Classification Search
CPC ..... B60W 2554/80; B60W 2554/4045; H04W 4/46; H04W 4/44; G06N 3/08
See application file for complete search history.

(56) References Cited

U.S. PATENT DOCUMENTS

| | | | |
|---|---|---|---|
| 2021/0174669 A1* | 6/2021 | Guan | G08G 1/0133 |
| 2021/0248904 A1* | 8/2021 | Nguyen | G08G 1/08 |
| 2022/0076037 A1* | 3/2022 | Hochman | G06K 9/00825 |
| 2022/0153273 A1* | 5/2022 | Metli | B60W 30/18154 |

* cited by examiner

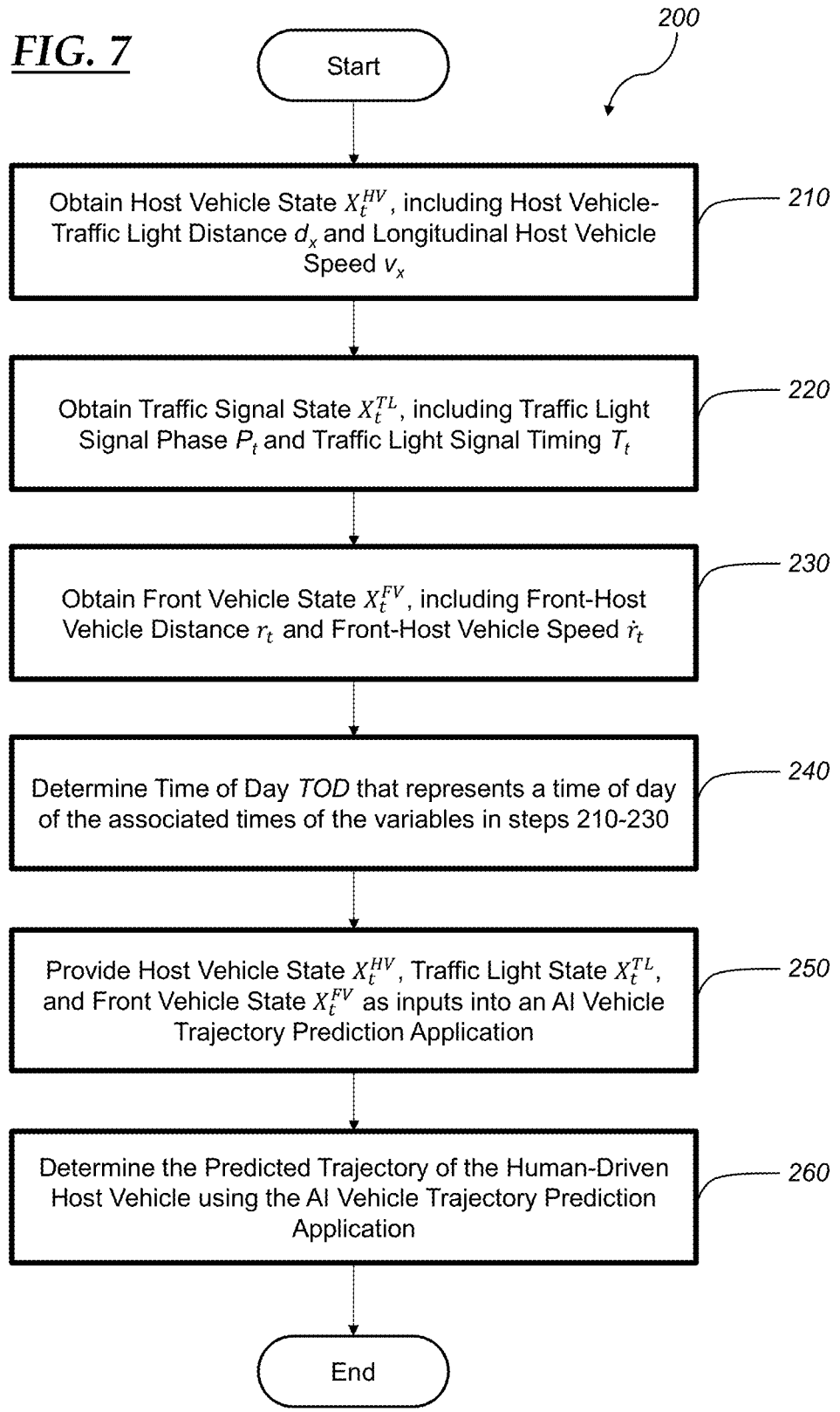

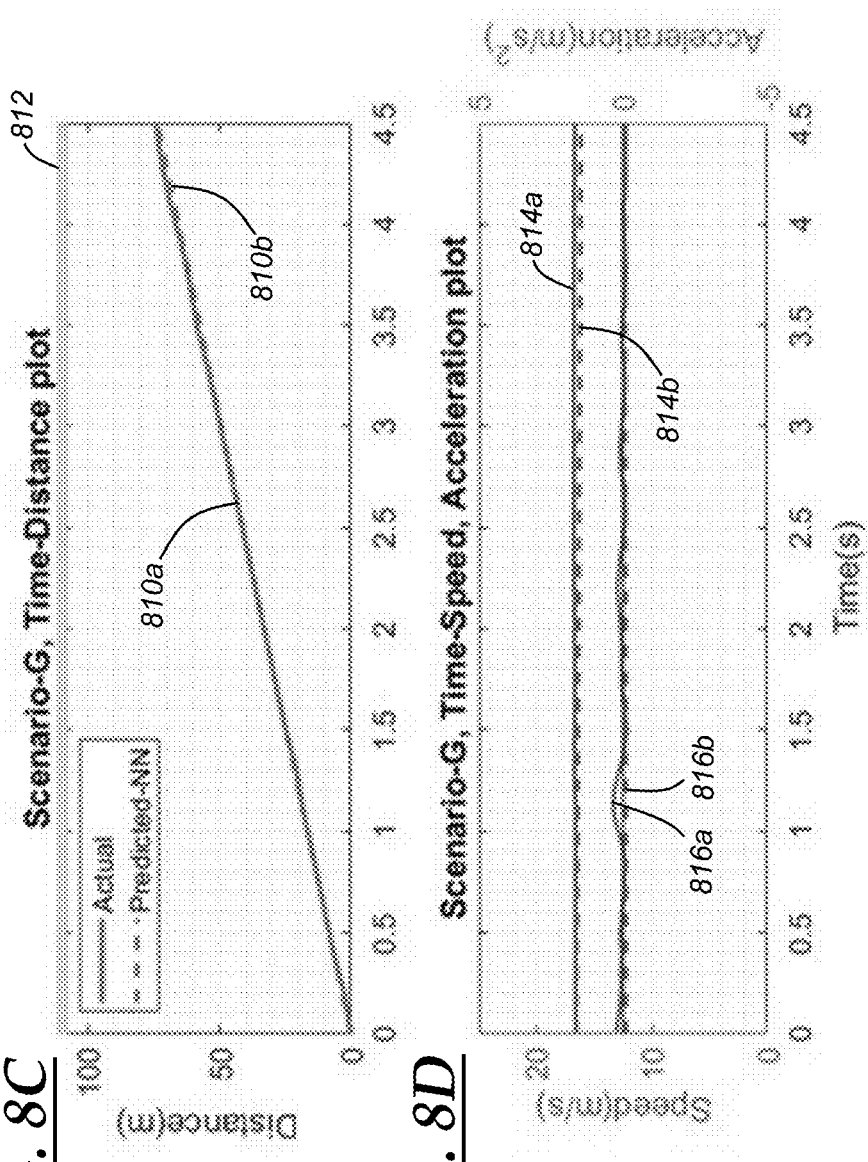

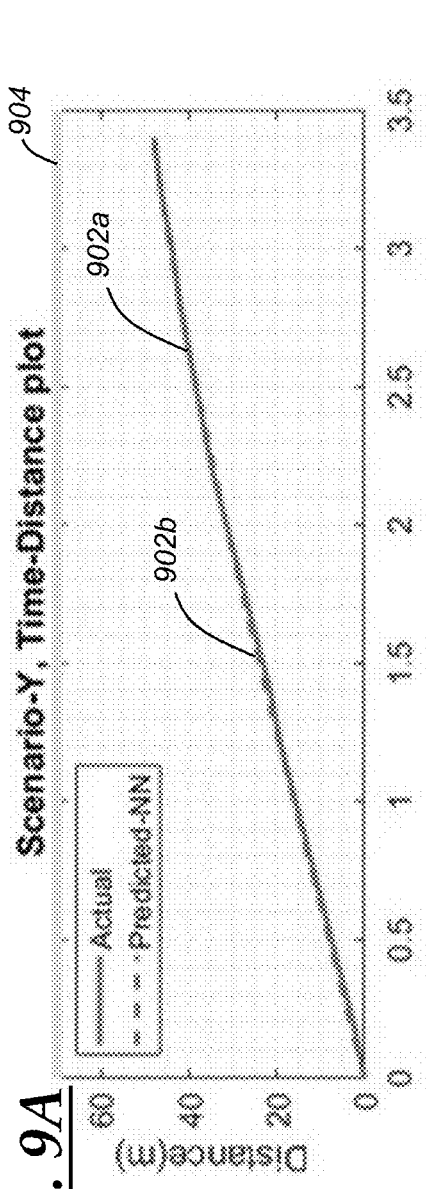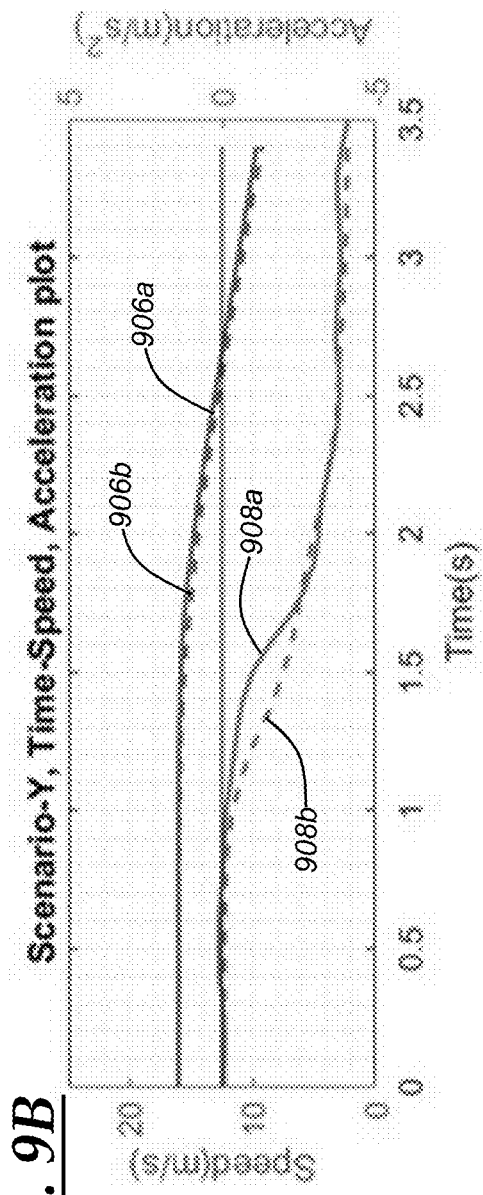
FIG. 9A
FIG. 9B

FIG. 26

TABLE I

| Scenario | MAE(m) | | | TWAE(m) | | | ADN(m) | | |
|---|---|---|---|---|---|---|---|---|---|
| | All | NoFV | NoTL | NoFVTL | All | NoFV | NoTL | NoFVTL | All | NoFV | NoTL | NoFVTL |
| G | 1.18 | 0.78 | 1.35 | 1.19 | 1.86 | 1.21 | 2.16 | 1.78 | 3.28 | 2.34 | 4.47 | 3.51 |
| R | 0.16 | 0.15 | 0.38 | 1.79 | 0.21 | 0.20 | 0.56 | 2.98 | 0.31 | 0.28 | 0.88 | 6.74 |
| GY | 0.53 | 0.41 | 1.26 | 0.82 | 0.77 | 0.54 | 2.06 | 1.31 | 1.24 | 0.84 | 5.01 | 2.59 |
| YR | 1.18 | 0.69 | 0.86 | 1.01 | 1.60 | 0.93 | 1.32 | 1.42 | 2.00 | 1.27 | 1.98 | 2.29 |
| RG | 0.17 | 0.14 | 0.22 | 2.28 | 0.24 | 0.19 | 0.31 | 3.80 | 0.36 | 0.28 | 0.50 | 8.53 |
| GYR | 0.445 | 0.445 | 4.11 | 32.40 | 0.567 | 0.568 | 6.82 | 51.16 | 0.694 | 0.694 | 14.65 | 104.81 |

FIG. 27

TABLE II

| Scenario | MAE(m/s) | | | TWAE(m/s) | | | ADN(m/s) | | |
|---|---|---|---|---|---|---|---|---|---|
| | All | NoFV | NoTL | NoFVTL | All | NoFV | NoTL | NoFVTL | All | NoFV | NoTL | NoFVTL |
| G | 0.70 | 0.46 | 0.97 | 0.75 | 1.02 | 0.65 | 1.41 | 1.07 | 1.48 | 0.94 | 2.28 | 1.51 |
| R | 0.005 | 0.005 | 0.17 | 1.44 | 0.007 | 0.006 | 0.22 | 2.29 | 0.010 | 0.009 | 0.59 | 4.10 |
| GY | 0.39 | 0.15 | 1.11 | 0.53 | 0.54 | 0.20 | 1.78 | 0.79 | 0.87 | 0.27 | 3.08 | 1.21 |
| YR | 0.367 | 0.374 | 0.53 | 1.01 | 0.47 | 0.52 | 0.71 | 1.42 | 0.59 | 0.69 | 0.89 | 2.29 |
| RG | 0.007 | 0.005 | 0.10 | 1.68 | 0.010 | 0.007 | 0.14 | 2.63 | 0.02 | 0.01 | 0.22 | 4.52 |
| GYR | 0.015 | 0.014 | 1.26 | 6.78 | 0.018 | 0.020 | 1.86 | 9.80 | 0.030 | 0.029 | 2.60 | 14.13 |

VEHICLE TRAJECTORY PREDICTION NEAR OR AT TRAFFIC SIGNAL

STATEMENT REGARDING FEDERALLY SPONSORED RESEARCH

This invention was made with government support under DE-EE0007212 awarded by the U.S. Department of Energy. The government has certain rights in the invention.

TECHNICAL FIELD

This invention relates to methods and systems for determining a predicted trajectory of a human-driven vehicle as the vehicle approaches and/or departs from a traffic signal.

BACKGROUND

Autonomous driving has been more successful on highway roads than on urban city roads mainly due to the simplicity of the highway's driving environment, including the absence of traffic signals and pedestrians. Realizing fully autonomous vehicles in urban driving environments is more challenging due to the opposite reasons, such as the existence of traffic signals, frequent interactions with human-driven vehicles, and the presence of pedestrians. One of the major differences between urban city driving and highway driving is the presence of traffic lights. In urban driving, especially in the vicinity of traffic lights exemplified by signalized corridors or intersections, the motions of vehicles are mainly governed by traffic signals. People drive in such a manner so as to obey the traffic signals and properly respond to implicit rules imposed by traffic lights. Examples of the implicit traffic rules include stopping before a traffic light that is in a RED phase, and maintaining a proper speed when approaching a traffic light that is in a GREEN phase and when there is no traffic causing the vehicle to slow down (i.e., a free-flow situation).

SUMMARY

It has been discovered that it is important to predict how human drivers respond to traffic signals for purposes of successfully carrying out and/or improving autonomous driving in areas having traffic signals (e.g., traffic lights). If trajectories of surrounding human-driven vehicles can be predicted, then these predictions can be leveraged and used in decision-making, trajectory planning, and control synthesis of an autonomous vehicle (AV), as well as for various other uses. In light of this, there is provided herein a system and method of predicting a trajectory of a human-driven vehicle as it approaches or is near a traffic signal, where the prediction is determined through use of an artificial intelligence (AI) vehicle trajectory prediction model. The AI vehicle trajectory prediction model is generated or composed in light of two observations: (1) behaviors of human-driven vehicles near traffic lights are mainly governed by traffic signals; and (2) the phase and timing of traffic signals can be shared (or otherwise made available) through vehicle-to-infrastructure (V2I) communications ahead of time. Thus, the AI vehicle trajectory prediction model maps states of human-driven vehicles and a corresponding state of a traffic signal (e.g., signal time and phasing (SPaT) information of the traffic signal) to trajectories of the vehicles, which each can be represented by a longitudinal acceleration of the vehicle.

In accordance with an aspect of the invention, there is provided a method for determining a predicted trajectory of a human-driven host vehicle as the human-driven host vehicle approaches a traffic signal, wherein the method is carried out by one or more electronic controllers. The method includes: obtaining a host vehicle-traffic light distance $d_x$ and a longitudinal host vehicle speed $v_x$ that are each taken when the human-driven host vehicle approaches the traffic signal; obtaining a traffic light signal phase $P_t$ and a traffic light signal timing $T_t$, wherein the traffic light signal phase $P_t$ represents a phase of the traffic signal taken when the human-driven host vehicle approaches the traffic signal, and wherein the traffic light signal timing $T_t$ represents an amount of time elapsed since a last phase change of the traffic signal taken when the human-driven host vehicle approaches the traffic signal; obtaining a time of day TOD; providing the host vehicle-traffic light distance $d_x$, the longitudinal host vehicle speed $v_x$, the traffic light signal phase $P_t$, the traffic light signal timing $T_t$, and the time of day TOD as input into an artificial intelligence (AI) vehicle trajectory prediction application, wherein the AI vehicle trajectory prediction application implements an AI vehicle trajectory prediction model; and determining the predicted trajectory of the human-driven host vehicle using the AI vehicle trajectory prediction application.

In various embodiments, the method may include any of the following features or any technically-feasible combination of two or more of these features:
- the method further includes obtaining a front vehicle state $X^{FV}$, wherein the front vehicle state includes a front-host vehicle distance $r_t$ and a front-host vehicle speed $\dot{r}_t$, and wherein the providing step further includes providing the front vehicle state $X^{FV}$ as input into the AI vehicle trajectory prediction application;
- the front vehicle state $X^{FV}$ is obtained at the one or more electronic controllers based on front vehicle base information that is obtained at the front vehicle and then sent via vehicle-to-vehicle (V2V) communications to the one or more electronic controllers;
- the traffic light signal phase $P_t$ and the traffic light signal timing $T_t$ are obtained from a traffic light control system that is present at an intersection where the traffic light is located;
- the predicted trajectory is obtained at an autonomous vehicle that is approaching the traffic light and that is separate from the human-driven host vehicle;
- the method is carried out at the autonomous vehicle as the human-driven host vehicle approaches the traffic light;
- the autonomous vehicle obtains the traffic light signal phase $P_t$ and the traffic light signal timing $T_t$ from a traffic signal system located at an intersection where the traffic light is located;
- the autonomous vehicle receives the traffic light signal phase $P_t$ and the traffic light signal timing $T_t$ via vehicle-to-infrastructure (V2I) communications from roadside equipment that is a part of the traffic signal system;
- the autonomous vehicle receives the traffic light signal phase $P_t$ and the traffic light signal timing $T_t$ from a traffic signaling control system that is located remotely from the traffic light;
- the host vehicle-traffic light distance $d_x$, the longitudinal host vehicle speed $v_x$ are obtained at the autonomous vehicle via V2V communications with the host vehicle;
- the vehicle-traffic light distance $d_x$, the longitudinal host vehicle speed $v_x$, the traffic light signal phase $P_t$, and the traffic light signal timing $T_t$ are each associated with an associated time that is no more than a predetermined amount different than another one of the associated times;

the AI vehicle trajectory prediction model is or includes a neural network;

the AI vehicle trajectory prediction model is a deterministic or a model that predicts one or more most-probable trajectories;

the AI vehicle trajectory prediction model is a probabilistic model that returns a probability distribution of predicted trajectories, and wherein the predicted trajectory is obtained by sampling a trajectory from the probability distribution of predicted trajectories;

the neural network is a mixture density network;

the neural network is a deep neural network; and/or the method further includes the step of causing an autonomous vehicle to obtain the predicted trajectory of the human-driven vehicle, wherein the autonomous vehicle is configured to: obtain the predicted trajectory of the human-driven vehicle, and carry out an autonomous vehicle operation based on the predicted trajectory of the human-driven vehicle.

In accordance with another aspect of the invention, there is provided a method for determining a predicted trajectory of a human-driven host vehicle as the human-driven host vehicle approaches a traffic signal, wherein the method is carried out by one or more electronic controllers. The method includes: obtaining a host vehicle-traffic light distance $d_x$ and a longitudinal host vehicle speed $v_x$ that are each taken when the human-driven host vehicle approaches the traffic signal, wherein the host vehicle-traffic light distance $d_x$ and the longitudinal host vehicle speed $v_x$ each have an associated time; obtaining a front vehicle state $X^{FV}$, wherein the front vehicle state includes a front-host vehicle distance $r_t$ and a front-host vehicle speed $\dot{r}_t$; receiving one or more wireless signals that indicate a traffic light signal phase $P_t$ and an traffic light signal timing $T_t$, wherein the traffic light signal phase $P_t$ represents a phase of the traffic signal taken when the human-driven host vehicle approaches the traffic signal, and wherein the traffic light signal timing $T_t$ represents an amount of time elapsed since a last phase change of the traffic signal taken when the human-driven host vehicle approaches the traffic signal, wherein the traffic light signal phase $P_t$ and the traffic light signal timing $T_t$ each have an associated time, wherein the associated times of the host vehicle-traffic light distance $d_x$, the longitudinal host vehicle speed $v_x$, the traffic light signal phase $P_t$, the traffic light signal timing $T_t$, the front vehicle state includes a front-host vehicle distance $r_t$, and the front-host vehicle speed $\dot{r}_t$ are within a maximum allowable time difference with respect to one another; obtaining a time of day TOD; providing the host vehicle-traffic light distance $d_x$, the longitudinal host vehicle speed $v_x$, the traffic light signal phase $P_t$, the traffic light signal timing $T_t$, the front vehicle state $X^{FV}$, and the time of day TOD as input into an artificial intelligence (AI) vehicle trajectory prediction application, wherein the AI vehicle trajectory prediction application implements an AI vehicle trajectory prediction model, and wherein the AI vehicle trajectory prediction model is or includes a neural network; and determining the predicted trajectory of the human-driven host vehicle using the AI vehicle trajectory prediction application.

In various embodiments, the method of the preceding paragraph may include any of the following features or any technically-feasible combination of two or more of these features:

the host vehicle-traffic light distance $d_x$ and the longitudinal host vehicle speed $v_x$ are both obtained at an autonomous vehicle through receiving one or more wireless signals from the human-driven host vehicle via vehicle-to-vehicle (V2V) communications; and/or the host vehicle-traffic light distance $d_x$ and the longitudinal host vehicle speed $v_x$ are both obtained at the autonomous vehicle through receiving one or more wireless signals from a remote server.

BRIEF DESCRIPTION OF THE DRAWINGS

Preferred exemplary embodiments will hereinafter be described in conjunction with the appended drawings, wherein like designations denote like elements, and wherein:

FIG. 7 depicts a flowchart of an embodiment of a method for determining a predicted trajectory of a human-driven vehicle as the human-driven vehicle approaches and/or departs from a traffic signal;

FIGS. 8A-8D depict predicted and actual trajectories of the deterministic model for a G scenario according to two samples;

FIGS. 9A-9D depict predicted and actual trajectories of the deterministic model for a Y scenario according to two samples;

FIG. 26 depicts a graph illustrating the evaluation results on position errors that resulted from using the various models used to predict the trajectory according to six (6) scenarios;

FIG. 27 depicts a graph illustrating the evaluation results on speed errors that resulted from using the various models used to predict the trajectory according to six (6) scenarios.

DETAILED DESCRIPTION

Figure 1A:
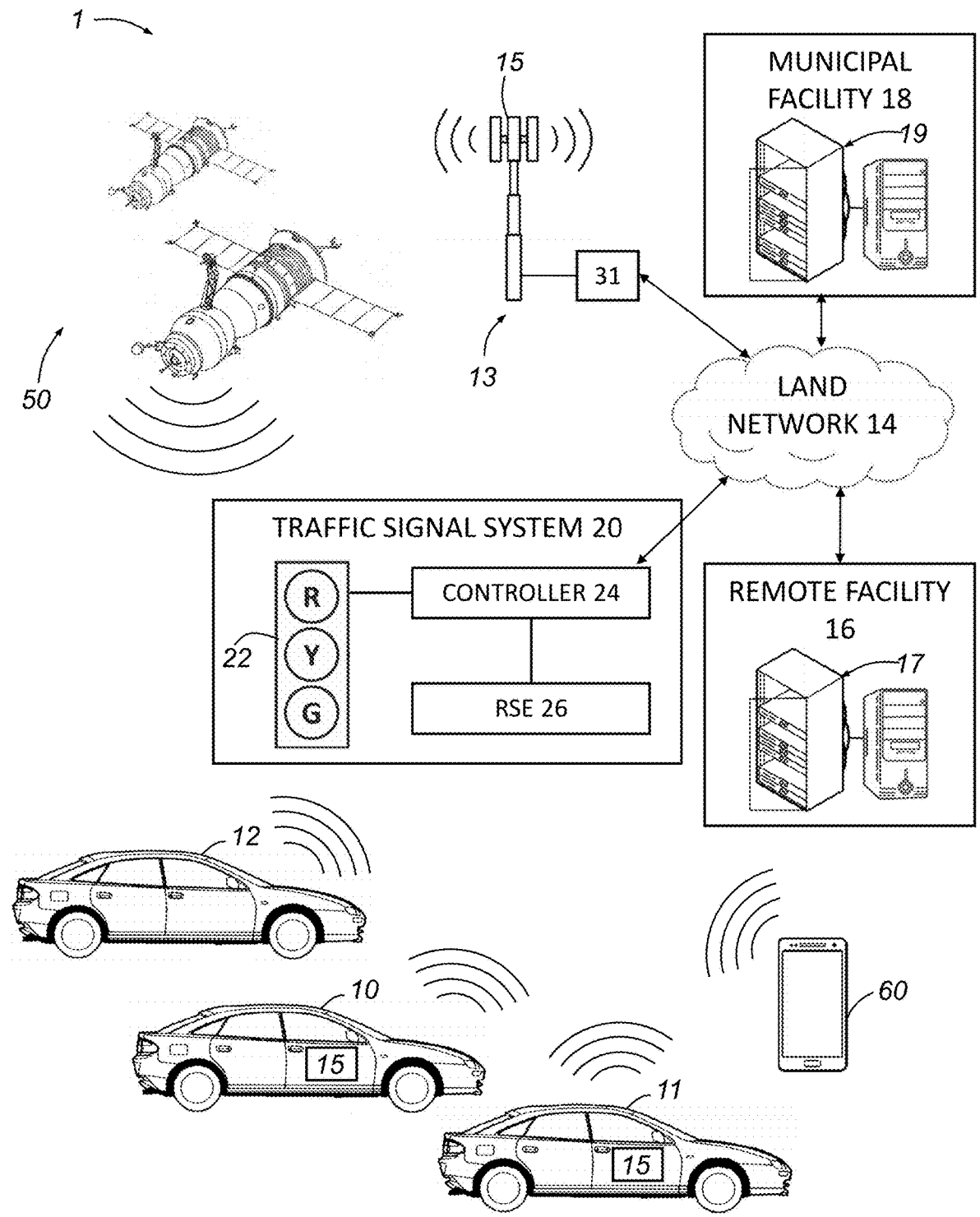
FIGS. 1A-1B depict a communications system that includes a computer-based system and operating environment that can be used for carrying out a method for obtaining a predicted trajectory of a human-driven vehicle as the human-driven vehicle approaches and/or departs from a traffic signal.

The system and method described herein enables a trajectory of a human-driven vehicle to be predicted as the vehicle is approaching a traffic signal. As used herein, a human-driven vehicle is a vehicle whose propulsion and/or steering is at least partially manually controlled by a human driver. Thus, at least according to some embodiments, the method and/or system can utilize information from vehicle-to-infrastructure (V2I) communications (including information from roadside equipment (RSE), connected vehicles (CVs) (including the human-driven vehicle in some embodiments), and/or other devices/systems) to model the driving behavior of human drivers near traffic signals, which can then be used to predict a trajectory of a human-driven host vehicle that is approaching (or departing from) or near a traffic signal. At least according to some embodiments, the predicted trajectory can be used by an autonomous vehicle (AV) that is not the same vehicle as (or separate from) the human-driven host vehicle. The predicted trajectory can be represented by a predicted vehicle acceleration a, which can include both a predicted magnitude and a predicted direction of the acceleration of the human-driven host vehicle. The term "host vehicle" as used herein refers to the vehicle whose trajectory is being predicted. In some embodiments, the acceleration that represents the predicted trajectory can be a longitudinal acceleration $a_x$, which is defined as the acceleration of the vehicle along a direction that is parallel to the road on which the vehicle is traveling as it approaches the traffic signal—this direction is referred to herein as the longitudinal direction. Other trajectory information can be derived from this predicted acceleration (such as when it is used in conjunction with other information). This other trajectory information can include a vehicle speed or velocity (e.g., a longitudinal speed or longitudinal velocity) as the host vehicle travels approaches and/or travels through the traffic signal. In at least some embodiment, the predicted trajectory is predicted by using a human policy model that maps a state of the human-driven host-vehicle vehicle ($X^{HV}$) and a state of a traffic signal ($X^{TL}$) to an acceleration ($a^{HV}$) (or other trajectory information) of the host vehicle. In one embodiment, the predicted trajectory (X) is predicted by using a human policy model ($f_d$ for the deterministic policy, $f_p$ for the probabilistic policy) that maps the host-vehicle vehicle state ($X^{HV}$), the traffic signal state ($X^{TL}$), and a state of a front vehicle ($X^{FV}$) to an acceleration ($a^{HV}$) (or other trajectory information) of the host vehicle. In at least one embodiment, the front vehicle state ($X^{FV}$) is not taken into consideration as a part of the trajectory prediction, and the human policy model in such embodiments is denoted $f_d^{NoFV}$ for the deterministic policy and $f_p^{NoFV}$ for the probabilistic policy (and simply $f^{NoFV}$ in general, which may refer to both). The human policy models that perform this mapping can be composed and/or carried out using an artificial intelligence (AI) technique or mechanism (e.g., neural networks) and, thus, is referred to as an AI vehicle trajectory prediction model. As used herein, "host vehicle" refers to the vehicle for which the trajectory prediction is being carried out and "front vehicle" refers to a vehicle that is in front of the host vehicle with respect to the direction of travel along the road.

The method(s) and system(s) described herein implement (or can be used to implement) one or more of the human policy models, which are also referred to herein as AI vehicle trajectory prediction models (or "trajectory prediction model" for short) and which are each used to determine a predicted vehicle trajectory of a human-driven host vehicle based at least on a host vehicle-traffic light distance ($d_x$), a longitudinal host vehicle speed ($v_x$), a traffic light signal phase ($P_t$), an amount of time relative to the last (or next) phase change of the traffic light (or "traffic light signal timing") ($T_t$), and the time of day (TOD). The host vehicle-traffic light distance ($d_x$) and the longitudinal host vehicle speed ($v_x$) are both a part of the host vehicle state ($X^{HV}$), and can be represented as $X_t^{HV} := [d_t, v_t]$ for time t. It should be appreciated that, in some embodiments, a sequence of host vehicle states, traffic light states, and/or front vehicle states corresponding to times t-τ to t can be taken into consideration, where τ defines the size of the range that is taken into consideration, which can include any suitable number of states for a given time within the range t-τ to t.

The AI vehicle trajectory prediction model is developed based on training data of a plurality of training events, where the training data of each training event at least includes a host vehicle-traffic light distance $d_x$, longitudinal host vehicle speed $v_x$, a traffic light signal phase $P_t$, an traffic light signal timing $T_t$, and a time of day TOD. That is, in one embodiment, for a given one of the plurality of training events, the training data includes or is representative of the distance between the host vehicle and the traffic light (or "host vehicle-traffic light distance $d_x$"), a longitudinal speed of the host vehicle (or "longitudinal host vehicle speed $v_x$"), a phase of the traffic light (or "traffic light signal phase $P_t$"), the elapsed time since the last phase change of the traffic light (or "traffic light signal timing $T_t$"), and the TOD, where each of the host vehicle-traffic light distance $d_x$, the longitudinal host vehicle speed $v_x$, the traffic light signal phase $P_t$, and the traffic light signal timing $T_t$ are taken at a time corresponding to one another (i.e., at the same time or close in time (i.e., the time difference is less than a predetermined amount, which can be, for example, 0.1 seconds, although this amount can be set for the particular application and/or environment in which the system/method is being used)) and that can be described by the TOD. In some embodiments, the training data can further include a front vehicle state ($X^{FV}$), which can include a front-host vehicle distance $r_t$ and a front-host vehicle speed $\dot{r}_t$. The training data can be used by a model learning application, which is an application that is specifically configured to implement one or more artificial intelligence techniques so as to compose the trajectory prediction model based on the training data.

Once the trajectory prediction model is learned, the model can be implemented by a particular vehicle (e.g., the host vehicle, another nearby vehicle), by a traffic signal system, by a remote facility (or multiple remote facilities), or by a combination thereof. In one embodiment, the trajectory prediction model is implemented by an AI vehicle trajectory prediction application that is stored on memory at an autonomous vehicle (AV) and executable at the AV using a processor. According to at least some embodiments, once the trajectory prediction model is composed via offline learning using the training data, then the trajectory prediction model can be used to map current vehicle parameters to a predicted vehicle trajectory. In one embodiment, the trajectory prediction model is implemented in an on-board AI vehicle trajectory prediction application (or "on-board trajectory prediction application" for short) and, in another embodiment, the trajectory prediction model is implemented in an off-board AI vehicle trajectory prediction application (or "off-board trajectory prediction application" for short). In yet another embodiment, the trajectory prediction model is implemented in a combination of an on-board trajectory prediction application and an off-board trajectory prediction application. As used herein, the "on-board trajectory prediction application" is an embodiment of the AI vehicle trajectory prediction application that is executed by a device that is a part of the vehicle or that travels with the vehicle, such as a vehicle system module (VSM) or a personal wireless device (e.g., smartphone). And, as used herein, the "off-board trajectory prediction application" is an embodiment of the AI vehicle trajectory prediction application that is executed by a device that is not a part of the vehicle and that does not travel with the vehicle, such as a remote facility or roadside equipment (RSE).

In some embodiments, the trajectory prediction model can be initially learned or composed through a learning process that uses the training data and, once the trajectory prediction model meets certain performance and/or accuracy measures, then the trajectory prediction model can be embodied in a AI vehicle trajectory prediction application as a computer program product that can be disseminated to various devices that can execute the trajectory prediction application, such as one or more remote servers of one or more remote facilities, one or more autonomous vehicle (AVs), RSEs, etc. Any initial learning of the trajectory prediction model can thus be done at one or more remote facilities and this initial learning can use training data that is obtained from a variety of sources, including third party sources and/or previously-recorded data of a vehicle OEM or municipal system (e.g., a traffic signal system operated or controlled by a municipality or other governing body). Once the trajectory prediction model is initially trained or developed, the trajectory prediction model can then be deployed and used commercially. Further, according to at least some embodiments, after the trajectory prediction model is implemented for use with a plurality of vehicles, the trajectory prediction model can continue learning through additional training data that is gathered by the plurality of vehicles. The trajectory prediction model can thus continuously be improved.

According to at least some embodiments, the trajectory prediction model is based on a neural network. In one embodiment, the trajectory prediction model is based on a deterministic neural network (typically denoted with a "d" in the subscript, such as $f_d$) and, in another embodiment, the trajectory prediction model is based on a probabilistic neural network (typically denoted with a "p" in the subscript, such as $f_p$). In other embodiments, the trajectory prediction model can be based on a combination of a deterministic neural network and a probabilistic neural network. In some embodiments, the probabilistic model can be used in scenarios where competing policies exist or can be used to obtain probabilistic contexts for the predicted trajectories. The trajectory prediction model is used to provide a trajectory prediction of a host vehicle based on certain parameters pertaining to the vehicle, which, according to many embodiments, includes at least the host vehicle-traffic light distance $d_x$, the host longitudinal host vehicle speed $v_x$, the traffic light signal phase $P_t$, the traffic light signal timing $T_t$, and the time of day (TOD). As mentioned above, the predicted trajectory can be represented by an acceleration, including the magnitude and direction of the acceleration. According to some embodiments, the predicted acceleration can be used to derive other values, such as the velocity of the vehicle. And, in some embodiments, the predicted trajectory can be represented by a velocity, which can then be used to derive an acceleration. Thus, according to various embodiments, the trajectory prediction can include a predicted velocity and/or acceleration of the host vehicle as a function of time. In some embodiments, the trajectory prediction can be accompanied by an uncertainty (or confidence) score that represents a level of uncertainty (or confidence) in the trajectory prediction.

Figure 1B:
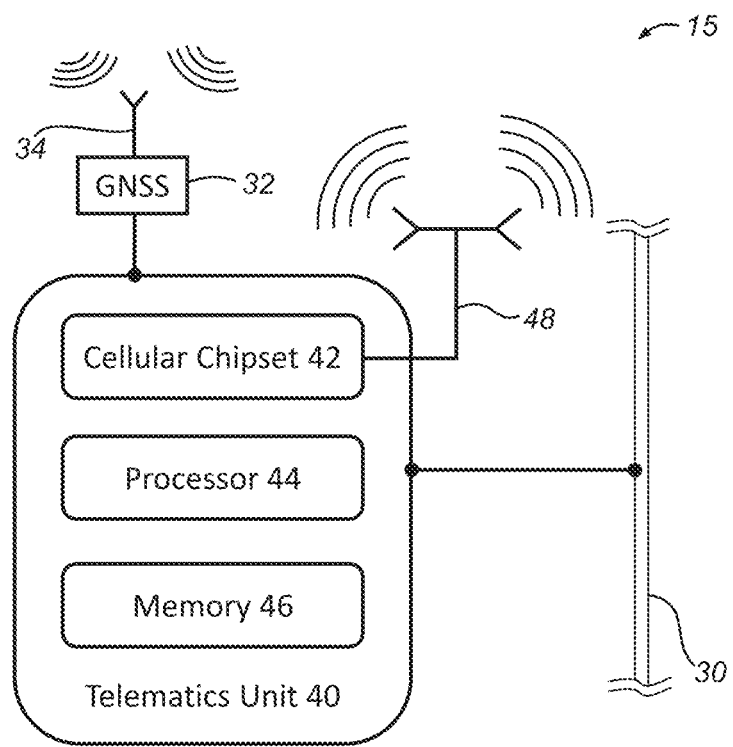

With reference now to FIGS. 1A and 1, there is shown an operating environment that comprises a communications system 1 and that can be used to implement the method disclosed herein. Communications system 1 generally includes vehicles 10,11,12, one or more wireless carrier systems 13, a land communications network 14, a remote processing facility 16, a municipal facility 18, a traffic signal system 20 including a traffic signaling device 22, a constellation of GNSS satellites 50, and a mobile device 60. The host vehicle 10 is a human-driven vehicle and is also a connected vehicle (CV). As used herein, a connected vehicle (CV) is a vehicle that is capable of carrying out data communications with a remote server, such as those located at the remote facility 16. The front vehicle 11 is a connected vehicle (CV). However, in other embodiments, the host vehicle 10 and/or the front vehicle 11 is not a connected vehicle. In some embodiments, the front vehicle 11 is an autonomous vehicle. The autonomous vehicle (AV) 12 is a connected vehicle and an autonomous vehicle, which, as used herein, an autonomous vehicle (AV) is a vehicle that is categorized as a Level 2 or higher according to the National Highway Traffic Safety Administration (NHTSA) or Society of Automotive Engineers (SAE) standard J 3016-2018. In some embodiments, the vehicle 10 can be a Level 3 (or higher), a Level 4 (or higher), or a Level 5 (or higher). Vehicle-to-infrastructure (V2I) communications include communications that can be carried out between vehicles and roadside equipment (RSE) (e.g., RSE 26), as well as communications between vehicles and remote networks, such as remote facility 16 and/or municipal facility 18. Such communication system may be one example that can carry out vehicle-to-infrastructure (V2I) communications. It should be understood that the disclosed method can be used with any number of different systems and is not specifically limited to the operating environment shown here. Also, the architecture, construction, setup, and operation of the system 1 and its individual components are generally known in the art. Thus, the following paragraphs simply provide a brief overview of one such communications system 1; however, other systems not shown here could employ the disclosed method as well.

Wireless carrier system 13 may be any suitable cellular telephone system. Carrier system 13 is shown as including a cellular tower 15; however, the carrier system 13 may include additional cellular towers as well as one or more of the following components (e.g., depending on the cellular technology): base transceiver stations, mobile switching centers, base station controllers, evolved nodes (e.g., eNodeBs), mobility management entities (MMEs), serving and PGN gateways, etc., as well as any other networking components required to connect wireless carrier system 13 with the land network 14 or to connect the wireless carrier system with user equipment (UEs, e.g., which include telematics equipment in vehicles 10,11,12), all of which is indicated generally at 31. Carrier system 13 can implement any suitable communications technology, including for example GSM/GPRS technology, CDMA or CDMA2000 technology, LTE technology, etc. In general, wireless carrier systems 13, their components, the arrangement of their components, the interaction between the components, etc. is generally known in the art.

Apart from using wireless carrier system 13, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (e.g., news, music) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicles 10,11,12 and the uplink transmitting station. If used, this satellite telephony can be utilized either in addition to or in lieu of wireless carrier system 13.

Land network 14 may be a conventional land-based telecommunications network that is connected to one or more landline telephones and connects wireless carrier system 13 to remote facility 16. For example, land network 14 may include a public switched telephone network (PSTN) such as that used to provide hardwired telephony, packet-switched data communications, and the Internet infrastructure. One or more segments of land network 14 could be implemented through the use of a standard wired network, a fiber or other optical network, a cable network, power lines, other wireless networks such as wireless local area networks (WLANs), or networks providing broadband wireless access (BWA), or any combination thereof.

Remote facility 16 may be designed to provide the vehicle electronics of any CVs, mobile device 60, and/or other wirelessly connected devices (WCDs) (i.e., a device that is capable of communicating data with a remote network, such as a remote server at the remote facility 16) with a number of different system back-end functions. The remote facility 16 represents one or more remote facilities that house servers, memory, or other computing equipment that is used to carry out various functionality described herein, including an AI learning process that uses training data to generate or build the AI vehicle trajectory prediction model. Additionally, the remote facility 16 can be used to carry out or support an AI vehicle trajectory prediction application, which is an application that implements the AI vehicle trajectory prediction model. Although a single remote facility is referred to herein, it should be appreciated that one or more remote facilities can be used to implement the various backend (or off-board) functionality discussed herein.

The remote facility 16 may include various components and may include a wired or wireless local area network. The remote facility 16 includes one or more remote servers 17. The one or more remote servers 17 each are an electronic controller and each include a processor and memory. The memory can store computer instructions that, when executed, carry out various functionality, such as one or more of the method steps discussed herein, at least according to some embodiments. The remote facility 16 can also include other computers or computing devices, as well as other memory, databases, etc. Generally, the remote facility 16 may receive and transmit data via a modem connected to land network 14. A database at the remote facility 16 can store vehicle information, trajectory data (e.g., training data, predicted trajectory data, and/or actual trajectory data), GNSS data, and any other data pertaining to WCDs. Data transmissions may also be conducted by wireless systems, such as IEEE 802.11x, GPRS, and the like. In one embodiment, the remote facility 16 may be used to implement at least part of one or more methods disclosed herein. In some embodiments, the remote facility 16 may receive GNSS data, trajectory prediction input data (i.e., data that is, or is used to derive, the host vehicle-traffic light distance $d_x$, the longitudinal host vehicle speed $v_x$, the traffic light signal phase $P_t$, the traffic light signal timing $T_t$, front-host vehicle distance $r_t$, a front-host vehicle speed $\dot{r}_t$, and/or the time of day TOD), and/or other data from vehicles 10,11, mobile devices 60, and/or other WCDs. The remote facility 16 may then process this data to predict vehicle trajectories (e.g., vehicle acceleration, vehicle velocity) and/or use this data as training data for generating, composing, building, or improving the AI vehicle trajectory prediction model and/or application.

Municipal facility 18 is a remote facility that is owned or controlled by a municipality or other governmental body. The municipal facility 18 includes traffic signaling control system 19, which may include various computers, databases, servers, and other computing devices. Traffic signaling control system 19 may be used for controlling traffic signaling devices, such as traffic signal 22, or may be used for providing traffic signal state ($X^{TL}$), including the traffic light signal phase $P_t$ and traffic light signal timing $T_t$, to one or more other devices or systems, such as the remote facility 16. The traffic signal state can be stored in memory at the traffic signal system 20, or may be stored at the municipal facility 18. It should be appreciated that, although the present example describes the traffic signaling control system 19 being implemented at the municipal facility 18, in other embodiments, this system 19 can be implemented at another location, such as a server or database that is not owned or controlled by a municipality.

The traffic signaling control system 19 generates traffic control data that can be sent to traffic signals or other traffic signaling devices such as pedestrian cross-walk lights and lane direction and closure signals. The traffic signaling control system 19 may receive traffic signal state data from one or more traffic sensors, such as inductance loop detectors and/or video detectors, or from other roadside equipment (RSE) 26 that may be located at or near intersections. In some embodiments, the municipal facility 18 or the traffic signaling control system 19 may receive information from vehicles 10,11,12, mobile devices 60, and/or other WCDs via RSE 26, cellular carrier system 13, and/or land network 14. In one embodiment, the municipal facility 18 can receive a data request from remote facility 16, such as a request for traffic signal state information (e.g., signal phase and timing (SPaT) data, which can include, for example, traffic light signal phase $P_t$ and traffic light signal timing $T_t$). In response to this request, the municipal facility 18 can provide the requested data and/or other data, such as the traffic signal state information. The term "traffic signal state information" refers to any information that represents the traffic signal state $X^{TL}$ or any part thereof.

Either or both of remote facility 16 and municipal facility 18 can include a computer-based system having one or more servers or computers that include an electronic processor and memory. The processors can be any type of device capable of processing electronic instructions including microprocessors, microcontrollers, host processors, controllers, vehicle communication processors, and application specific integrated circuits (ASICs). The processors may execute various types of digitally-stored instructions, such as software or firmware programs stored in the memory, which enable the facility to provide a wide variety of services. For instance, the processors at the remote facility 16 may be configured to execute programs or process data to carry out at least a part of the method discussed herein. In one embodiment, the process can execute an application (e.g., computer program) that causes the processor to perform one or more of the method steps using information or data that is received from the one or more vehicles 10,11,12, municipal facility 18, other remote facilities and/or servers, mobile devices 60, and/or other WCDs. The memory at remote facility 16 and/or municipal facility 18 can include powered temporary memory and/or any suitable non-transitory, computer-readable medium such as different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, or other suitable memory.

Traffic signal system 20 is depicted as including traffic signal 22, controller 24, and roadside equipment (RSE) 26, but can include a network switch, additional traffic signals or other types of traffic signaling devices, a router, a modem, other network interface controller or module, and/or a memory device. Any one or more of these components can be housed in the traffic signal and/or in a separate housing located near the traffic signal. In one embodiment, the controller 24 can include a processor and memory, and can be configured to operate the traffic signal, for example, by activating and deactivating signaling cues (e.g., any visual, audible, or other indicator or notification that can be perceived by an operator on a roadway near or at the signaling device). The memory device at traffic signal can be a memory management unit (MMU) and/or a non-volatile memory device, which can include powered temporary memory and/or any suitable non-transitory, computer-readable medium such as different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, or other suitable memory.

Traffic signal system 20 can also include one or more network interfaces (including any suitable hardware, such as network interface cards (NIC) or wireless NIC (WNIC)) and may be able to communicate with one or more remote servers via land network 14. Also, traffic signal system 20 can include other network capabilities, such as cellular or other wireless communication capabilities, such as is indicated for RSE 26. The traffic signal can be send traffic signal state information or data to a remote facility, such as remote facility 16 or municipal facility 18. The traffic signal state information or data can include the traffic light signal phase of a traffic signal, such as whether a traffic light is GREEN, RED, or YELLOW (or AMBER). The traffic light signal phase and other traffic signal state data can include or be accompanied by a unique identifier (ID) that is used to identify the particular intersection at which the traffic signal is located, as well as a timestamp (or other time indicator) that indicates the time associated with the traffic signal data. The traffic signal state data can include a traffic light signal phase $P_t$, and a traffic light signal timing $T_t$, and/or other signal phase and timing (SPaT) data. Also, any of this traffic signal state data can include or be accompanied by time data that provides a time or a range of times in which the signal status refers to and/or is associated with, such as the times in which the signal will be of a certain status. Although only one traffic signal system 20 is depicted, numerous traffic signal systems may be used and each may include one or more traffic signals 22 or other traffic signaling devices.

Traffic signal 22 is depicted as a stoplight or traffic light ("R" for RED phase or light, "Y" for YELLOW or AMBER (collectively, referred to as "YELLOW") phase or light, and "G" for GREEN phase or light), but it should be appreciated that other traffic signaling devices can be used instead, such as any electronic signaling device that may be used to direct vehicular traffic. Additionally, although there is only one traffic signal shown, it should be appreciated that numerous traffic signals may be used in system 1 and/or traffic signal system 20, and that various types of traffic signaling devices may be used.

RSE 26 can be controlled by controller 24 and may include an inductance loop detector, a video detector, or other traffic-related equipment and/or sensors that may be situated along a roadside or near an intersection. The RSE 26 and/or controller 24 can include network communication interfaces, such as WNIC or other NIC, and may communicate directly with one or more nearby vehicles, such as via short-range wireless communications (SRWC). Both the RSE 26 and the traffic signal 22 may be remotely controlled, and may be reprogrammed or reconfigured such that the operation of signaling cues of the traffic signal is updated. For example, municipal facility 18 may send a set of instructions that can be used to update the traffic signal 22. The set of instructions can be referred to as an "update" and may be sent via land network 14, one or more cellular carrier systems 13, or other radio signals. In other embodiments, the traffic signal may be reprogrammed through a controller located at or near the traffic signal and that is connected to the traffic signal via a bus or other communication means.

Vehicles 10,11,12 are each depicted in the illustrated embodiment as a passenger car, but it should be appreciated that any other vehicle including motorcycles, trucks, sports utility vehicles (SUVs), recreational vehicles (RVs), bicycles, other vehicles or mobility devices that can be used on a roadway or sidewalk, etc., can also be used. As depicted in the illustrated embodiment, the host vehicle 10 includes a GNSS receiver 32 with its antenna 34 to receive GNSS radio signals from satellites 50. The host vehicle 10 further includes a telematics unit 40 that enables communication between the vehicle and remote servers or network devices, such as those at remote facility 16. The GNSS receiver 32 may be any suitable commercially available GNSS receiver and may provide National Marine Electronics Association (NMEA) or other output messages to telematics unit 40, which may then be sent as GNSS information from the host vehicle 10. According to at least some embodiments, such as where the front vehicle 11 is a CV, the front vehicle 11 includes the same components, devices, and modules as the host vehicle 10, even though these components are not separately depicted or discussed. According to at least some embodiments, the AV 12 includes the same components, devices, and modules as the host vehicle 10, even though these components are not separately depicted or discussed.

The global navigation satellite system (GNSS) receiver 32 receives radio signals from the constellation of GNSS satellites 50. The GNSS receiver 32 can then obtain GNSS data that provides a location and/or a time. Additionally, the GNSS receiver 32 may be used to provide navigation and other position-related services to the vehicle operator. The GNSS data can be supplied to remote facility 16 or other remote facility, such as municipal facility 18, for certain purposes, such as for vehicle trajectory prediction or other traffic-related purposes. In some embodiments, the GNSS receiver 32 may be a global positioning system (GPS) module that receives GPS signals from GPS satellites that are a part of the U.S. GPS satellite system. Receivers for use with GLONASS and/or Europe's Galileo system may also be used. The GNSS signals may be used to generate GNSS data that includes time data, and this time data may be the time when the GNSS module receives information from satellites 50, a time indicated in the GNSS signals received from the GNSS satellites 50, or other contemporaneous timestamp. Although the illustrated embodiment is described primarily as it would be implemented with connected vehicles (CVs) that utilize a global navigation satellite system (GNSS) for position information, it will be appreciated as the description proceeds that the system and methods discussed herein may be used with other WCDs such as a handheld wireless device having a GNSS receiver along with cellular and/or short range wireless communication (SRWC) capabilities.

In one embodiment, the host vehicle 10, the front vehicle 11, and/or the AV 12 may be configured to periodically record GNSS data and/or periodically send GNSS data to the remote facility 16. For example, the vehicle may record this GNSS data at a frequency of 10 Hz and send this information to the remote facility at a frequency of 1 Hz—of course, other sampling/recording and/or sending frequencies can be used. Additionally, the vehicle may send heading information (e.g., the direction the front of the vehicle is facing) or other vehicle or WCD information to the remote facility 16. As discussed above, once the remote facility 16 receives GNSS data from the host vehicle 10, the front vehicle 11, and/or the AV 12, the remote facility 16 may store the information at a memory device and/or may process the data according to one or more set of computer instructions, such as computer instructions that may be configured to carry out at least part of the method described herein.

Telematics unit 40 is an electronic control and includes a cellular chipset 42, a processor 44, a memory 46, and an antenna 48. Telematics unit 40 can be an OEM-installed (embedded) or aftermarket device that is installed in the vehicle and that enables wireless voice and/or data communication over wireless carrier system 13 and via wireless networking. This enables the vehicle to communicate with remote facility 16 and/or municipal facility 18, other telematics-enabled vehicles, or some other entity or device. The telematics unit preferably uses radio transmissions to establish a communications channel (a voice channel and/or a data channel) with wireless carrier system 13 so that voice and/or data transmissions can be sent and received over the channel. The telematics unit 40 can receive GNSS data from GNSS receiver 32 and can subsequently send the GNSS data to remote facility 16 or municipal facility 18. The telematics unit 40 may be connected to an intra-vehicle communications bus 30 that enables communication with other electronic systems on the vehicle. In some embodiments, the telematics unit 40 can provide both voice and data communication, and/or can enable the vehicle to offer a number of different services including those related to navigation, telephony, emergency assistance, diagnostics, infotainment, etc. Data can be sent either via a data connection, such as via packet data transmission over a data channel, or via a voice channel using techniques known in the art.

According to one embodiment, the telematics unit 40 utilizes cellular communication according to either GSM, CDMA, or LTE standards and thus includes a standard cellular chipset 42 for voice communications like hands-free calling, a wireless modem for data transmission, an electronic processing device or processor 44, one or more digital memory devices 46, and a dual antenna 48. It should be appreciated that the modem can either be implemented through software that is stored in the telematics unit and is executed by processor 44, or it can be a separate hardware component located internal or external to telematics unit 40. The modem can operate using any number of different standards or protocols such as LTE, EVDO, CDMA, GPRS, and EDGE. Wireless networking between the vehicle, RSE 26, and other networked devices can also be carried out using telematics unit 40. For this purpose, telematics unit 40 can be configured to communicate wirelessly according to one or more wireless protocols, including short range wireless communication (SRWC) such as any of the IEEE 802.11 protocols, V2I communication protocols, V2V communication protocols, Wi-Fi™, WiMAX™, ZigBee™, Wi-Fi Direct™, Bluetooth™, or near field communication (NFC). When used for packet-switched data communication such as TCP/IP, the telematics unit can be configured with a static IP address or can set up to automatically receive an assigned IP address from another device on the network such as a router or from a network address server.

The processor 44 can be any type of device capable of processing electronic instructions including microprocessors, microcontrollers, host processors, controllers, vehicle communication processors, and application specific integrated circuits (ASICs). It can be a dedicated processor used only for telematics unit 40 or can be shared with other vehicle systems. The processor 44 executes various types of digitally-stored instructions, such as software or firmware programs stored in memory 46, which enable the telematics unit 40 to provide a wide variety of services. For instance, the processor 44 can execute programs or process data to carry out at least a part of the method discussed herein. In one embodiment, the telematics unit 40 includes an application (e.g., computer program) that enables the processor to send GNSS data to a remote facility 16. The memory 46 can include powered temporary memory and/or any suitable non-transitory, computer-readable medium such as different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, or other suitable memory.

Furthermore, it should be understood that at least some of the aforementioned modules could be implemented in the form of software instructions saved internal or external to the telematics unit 40, they could be hardware components located internal or external to the telematics unit 40, or they could be integrated and/or shared with each other or with other systems located throughout the vehicle, to cite but a few possibilities. In the event that the modules are implemented as VSMs located external to the telematics unit 40, they could utilize the vehicle bus 30 to exchange data and commands with the telematics unit.

The mobile device 60 is a device that can communicate with other devices using cellular carrier system 13 and/or land network 14. The mobile device 60 can communicate with remote facility 16 and/or municipal facility 18, and is thus a wirelessly connected device (WCD). Additionally, mobile device 60 may communicate with vehicles 10,11,12 and/or RSE 26 via short-range wireless communications (SRWC), such as Bluetooth™, Bluetooth Low Energy™ (BLE), Wi-Fi™, near field communications (NFC), or various other SRWC. The mobile device 60 may include: hardware, software, and/or firmware enabling such cellular telecommunications and SRWC as well as other mobile device applications. The hardware of the mobile device 60 may comprise: a processor and memory (e.g., non-transitory computer readable medium configured to operate with the processor) for storing the software, firmware, etc. The mobile device may also include a GNSS receiver or module, such as a module that is similar to GNSS receiver 32 that is included in vehicles 10,11,12. The processor and memory may enable various software applications, which may be preinstalled or installed by the user (or manufacturer). One implementation of a vehicle-mobile device application may enable GNSS information (or trajectory prediction input data) to be sent to the remote facility 16. In one embodiment, a mobile device may be inside a vehicle cabin of a vehicle and, thus, may be used to send GNSS information or trajectory prediction input data to a remote facility 16. Thus, a non-connected vehicle (e.g., a vehicle without a GNSS module and/or without capabilities to connect to remote facility 16 or municipal facility 18) transporting a cellular device or other WCD operates as a virtual connected vehicle and, in at least some embodiments, may thus be treated as a connected vehicle (CV).

As mentioned above, an artificial intelligence (AI) vehicle trajectory prediction model can be used to predict trajectories and/or acceleration/velocity of a human-driven vehicle at a particular time or series of time. The AI vehicle trajectory prediction model incorporates traffic signal phase and timing (SPaT) information, which includes traffic light signal phase $P_t$ and traffic light signal timing $T_t$, as well as the host vehicle-traffic light distance $d_x$ and the longitudinal host vehicle speed $v_x$. The time of day (TOD) is also taken into consideration since the traffic characteristics including congestion and speed may differ considerably depending on the time of day. The state input for time t can be denoted as $X_t$ and represented as follows:

$$X_t := [X_t^{HV}, X_t^{FV}, X_t^{TL}, TOD_t]$$

where $X_t^{HV}$ represents the host vehicle state (which, in the present embodiment, includes the host vehicle-traffic light distance $d_x$ and the longitudinal host vehicle speed $v_x$), $X_t^{FV}$ represents the front vehicle state (which, in the present embodiment, includes the front-host vehicle distance $r_t$ and the front-host vehicle speed $\dot{r}_t$), $X_t^{TL}$ represents the traffic light state (which, in the present embodiment, includes traffic light signal phase $P_t$ and traffic light signal timing $T_t$), and TOD represents the time of day. It should be appreciated that the subscript t indicates that the time of each of the respective states or values correspond to the present time t. It should be appreciated that, in some embodiments, the host vehicle state $X^{HV}$ includes a series or sequence of values corresponding to one or more times prior to the present time and which can be defined as t-τ. The AI vehicle trajectory prediction model maps the state input X to a predicted trajectory, which includes a longitudinal acceleration of the vehicle (at least in many embodiments). Each of these five inputs is taken with respect to a particular vehicle approaching a particular traffic signal.

Host Vehicle-Traffic Light Distance $d_x$ represents a longitudinal distance between the host vehicle and the traffic light that the vehicle is approaching or departing from. This distance $d_x$ can be useful in predicting the behavior of the human-driven vehicle. For example, a vehicle approaching a traffic light in the RED phase typically travels relatively slowly and slows down when it is close to the traffic light, whereas the vehicle may travel fast when the vehicle is far away from the traffic light. When the host vehicle-traffic light distance $d_x$ is zero (i.e., $d_x=0$), then this represents that the host vehicle is at the stop line of a lane that is subject to the traffic light. When the host vehicle-traffic light distance $d_x$ is greater than zero (i.e., $d_x>0$), this means that the host vehicle is approaching the traffic light (upstream) and, when the host vehicle-traffic light distance $d_x$ is less than zero (i.e., $d_x<0$), this means that the host vehicle is departing from the traffic light (downstream).

Figure 4:
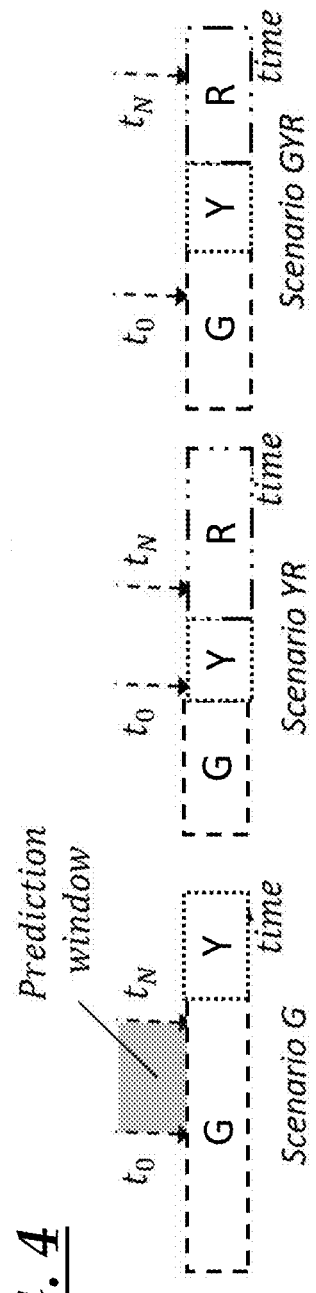
FIG. 4 depicts timing diagrams of three exemplary scenarios in which the method discussed herein can be used to obtain a predicted trajectory of the human-driven vehicle as the human-driven vehicle approaches and/or departs from a traffic signal.

Longitudinal Host Vehicle Speed $v_x$ indicates a longitudinal speed of the vehicle. This speed $v_x$ can be useful in predicting the behavior of the human-driven vehicle. For instance, in the absence of a RED or YELLOW traffic light, a vehicle traveling at a relatively low speed compared to the speed of the surrounding traffic is more likely to accelerate. Another example is that a vehicle approaching a traffic light in the RED phase at a high speed tends to break harder (i.e., use the brakes to decelerate the vehicle faster) than a vehicle approaching the traffic light at a low speed. The longitudinal host vehicle speed is assumed to be greater or equal to zero (i.e., $v_x>=0$). The longitudinal host vehicle speed $v_x$ is the speed of the human-driven vehicle as taken along the longitudinal direction $L_x$ (FIG. 4).

Front-Host Vehicle Distance $r_t$ indicates a longitudinal distance between the host vehicle and the front vehicle. This distance $r_t$ may be measured as the longitudinal distance between any two reference points on the host vehicle and the front vehicle. In one embodiment, the two reference points can be a point at the centers of the host vehicle and the front vehicle as taken in the longitudinal direction. In another embodiment, the two reference points can be a front-most reference point of the host vehicle (e.g., a point on the front bumper of the host vehicle) and a rear-most point of the front vehicle (e.g., a point on the rear bumper of the front vehicle). It is assumed that the positon of the front vehicle, which can be denoted as $r_x$ is greater than 0, meaning that the front vehicle is ahead of the host vehicle since the position is taken with respect to the host vehicle (i.e., the host vehicle is always at the position of 0).

Front-Host Vehicle Speed $\dot{r}_t$ is the longitudinal speed of the front vehicle with respect to the longitudinal speed of the host vehicle, which can be determined, for example, based on determining the difference between the absolute longitudinal speed (i.e., the longitudinal speed with respect to earth) of the front vehicle and the absolute longitudinal speed of the host vehicle.

Traffic Light Signal Phase $P_t$ represents the phase of the traffic light that the vehicle is subject to (i.e., that the vehicle is approaching). In the examples discussed herein, the GREEN, YELLOW, and RED phases are each represented by the integers 1, 2, and 4, respectively. Needless to say, the driver behavior at a traffic light in the GREEN phase is different from that at a traffic light in the YELLOW or RED phase. In other embodiments, the traffic light or other signaling device may have other phases, such as "BLINKING YELLOW", and the method/system can be modified to take into account these different or additional phases.

Traffic Light Signal Timing $T_t$ is an amount of time relative to the last (or next) phase change of the traffic signal. In the present embodiment, the traffic light signal timing $T_t$ is the amount of time that has elapsed since the last phase change of the traffic signal. Examples of phase changes of a traffic signal would be the traffic signal transitioning from the GREEN phase to the YELLOW phase, from the YELLOW phase to the RED phase, or from the RED phase to the GREEN phase. Every time a phase transition occurs, $T_t$ is initialized to zero (0) and is accumulated as time elapses. This traffic light signal timing $T_t$ may account for transient behaviors of human drivers near traffic signal phase changes. For example, a vehicle approaching an intersection in a RED phase with a small $T_t$ (meaning that the phase has just shifted to red) may not be traveling slow whereas a vehicle approaching an intersection in a RED phase with a large $T_t$ is likely to travel slow or stop (or already be stopped). Another example is when a vehicle is stationary in a queue and a phase shift from the RED phase to the GREEN phase recently occurred. In such a scenario, depending on the position of the vehicle in the queue, the vehicle may or may not stay stationary for a while. Thus, $T_t$ can be an important factor for predicting driver behaviors and, thus, the human-driven vehicle trajectory. In at least some embodiments, the traffic light signal timing $T_t$ can be used to indirectly account for the queue formed near traffic lights.

Time of Day TOD represents the time of day as elapsed time since the beginning of the day. In one embodiment, the TOD can represent the number of hours that have elapsed since the beginning of the day (i.e., $0<=TOD<24$). When the TOD=0, then it can be said that the time of day is midnight, and when the TOD=12, it can be said that the time of day is noon. The traffic characteristics, including congestion and speed, may differ considerably depending on the time of day; for example, traffic speed may be much slower during rush-hour than at other times such as in the middle of the night.

Due to the stochastic and complex nature of human decision making in driving, a simple analytical model such as a linear or a physics-based model may not be suitable or preferable for accurately representing the nominal or probabilistic behaviors of human-drivers near traffic signals. Instead, an improved model can be learned through data-driven modeling, using deep learning methods on historical driving data. The learned proposed models can be either deterministic or probabilistic.

Figure 2A:
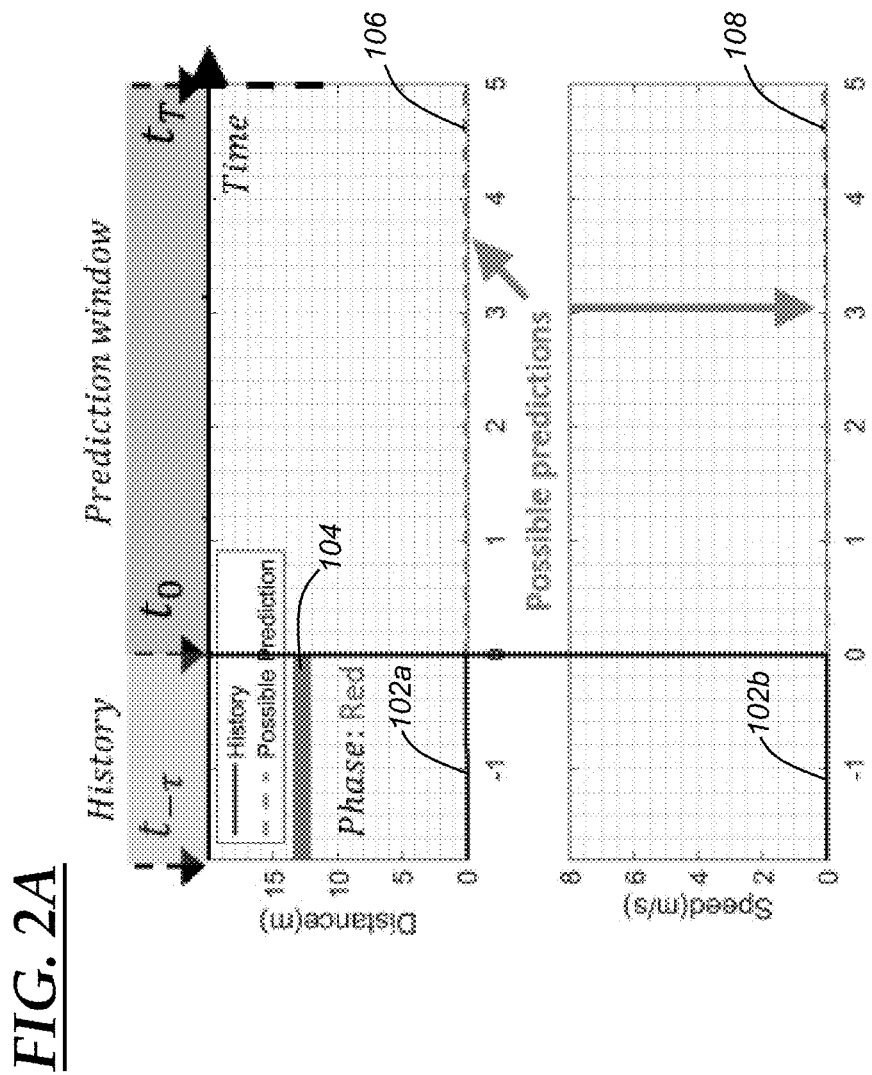
FIGS. 2A-2B depicts an exemplary scenario (a red-green (RG) scenario) in which the method discussed herein can be used to determine a predicted trajectory of the human-driven vehicle as the human-driven vehicle approaches a traffic signal.
Figure 2B:
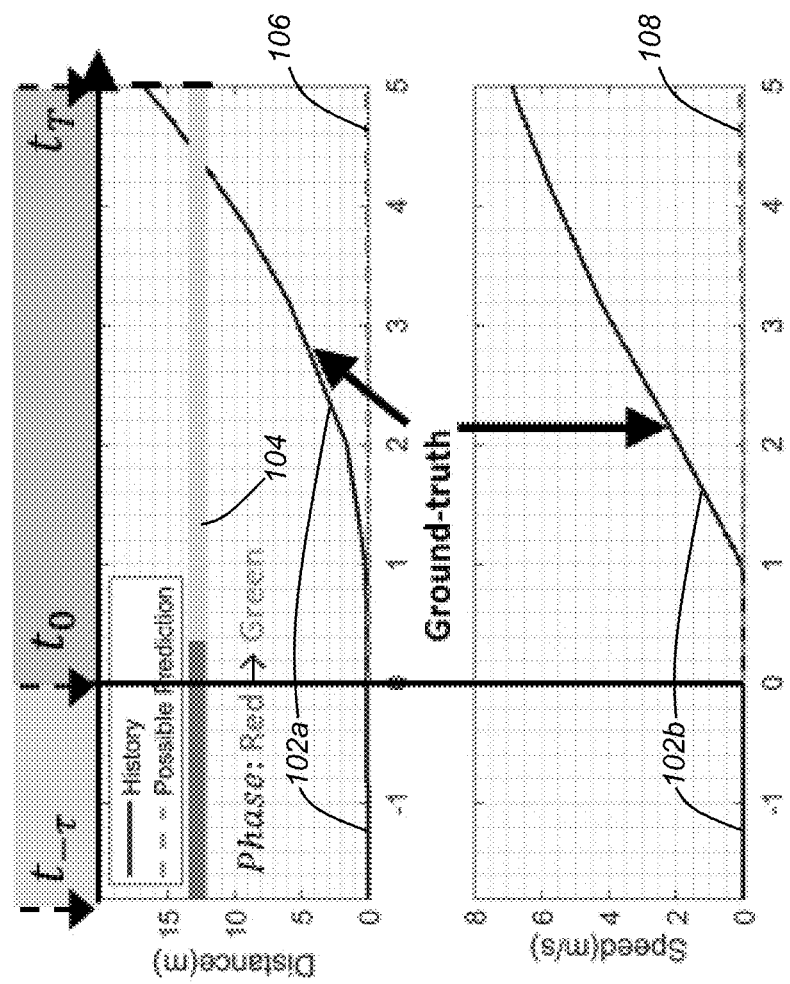

With reference to FIGS. 2A-2B, there is shown an example of graphs depicting the host vehicle position relative to the position of a traffic signal and the host vehicle speed (relative to earth). This example is based sampled real-world data and demonstrates how uncertainty of traffic light phases and timing makes it difficult to accurately predict a trajectory of a human-driven vehicle. FIG. 2A depicts possible predictions that are made without knowing the phase and timing of the traffic light and FIG. 2B depicts the actual (ground-truth) distance relative to the traffic light and the actual longitudinal host vehicle speed (relative to earth). The sample is a 7 s (7 second) long red-green (RG) scenario, where the present time is $t_0$ and $\tau=2$ s and where the prediction window is 5 s. The host vehicle state $X^{HV}$ thus includes, in this example, host vehicle states from the last two seconds from $t_0-\tau$ to $t_0$ and the ground-truth future vehicle states from $t_0$ and $t_0+5$ s as shown by the black lines indicated at 102a, 102b. As indicated by the solid horizontal bar 104 from time t=-2 to t=0, the phase of the traffic signal is red. The bar 104 is at a distance of 13 meters (13 m) from the host vehicle as shown in the top graph of FIG. 2A. It should be appreciated that the distance is initialized to 0 m based on the starting position at time $t_0-\tau$ (or -2 s in this example). The phase of the traffic signal after time t=0 is not depicted in FIG. 2A since the host vehicle is unaware of what the phase timing is for the traffic signal. Thus, at time t=0 (or time $t_0$), provided the host vehicle's position (0 m) and speed (0 m/s), and the uncertainty of when the traffic signal will change from the red phase to the green phase, a reasonable prediction that an existing method would make is to predict that the vehicle remains in the same position (as indicated at 106) and at a speed of 0 m/s (as indicated at 108). However, in reality of this example as shown in FIG. 2B, the phase shifted to green at t=0.35 s (as indicated by the bar 104 at distance=13 m), and the vehicle increased its speed (as indicated at 102b) and traveled toward the traffic signal (as indicated at 102a) as depicted black lines.

Figure 3:
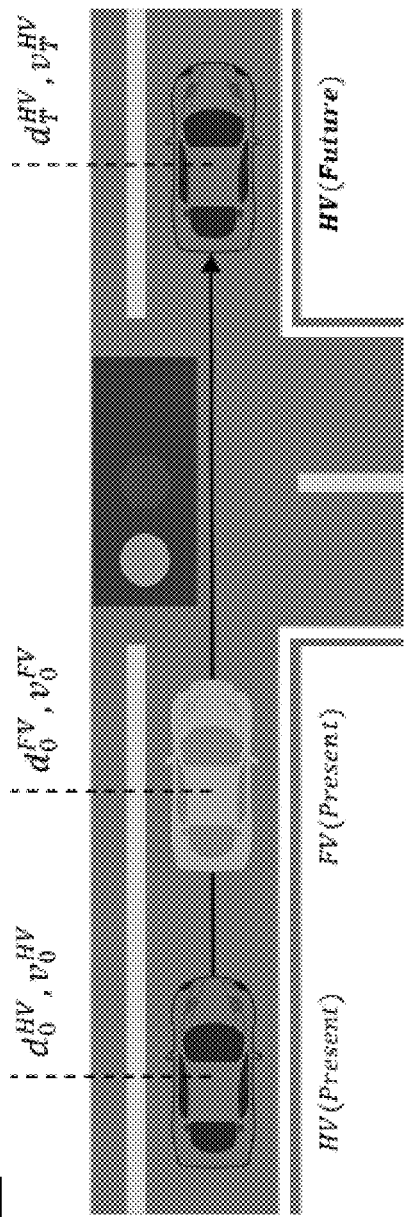
FIG. 3 depicts an exemplary scenario in which a human-driven host vehicle (HV) approaches a traffic signal with a front vehicle (FV) is in front of the host vehicle.

With reference to FIG. 3, there is shown an exemplary scenario in which the human-driven host vehicle 10 is approaching the traffic signal 22, which will proceed through the intersection at which the traffic signal is located—that is, continue on the same road as the vehicle passes through the intersection. Also, as is shown in FIG. 3, the front vehicle 11 is presently in front of the host vehicle 10. Moreover, the AV 12 may be located behind the HV (on the other side of the HV than the FV) or at another nearby position (in an adjacent lane), although this is not shown in FIG. 3. As shown in FIG. 4, a first exemplary scenario ("Scenario G") is shown in which the prediction window starts on (or during) (indicated by $t_0$) a GREEN light and ends on the same GREEN ("G") light (indicated by $t_T$); a second exemplary scenario ("Scenario YR") is shown in which the prediction window starts on (or during) (indicated by $t_0$) a YELLOW ("Y") light and ends on the next RED ("R") light (indicated by $t_T$); and a third exemplary scenario ("Scenario GYR") is shown in which the prediction window starts on (or during) (indicated by $t_0$) a GREEN light and ends on the next RED light (indicated by $t_T$).

There are other scenarios that are not specifically illustrated in FIGS. 3-4, but the principles discussed with respect to those three exemplary scenarios can be applied to these other scenarios as well and as appreciated by those skilled in the art. There are six base scenarios: G, Y, R, GY, YR, RG. An extended scenario GYR is also discussed, which can be used to evaluate the long-term performances of the model. The first letter of each base (or extended) scenario represents the traffic light phase at the beginning of the prediction window and the last letter of each base (or extended) scenario represents the traffic light phase at the end of the prediction window. The prediction window is the time from $t=t_0-\tau$ to $t_0$ (where $t_0$ is the present time). The host vehicle state $X_t^{HV}$, the context vector $C_t=[X_t^{FV}, X_t^{TL}, TOD_t]$, and/or one or more parts thereof are obtained during the prediction window. This information is then used to obtain a trajectory prediction using the AI vehicle trajectory prediction application. That is, in at least some embodiments, host vehicle state $X^{HV}$ (or parts thereof), including (for example), the longitudinal host vehicle speed $v_x$ and the host vehicle-traffic light distance $d_x$, is obtained a plurality of times (e.g., at a set interval) during the prediction window (i.e., from time $t_0$-τ to $t_0$). Additionally or alternatively, the front vehicle state $X^{FV}$ (or parts thereof) is obtained during the prediction window. The number of samples to be obtained during the prediction window and/or the length or scope of the prediction window can be selected based on the particular implementation or application in which the method/system is being used. Moreover, in some embodiments, the host vehicle state $X^{HV}$ may be associated with a host vehicle prediction window and the front vehicle state $X^{FV}$ may be associated with a front vehicle prediction window; these windows can be set to the same or different time periods, to the same or different sampling rate, etc., which can be adjusted based for the particular application or implementation in which it is used. In some embodiments, the prediction window(s) can be set based on an area or distance from the traffic light or intersection. And, in yet another embodiment, the prediction window(s) can each be tailored for each intersection or traffic signal, and may take into account one or more factors, such as the speed limit of the road, the number of lanes of the road, the length of the traffic signal phases, the phase timings of the traffic signal, etc.

As shown in FIG. 3, various embodiments discussed herein seek to obtain future longitudinal positions and velocities of a host vehicle as a function of time. This problem can be made challenging due to stochastic motions of vehicles near traffic signals. For example, a driver may prefer hard-breaking when the driver approach a red light, while other driver prefers soft-breaking. As another example, a driver may prefer to accelerate hard in a departure scenario, while other drivers prefer soft-departure. Additionally, the reactions of drivers at phase transitions (G to Y, Y to R, or R to G) are different from those at steady phases (G, Y, or R). Another example is where a driver approaches a traffic light at a high speed, and the driver is faced with two competing decisions—that is, to either make a sudden stop or pass through the intersection at which the traffic light is located. In this sense, the problem can be broken down into seven distinct scenarios, three of which are presented in FIG. 4. This breakdown or categorization of the different scenarios is based on the proposition that humans react differently at different traffic phases and timings of traffic signals, which results in the trajectories being significantly different depending on the scenario. For example, a trajectory of a human driver at a GREEN light or phase would be notably different from that at a RED light or phase.

As mentioned above, the AI vehicle trajectory prediction model (or policy, referred to herein collectively "model") as was trained using neural networks for a deterministic model (or a model that predicts the most-probable trajectories), and mixture density networks (MDN) for a probabilistic policy. It was shown that the baseline deterministic neural net model (which utilizes SPaT information) performed far superior than existing methods (which utilizes SPaT information) on a test set of training data. In at least some embodiments, the probabilistic model provides contexts on the stochastic nature of human driving and measures how confident one can be in the predictions. In some embodiments, the probabilistic model is capable of learning multimodal distributions, and thus can accurately capture two competing human policies (pass or stop) in the yellow-light dilemma zone. For the training, validation, and testing, 502,253 samples that 50 distinct vehicles have reported over a span of 27 months (March 2015-July 2017) at a particular section of a road with a signalized intersection (SI). Each vehicle reported its 10 Hz GPS signals (coordinates, speeds, and heading angles), which then were used to calculate $X_t^{HV}$. The traffic light (TL) profiles $X_t^{TL}$ were obtained from a vehicle-to-infrastructure (V2I) communication device installed at the SI, such as the RSE 26. Cameras that were mounted on the front of the host vehicle and facing the area in front of the host vehicle were used to obtain the front vehicle state $X_t^{FV}$. In order to reduce noise in $X_t^{HV}$, $X_t^{TL}$, and $X_t^{FV}$, a least-square polynomial smoothing filter was used, such as that discussed in R. W. Schafer et al., "What is a savitzky-golay filter," IEEE Signal processing magazine, vol. 28, no. 4, pp. 111-117, 2011.

Figure 5A:
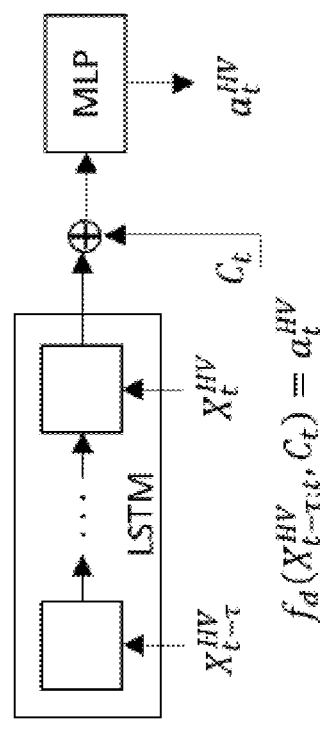
FIG. 5A illustrates an embodiment of an artificial intelligence (AI) vehicle trajectory prediction model according to a deterministic policy.
Figure 5B:
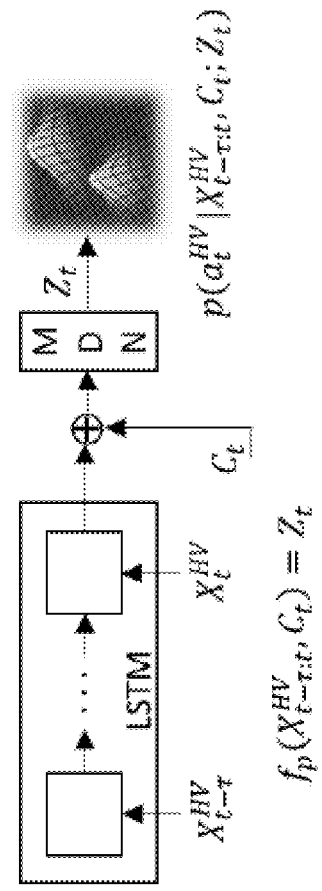
FIG. 5B illustrates an embodiment of an artificial intelligence (AI) vehicle trajectory prediction model according to a probabilistic policy.

With reference to FIGS. 5A-5B, there is shown two embodiments of an AI vehicle trajectory prediction model. FIG. 5A depicts an AI vehicle trajectory prediction model that uses a deterministic policy ($f_d$: $X(t) \rightarrow a_x(t)$), which is obtained by training a neural network on the training data, for example. FIG. 5B depicts an AI vehicle trajectory prediction model that uses a probabilistic policy ($f_p$:$X(t) \rightarrow p(a_x(t)|X(t))$), which is obtained by training a mixture density network (MDN) on the training data. For example, the distribution for the MDN can be a Gaussian mixture. Both of these models use a host vehicle state $X^{HV}$ and a context vector C as input. In the embodiment shown, both the deterministic and probabilistic models use a double stacked-LSTM that takes the host vehicle state $X_{t-\tau:t}^{HV}$ followed by a concatenation with the context vector $C_t=[X_t^{FV}, X_t^{TL}, TOD_t]$. LSTM refers to a long short-term memory (LSTM), which is an artificial recurrent neural network (RNN) architecture.

The concatenated tensor is then fed into a multi-layer perceptron (MLP) for the deterministic model and a MDN for the probabilistic model. The MLP layer outputs at $a_t^{HV}$ whereas the MDN layer outputs the distribution parameters $Z_t$. When Gaussian mixtures are used as the mixture network, the MDN layer outputs the following three parameter sets of the gaussian mixture: mixture weights $\pi_k$, mean of components $\mu_k$, variance of components $\sigma_k$ for k=1, 2, ..., N and N is the number of components. We used N=2 for the yellow light dilemma scenario. Both models were trained on the same data using ADAM optimizer. $f_d$ is learned by minimizing a loss function $L_d$ which is a summation of mean squared error as described below.

$$L_d := \Sigma_{t=1}^T (a_t^{HV} - f_d(X_{t-\tau:t}^{HV}, C_t))^2 \qquad \text{(Equation 1)}$$

$f_p$ is obtained by minimizing a loss function $L_p$ which is a sum of a negative log likelihood.

$$L_p := \Sigma_{t=1}^T -\log(p(a_t^{HV}|X_{t-\tau:t}^{HV}, C_t; Z_t)) \qquad \text{(Equation 2)}$$

According to at least some embodiments, the AI vehicle trajectory prediction model uses a plurality of hidden layers as a part of mapping the input to an output. In the AI vehicle trajectory prediction model that uses the deterministic policy (or "deterministic prediction model" for short) (FIG. 5A), the output is a predicted acceleration $a_x$ of the vehicle. In the AI vehicle trajectory prediction model that uses the probabilistic policy (or "probabilistic prediction model" for short) (FIG. 5B), the output is composed of distribution parameters, which are used to define a distribution of predicted accelerations of the vehicle. This distribution is then sampled to obtain the predicted acceleration $a_x$ of the vehicle.

Figure 6:
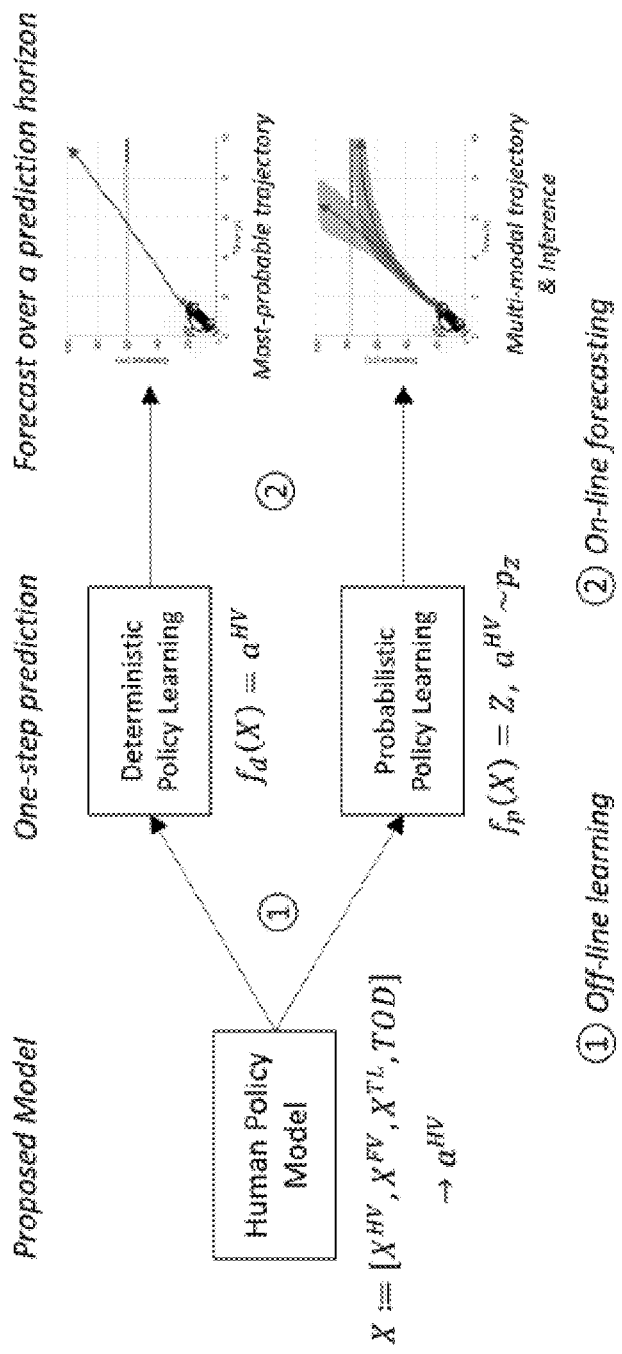
FIG. 6 depicts a flowchart in which an AI vehicle trajectory prediction model that uses a deterministic policy or a probabilistic policy is obtained from off-line learning and that is then used to obtain a trajectory prediction of a human-driven vehicle as the human-driven vehicle approaches and/or departs from a traffic signal.
Figure 8A:
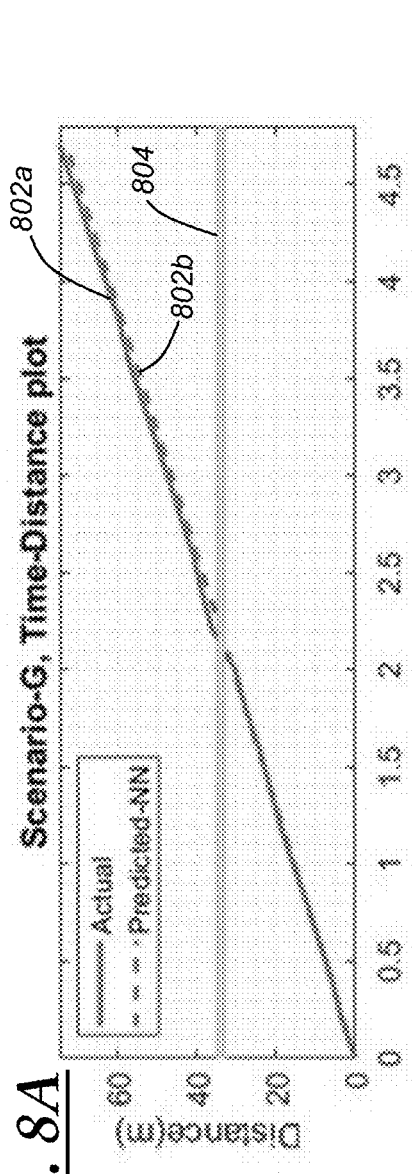
Figure 8B:
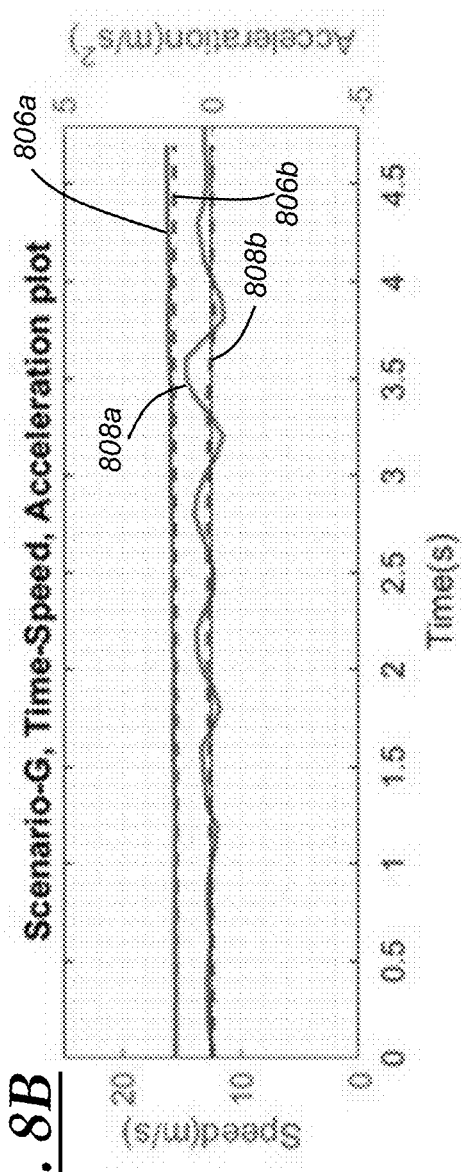

FIG. 6 illustrates an embodiment of the trajectory prediction framework used to obtain the predicted trajectories. The first part of the framework is the off-line learning of the AI vehicle trajectory prediction model which was described previously. The second part is where the trained models are used to obtain trajectory predicts or forecasts over the full prediction horizons. It is an iterative process, where instantaneous predictions and propagations of a vehicle dynamics are alternated between. The one-step propagation of the longitudinal vehicle dynamics is done by utilizing a zero-order hold for discrete dynamics equations described in Equations 3, 4, and 5, which are discussed below.

$$v_{n+1} := v_n + a_n \Delta t_n \quad \text{(Equation 3)}$$

$$d_{n+1} := d_n + 0.5(v_{n+1} + v_n)\Delta t_n \quad \text{(Equation 4)}$$

$$X_{n+1}^{HV} = A_n X_n^{HV} + B_n a_n^{HV} \text{ where} \quad \text{(Equation 5)}$$

$$A_n := \begin{bmatrix} 1 & \Delta t_n \\ 0 & 1 \end{bmatrix}, B_n := \begin{bmatrix} 0.5\Delta t_n \\ \Delta t_n \end{bmatrix}, X_n^{HV} = \begin{bmatrix} d_n \\ v_n \end{bmatrix}.$$

Defining n=0, and n=N as the index for t=0, and t=T, the trajectory prediction over the prediction horizon t=[0, T] are obtained by propagating Equation 5 from n=0 to n=N−1:

$$X_N^{HV} = \prod_{k=0}^{N-1} A_k X_0^{HV} + \prod_{k=1}^{N-1} A_k B_0 a_0^{HV} + \quad \text{(Equation 6)}$$

$$\prod_{k=2}^{N-1} A_k B_1 a_1^{HV} + \ldots + A_{N-1} B_{N-2} a_{N-2}^{HV} + B_{N-1} a_{N-1}^{HV} =$$

$$\prod_{k=0}^{N-1} A_k X_0^{HV} + \prod_{k=1}^{N-1} A_k B_0 f(X_{-n_\tau+1:0}^{HV}, C_0) + \ldots +$$

$$B_{N-1} f(X_{N-n_\tau:N-1}^{HV}, C_{N-1}) :=$$

$$F(X_{1:N-1}^{HV}, X_{-n_\tau+1:0}^{HV}, C_{0:N-1}, \Delta t_{0:N-1})$$

where $f$ can either be $f_d$ or $S(f_p)$. S is a function which returns a sample at $a_t^{HV}$ according to the probability density function (pdf) of $Z_t$ (In case of an uni-modal gaussian distribution, $Z_t=[\mu_t, \sigma_t]$ and $a_t^{HV} \sim N(\mu_t, \sigma_t^2)$). $\tau$, $n_\tau$ each indicates input sequence length in time, and in the number of steps, respectively.

As described in Equation 6, $X_N^{HV}$ is a function (F) of $[X_{1:N-1}^{HV}, X_{-n_\tau+1:0}^{HV}, C_{0:N-1}, \Delta t_{0:N-1}]$. The second term $X_{-n_\tau+1:0}^{HV}$ is obtained at t=0, and the last term $\Delta t_{0:N-1}$ can simply be predetermined at the prediction time based on a required time resolution. Obtaining $C_{0:N-1}$ at the prediction time (t=0) is the main challenge, due to uncertainties in $X_{1:N-1}^{FV}$, $X_{1:N-1}^{TL}$. A simple way to get away with the uncertainties is to simply design the model to predict trajectories ($X_{0:T}^{HV}$) conditioned on only the observed states $[X_{-\tau:0}^{FV}, X_{-\tau:0}^{TL}]$. An example is a model with many-to-many RNN that takes a sequence of past states and returns a sequence of future states. However, this approach does not solve the prediction problem that was discussed in the previous sections and FIGS. 2A-2B.

As briefly mentioned, to solve such a prediction problem (and other prediction/forecasting problems), uncertainties of human-driving can be removed by utilizing the future phases and timings of TLs obtained through, for example, vehicle-to-infrastructure communications. With the access to the future states of TLs, $X_{1:N-1}^{TL}$ can be obtained at the prediction time. In this embodiment, the remaining input to be used is then $X_{1:N-1}^{FV}$, which is predicted based on a variant of the human policy model $f_d$. Specifically, another human policy model ($f_d^{NoFV}$) is trained: $f_d^{NoFV}: [X_{N-n_\tau:N}^{HV}, C'_N] \to a_N^{HV}$ with $C'_N:=[X_N^{TL}, TOD_N]$ taking $X_N^{FV}$ out of the context. After the off-line learning of $f_d^{NoFV}$ is done, the iterative process described early in this section is applied on FV to obtain $X_{1:N-1}^{FV}$ via Equation 6 with $f_d^{NoFV}$. Once $[X_{1:N-1}^{FV}, X_{1:N-1}^{TL}]$ are calculated, the resulting trajectory prediction $X_{1:N}^{HV}$ can be obtained. Note, $X_{1:N}^{HV}$ can simply be predicted using $f_d^{NoFV}$ as well. An ablation study was conducted on $f_d$, $f_d^{NoFV}$ and other two models ($f_d^{NoTL}$, $f_d^{NoFVTL}$) which each represents a model where $X^{TL}$ and $[X^{FV}, X^{TL}]$ are taken out of the context, respectively.

For the probabilistic human policy model, the probability of the resulting trajectory prediction $p(X_{1:N}^{HV})$ can be estimated using the chain rule of probability, which factorizes the joint distribution over N separate conditional probabilities:

$$p(X_{1:N}^{HV} | X_{-n_\tau+1:0}^{HV}, C_{0:k-1}, \Delta t_{0:k-1}) = \quad \text{(Equation 7)}$$

$$\prod_{k=1}^{N} p(X_k^{HV} | X_{1:k-1}^{HV}, X_{-n_\tau+1:0}^{HV}, C_{0:k-1}, \Delta t_{0:k-1})$$

As opposed to the deterministic predicting where the most-probable trajectory is obtained, a resulting trajectory is sampled from a probability distribution. While the probability of a trajectory prediction can be estimated via Equation 7, the probability density function for $X_t^{HV}$ needs to be numerically estimated since the distribution parameter $Z_t$ is obtained via an arbitrarily complex neural network. Thus, Monte Carlo Simulation (see R. Y. Rubinstein and D. P. Kroese, *Simulation and the Monte Carlo method*. John Wiley & Sons, 2016, vol. 10) is utilized to obtain the samples (roll-out trajectories) and kernel density estimation is utilized to approximate the probability density functions of the samples.

With reference to FIG. 7, there is shown an embodiment of a method 200 for obtaining a predicted trajectory of a human-driven host vehicle as the human-driven host vehicle approaches a traffic signal. In at least one embodiment, the method 200 is carried out by the host vehicle. In another embodiment, the method 200 is carried out by another vehicle, such as the AV 12 or the front vehicle 11, that is approaching the traffic signal, or by another vehicle and the host vehicle. In other embodiments, the method 200 is carried out by a traffic signal system and/or one or more remote servers, which can be located at one or more remote facilities. And, in some embodiments, the method 200 is carried out by a combination of one or more vehicles (e.g., the autonomous vehicle 12, the host vehicle 10, and/or the front vehicle 11) and one or more remote servers—that is, one or more steps can be carried out by one or more vehicles and one or more steps can be carried out by the one or more remote servers. Or, in other embodiments, the method 200 is carried out by a combination of one or more vehicles and the traffic signal system, or by a combination of the one or more vehicles, the traffic signal system, and the one or more remote servers. In the discussion of the method 200 below, the trajectory is being predicted for the host vehicle 10 as the host vehicle 10 approaches (or is near or at) the traffic signal 22. In the scenario discussed below, the front vehicle 11 is another vehicle that is approaching (or has approached) (or is otherwise near or at) the traffic signal 22 and in front of the host vehicle. In some scenarios, there may be no front vehicle (or vehicle in front of the host vehicle) at the intersection and, thus, the method 200 may be adapted to address such scenarios, as will be discussed below. While the steps of the method 200 are described as being carried out in a particular order below, it is hereby contemplated that the method 200 can be carried out in any technically feasible order as will be appreciated by those skilled in the art.

As mentioned above, the method 200 is used to obtain a predicted trajectory of a human-driven host vehicle (e.g., the host vehicle 10) as the human-driven host vehicle approaches a traffic signal. In one embodiment, the method 200 is carried out by the AV 12 that is separate from the host vehicle 10 (i.e., the AV and the host vehicle are different vehicles) and that is approaching the traffic signal, or that is otherwise nearby. In at least some of such embodiments where the method 200 is carried out by the AV 12, the AV 12 can obtain the host vehicle state $X^{HV}$ from the host vehicle by use of V2V communications or by V2I communications between the host vehicle 10 and the traffic signal system 20 and V2I communications between the AV 12 and the traffic signal system 20. The method 200 may be carried out by one or more electronic controllers having at least one processor and memory. For example, in one embodiment the method 200 is carried out by the telematics unit of the AV 12. In another embodiment, the method 200 is carried out by one or more remote servers 17 of the remote facility 16 and/or the electronic controller 24 of the traffic signal system 20. And, in yet another embodiment, the method 200 is carried out by a combination of the telematics unit of the AV 12 and one or more remote servers 17.

The method 200 can be initiated in a number of different ways. In one embodiment where the method 200 is carried out by the host vehicle, the method 200 can be initiated by the host vehicle in response to determining that the host vehicle is approaching a traffic signal. For example, the GNSS data of the host vehicle can be used along with geographical/roadway map data to determine that the host vehicle is near and/or approaching a traffic signal. In response, the method 200 can begin with step 210. In another embodiment, the host vehicle can periodically send its GNSS data to a remote server, such as those of the one or more remote facilities. The remote facility can then use the GNSS data along with geographical/roadway map data to determine that the host vehicle is near and/or approaching a traffic signal. In addition, the host vehicle and/or the remote facility can determine that another vehicle is at or approaching the same traffic signal, such as through using GNSS data of that vehicle or other information. In addition, it can be determined that this other vehicle is a human-driven vehicle based on receiving data from the vehicle indicating that it is a human-driven vehicle. In another embodiment, such as those in which the AV carries out the method 200 (or part(s) thereof), the method 200 can be initiated by the AV detecting the presence of a host vehicle and/or detecting that the host vehicle is a human-driven vehicle.

The method 200 begins with step 210, where a host vehicle state $X_t^{HV}$ is obtained, which includes (at least in the present embodiment) a host vehicle-traffic light distance $d_x$ and a longitudinal host vehicle speed $v_x$. In at least one embodiment, the host vehicle-traffic light distance $d_x$ and the longitudinal host vehicle speed $v_x$ (or information used to determine these values, which is referred to as "host vehicle base information" (e.g., a GNSS location of the host vehicle 10 used for determine the distance $d_x$)) are obtained at the host vehicle 10. In one embodiment, the GNSS receiver 32 of the host vehicle 10 receives a plurality of GNSS signals (e.g., GPS signals) and then determines a GNSS location as well as a time based on these signals. This GNSS location is then used to obtain the host vehicle-traffic light distance $d_x$. For example, as mentioned above, the vehicle may have stored geographical/roadway map data that indicates a geographical location (e.g., geographical coordinates) of a reference point corresponding to the traffic signal and/or intersection (referred to as a "traffic signal geographical position"). The traffic signal geographical position is then used along with the GNSS location to determine the host vehicle-traffic light distance $d_x$. The longitudinal host vehicle speed $v_x$ may also be determined based on the GNSS data that is obtained from the GNSS signals.

In some embodiments, the host vehicle state $X_t^{HV}$ is determined or otherwise obtained at the traffic signal system 20 through the use of one or more sensors of the RSE 26 (or of the traffic signal system 20), such as a video detector, other image or electromagnetic sensor, or inductance loop sensor, or by one or more onboard sensors of another nearby vehicle (e.g., a nearby autonomous vehicle). Additionally or alternatively, the host vehicle-traffic light distance $d_x$, the longitudinal host vehicle speed $v_x$, or any host vehicle base information thereof can be determined or otherwise obtained by the traffic signal system 20 through the traffic signal system 20 receiving one or more wireless signals from the host vehicle 10 in embodiments where the host vehicle 10 is a connected vehicle (CV). In some embodiments where the host vehicle 10 is a CV, the host vehicle 10 can use a short-range wireless communications (SRWCs) circuit or chipset that enables SRWCs (e.g., Wi-Fi™, Bluetooth™) The host vehicle 10 and/or the traffic signal system 20 can send the host vehicle state $X_t^{HV}$ to the AV 12 via V2V or V2I communications.

In some embodiments, the host vehicle 10 can include one or more on-board sensors that are capable of determining the host vehicle-traffic light distance $d_x$, the longitudinal host vehicle speed $v_x$, or any host vehicle base information thereof—for example, the host vehicle 10 can include a digital camera that captures images of the host vehicle's surroundings and then uses object recognition (or other techniques) to determine a geographical location of the host vehicle based on recognizing landmarks in conjunction with geographical/roadway map data that associates the identifiable landmarks with a geographical location. This geographical location of the host vehicle 10 then be used along with a geographical location of the traffic signal (which can be pre-stored at the remote facility 16 (or municipal facility 18)) to determine the host vehicle-traffic light distance $d_x$. The host vehicle-traffic light distance $d_x$, the longitudinal host vehicle speed $v_x$, or any host vehicle base information thereof can be received or otherwise obtained by the one or more remote servers 17. The remote server(s) 17 can receive the host vehicle-traffic light distance $d_x$ and the longitudinal host vehicle speed $v_x$ from the traffic signal system 20 or from the host vehicle 10. It should be appreciated that the host vehicle-traffic light distance $d_x$ and the longitudinal host vehicle speed $v_x$ do not necessarily have to be obtained in the same manner—for example, the host vehicle-traffic light distance $d_x$ can be obtained from a sensor at the RSE 26 and then sent to the remote server(s) 17, and the longitudinal host vehicle speed $v_x$ can be determined at the host vehicle 10 and then sent to the remote server(s) 17 directly (i.e., without first being sent to the host vehicle 10 and/or the traffic signal system 20). The method 200 then continues to step 220.

In step 220, a traffic signal state $X_t^{TL}$ is obtained, which includes a traffic light signal phase $P_t$ and an traffic light signal timing $T_t$ are obtained. According to at least some embodiments, the traffic signal state $X_t^{TL}$ can include other state information concerning the state of the traffic signal. The traffic light signal phase $P_t$ and the traffic light signal timing $T_t$ (or information used to determine these values, which is referred to as "traffic signal base information" (e.g., the times at which the phase of the traffic light changes)) may be known to the municipal facility 18 and stored in a database of the municipal facility 18. This information can then be sent to the remote server(s) 17 and/or to the host vehicle 10. Additionally or alternatively, this information can be stored at the traffic control system 20 and then sent to the remote server(s) 17 the AV 12, and/or to the host vehicle 10. For example, the traffic control system 20 and/or the municipal facility 18 can store a schedule of times that indicates the times at which the traffic light is of a particular phase or signal (e.g., RED, GREEN, YELLOW). In some traffic light control systems, the output of the traffic signal may be dynamic—for example, the traffic light may only switch to GREEN for a road when a vehicle is detected at the traffic light on the road. In such embodiments, the traffic control system 20 can record and send this information of the phase change to the host vehicle 10, the municipal facility 18, and/or the remote server(s) 17. The method 200 continues to step 230.

In step 230, a front vehicle state $X_t^{FV}$ is obtained, which includes (at least in the present embodiment) a front-host vehicle distance $r_t$ and a front-host vehicle speed $\dot{r}_t$. In some embodiments where the front vehicle 11 is a CV, the front-host vehicle distance $r_t$ and the front-host vehicle speed $\dot{r}_t$ (or information used to determine these values, which is referred to as "front vehicle base information" (e.g., a GNSS location of the front vehicle 11 used for determine the distance $r_t$ or speed $\dot{r}_t$)) can be initially determined or otherwise obtained at the front vehicle 11, such as through use of a GNSS receiver of the front vehicle 11. The GNSS data of the front vehicle 11 (or "front vehicle GNSS data") can then be sent via SRWC (e.g., V2V communications) to the host vehicle 10. The front vehicle GNSS data is then used along with the host vehicle GNSS data (as obtained in step 210, for example) to determine the front-host vehicle distance $r_t$ and the front-host vehicle speed $\dot{r}_t$.

Additionally or alternatively, the front-host vehicle distance $r_t$ and the front-host vehicle speed $\dot{r}_t$ (or front vehicle base information) is determined or otherwise obtained at the traffic signal system 20 through the use of one or more sensors of the RSE 26 (or of the traffic signal system 20), such as a video detector, other image or electromagnetic sensor, or inductance loop sensor. Additionally or alternatively, the front-host vehicle distance $r_t$ and the front-host vehicle speed $\dot{r}_t$ (or front vehicle base information) can be determined or otherwise obtained by the traffic signal system 20 through the traffic signal system 20 receiving one or more wireless signals from the front vehicle 11 in embodiments where the front vehicle 11 is a connected vehicle (CV). In some embodiments where the front vehicle 11 is a CV, the front vehicle 11 can use a short-range wireless communications (SRWCs) circuit or chipset that enables SRWCs (e.g., Wi-Fi™, Bluetooth™). The traffic signal system 20 may then send the front-host vehicle distance $r_t$ and the front-host vehicle speed $\dot{r}_t$ (or front vehicle base information) to the host vehicle 10 or the AV 12 via V2I or other suitable communications. Or, in another embodiment, the front vehicle 11 and/or the traffic signal system 20 can send the front vehicle position (with respect to earth or the traffic light) (e.g., GNSS position) to the AV 12, which can then use the host vehicle position (e.g., GNSS position) to determine the front-host vehicle distance $r_t$ and the front-host vehicle speed $\dot{r}_t$ (or front vehicle base information).

In some embodiments, the host vehicle 10 and/or AV 12 can include one or more on-board sensors that are capable of obtaining information that is capable of being used to determine the front-host vehicle distance $r_t$ and the front-host vehicle speed $\dot{r}_t$ (or front vehicle base information or other front vehicle state information)—for example, the host vehicle 10 can include a digital camera that is positioned to face an area in front of the host vehicle 10 so that images of the front vehicle may be captured. As another example, the AV 12 can include one or more sensors (e.g., radar, lidar, and/or camera) that captures information pertaining to the front vehicle 11, such as front vehicle base information that can be used to calculate or determine the front-host vehicle distance $r_t$ and the front-host vehicle speed $\dot{r}_t$. Certain techniques can then be used to determine a distance between the host vehicle 10 and the front vehicle 11 based on the captured images (or image data). As an example, an image recognition technique may be employed that identifies an area of the image data corresponding to a license plate of the front vehicle. The standard size of the license plate may also be known and then used (along with camera attributes, for example) to determine the distance between the front vehicle and the host vehicle. Moreover, the change in front-host vehicle distance $r_t$ over time can be used to determine the front-host vehicle speed $\dot{r}_t$.

The front-host vehicle distance $r_t$ and the front-host vehicle speed $\dot{r}_t$ (or front vehicle base information) can be received or otherwise obtained by the one or more remote servers 17. The remote server(s) 17 can receive the front-host vehicle distance $r_t$ and the front-host vehicle speed $\dot{r}_t$ (or front vehicle base information) from the traffic signal system 20 or from the front vehicle 11 or the host vehicle 10. It should be appreciated that the front-host vehicle distance $r_t$ and the front-host vehicle speed $\dot{r}_t$ do not necessarily have to be obtained in the same manner. The method 200 then continues to step 240.

It should be appreciated that the various variables discussed above are all reflect their information taken at or very close to the same time (i.e., within a maximum allowable time difference), which can be, for example, 2 seconds, 1 second, 500 milliseconds, 250 milliseconds, 125 milliseconds, 100 milliseconds, or 50 milliseconds. The times reflected by each of these variables is referred to as an "associated time" and, when the associated times are within a maximum allowable time difference, it can be said that each of these associated times correspond to a time when the human-driven vehicle approaches the traffic signal. For example, the associated time of the host vehicle-traffic light distance $d_x$ represents the time at which the vehicle is determined to be a distance $d_x$ from the traffic light (or stop line). As another example, the associated time of the traffic light signal phase $P_t$ is a time at which (or is a range of time that includes a time at which) the status of the traffic light is determined to be phase $P_t$. As yet another example, the associated time of the elapsed phase time is a time at which (or is a range of time that includes a time at which) the amount of time between the current phase and the previous phase is determined to be equal to $T_t$. The maximum allowable time difference of any one of the associated times with respect to any other one of the associated times can be set based on the particular application or system in which the method is being implemented, as will be appreciated by those skilled in the art. In one embodiment, the maximum allowable time difference can be predetermined for a particular application. In other embodiments, the maximum allowable time difference can be dynamically adjusted based on the traffic signal or intersection that the vehicle is approaching. In at least some embodiments, the closer in time that these associated times are with respect to one another, the more accurate the determination of the predicted trajectory.

In step 240, a time of day TOD is determined that represents a time of the day of the associated times of the variables obtained in steps 210-230. The detail or granularity of the time of day TOD can be set based on the particular AI vehicle trajectory prediction model being used. The granularity of the time of day TOD can be by hour (e.g., TOD=5, when it is 5 AM), by the half-hour (e.g., TOD=5.5, when it is 5:30 AM), by the minute (e.g., TOD=5.1, when it is 5:06 AM), or by any other suitable degree as appreciated by those skilled in the art. This granularity may depend on the particular application in which the time of day TOD will be used. For example, a country road may not have traffic precipitate as quickly as a city or downtown road and, thus, the granularity used in the AI vehicle trajectory prediction model for the city or downtown road may be much smaller than that used for the country road—for example, the granularity in the time of day TOD for the city or downtown road may be by the minute whereas the granularity in the time of day TOD for the country road may be by the hour. The time of day TOD value can be obtained based on the associated times of the various variables and may be determined by the device or system carrying out the method 200, such as the remote server(s) 17 or the AV 10. The method 200 continues to step 250.

In step 250, the host vehicle state $X_t^{HV}$, the traffic light state $X_t^{TL}$, and the front vehicle state $X_t^{FV}$ are provided as inputs into an artificial intelligence (AI) vehicle trajectory prediction application. This can include, for example, providing the host vehicle-traffic light distance $d_x$, the longitudinal host vehicle speed $v_x$, the traffic light signal phase $P_t$, the traffic light signal timing $T_t$, the front-host vehicle distance $r_t$, the front-host vehicle speed $\dot{r}_t$, and the time of day TOD into the artificial intelligence (AI) vehicle trajectory prediction application. The AI vehicle trajectory prediction application can be embodied by computer instructions stored on memory. These computer instructions can be executed by a processor of the remote server(s) 17 or the host vehicle 10 (or other suitable device) and, when the computer instructions are executed, the executing device or system (e.g., the remote server(s) 17, the host vehicle 10) then can provide input into the AI vehicle trajectory prediction application, which can then process the inputs according to the AI vehicle trajectory prediction model that the AI vehicle trajectory prediction application is built on and implements. The method 200 continues to step 260.

In step 260, the predicted trajectory of the human-driven host vehicle is determined using the AI vehicle trajectory prediction application. The output of the AI vehicle trajectory prediction application can be represented in a number of ways, and includes information that is used to determine the predicted trajectory of the host vehicle. In one embodiment, the output of the AI vehicle trajectory prediction application is the predicted trajectory and, in other embodiments, the output of the AI vehicle trajectory prediction application is information used to obtain or derive the predicted trajectory. Also, it should be appreciated that the predicted trajectory can be represented in a number of different ways. For example, the output can be an acceleration, such as a longitudinal acceleration $a_x$, of the human-driven host vehicle, which includes the direction and magnitude of the acceleration. The acceleration $a_x$ can be used to determine the predicted trajectory as well as other properties of the human-driven host vehicle, such as its velocity (including direction and magnitude), as well as its position over time. In another example, the output of the AI vehicle trajectory prediction application can be a time-position plot (or a collection of time, position pairs) and this can be used to represent the predicted trajectory and the position of the human-driven host vehicle over time. The method 200 then ends.

In some embodiments, any one or more of steps 210-260 can be carried out over a plurality of iterations so as to obtain a more accurate predicted trajectory. For example, a prediction window can be predetermined (or determined at a time prior to or during one or more steps of the method), and the inputs (those obtained in steps 210-240) can be obtained a plurality of times (e.g., one time for each iteration), such as according to a predetermined interval. Numerous predicted trajectories can then be obtained and then used to obtain a final predicted trajectory, which can include averaging each of the predicted trajectories, averaging each of the predicted trajectories according to an associated confidence score (i.e., each prediction is weighted based on its associated confidence score), or according to other methods.

In some embodiments, the AI vehicle trajectory prediction application can take other variables into consideration, such as the number of lanes of the roadway at the intersection, the type of traffic signal, the speed limit of the roadway, past human-driving behavior at one or more traffic signals, etc. In such embodiments, the AI vehicle trajectory prediction model can be learned or generated based on the inputs to be provided into the AI vehicle trajectory prediction application.

In some embodiments, the method 200 may include determining whether a front vehicle is present; that is, whether there is a vehicle between the host vehicle and the intersection that the host vehicle is approaching. For example, the host vehicle 10 may use onboard sensors, such as a radar, lidar, or camera, to determine whether a front vehicle is present. Or, the traffic signal system 20 may use sensors to determine whether a front vehicle is present, which may communicate this to the host vehicle 10. When it is determined that a front vehicle is not present, then certain default or predetermined values may be set as the front vehicle state $X_t^{FV}$ in place of values that would actually be determined were a front vehicle present or detected. In another embodiment, the host vehicle 10, the AV 12, or other device/system carrying out the method 200 may select a different AI vehicle trajectory prediction application or policy, such as one that does not take into consideration information concerning a front vehicle.

In at least some embodiments, the predicted trajectory and/or other information derived therefrom can be sent to one or more other devices. For example, in embodiments where the remote server(s) 17 carry out steps 250 and 260, the predicted trajectory can be sent to the front vehicle 11, the AV 12, or other nearby vehicle, which can then use the predicted trajectory for purposes of autonomous driving and/or for other uses. For example, in one embodiment, the V 12 receives the predicted trajectory of the host vehicle 10 and then determines an autonomous vehicle action based on the predicted trajectory, such as determining a planned trajectory for the AV 12 to propel itself along. The autonomous vehicle action can be actuating a braking device of the AV 12, actuating a steering mechanism of the AV 12, or accelerating the AV 12. In some embodiments, the AV 12 carries out the method 200, which can include the AV 12 receiving the host vehicle state from the host vehicle (e.g., via V2V communications or through detection using onboard sensors of the AV) and the traffic signal state from the traffic signal system 20 (or from the host vehicle 10 or remote server). Also, the AV 12 can receive the front vehicle state (or front vehicle base information) from the front vehicle 11 (e.g., via V2V communications or through detection using onboard sensors of the AV), or from the host vehicle 10.

In some embodiments, a next phase time may be used as a part of the input into the AI vehicle trajectory prediction application. The next phase time is the amount of time until the next traffic signal phase change (e.g., when the light if RED, the next phase time is the amount of time until the light changes to GREEN). In one embodiment, the next phase time can be used in place of the traffic light signal timing $T_r$. And, in another embodiment, a predicted next phase time may be used as a part of the input into the AI vehicle trajectory prediction application. The predicted next phase time is the predicted amount of time until the next traffic signal phase change (e.g., when the light if RED, the next phase time is the predicted amount of time until the light changes to GREEN). This may be useful for scenarios where the traffic signal phase timing is dynamically determined, such as when the traffic signal phase timing depends on whether an inductance loop detector has detected a vehicle at the traffic signal.

Additionally, in some embodiments, the predicted trajectory can be stored in a database or otherwise at the remote facility 16 (or other remote facility (e.g., municipal facility 18)) and used for various purposes. One such purpose can be to further or continuously train and update the AI vehicle trajectory prediction model and application. In some such embodiments, the actual trajectory of the human-driven vehicle can be determined at some later time (i.e., a time after the method 200) and then this actual trajectory can be compared to the predicted trajectory so as to inform the system of the accuracies of the prediction. This actual trajectory can thus be utilized as feedback to the AI vehicle trajectory prediction model and application, and then used to further improve the AI vehicle trajectory prediction model and application.

Figure 9C:
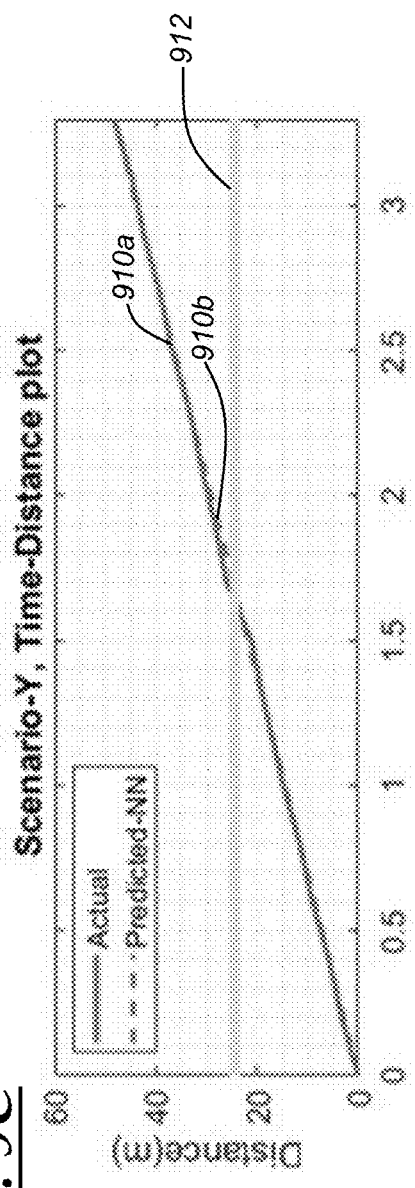
Figure 9D:
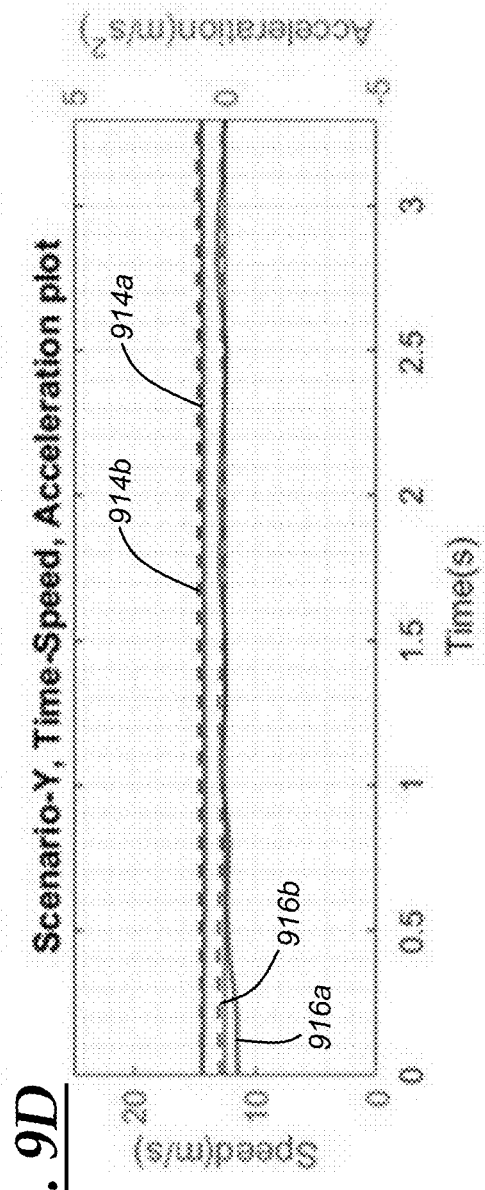
Figure 10A:
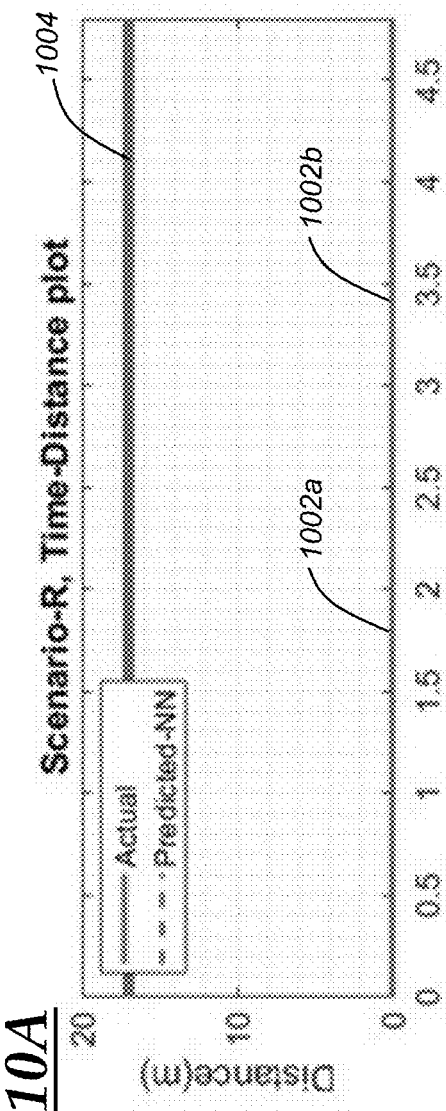
FIGS. 10A-10D depict predicted and actual trajectories of the deterministic model for a R scenario according to two samples.
Figure 10B:
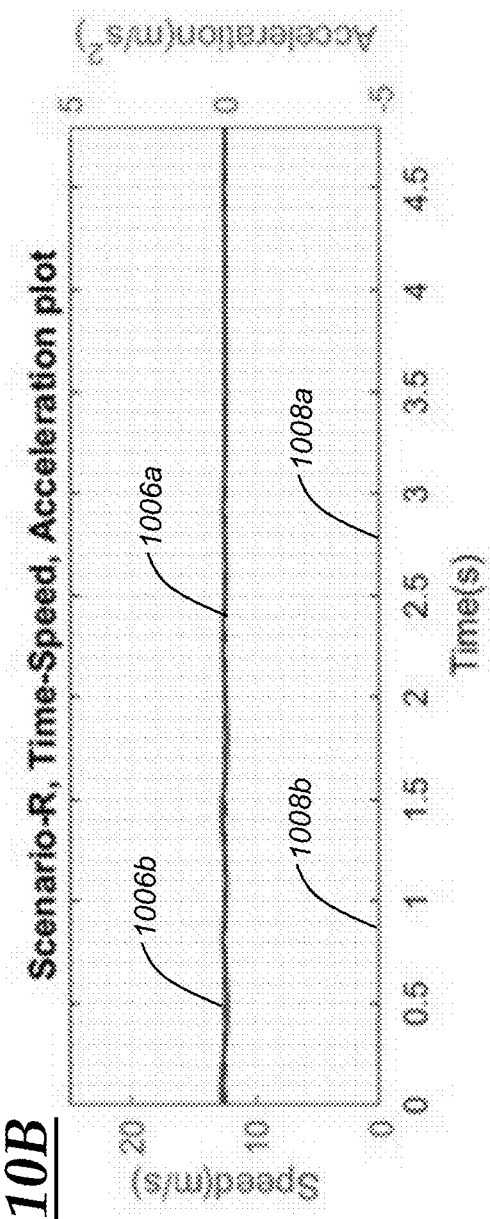
Figure 10C:
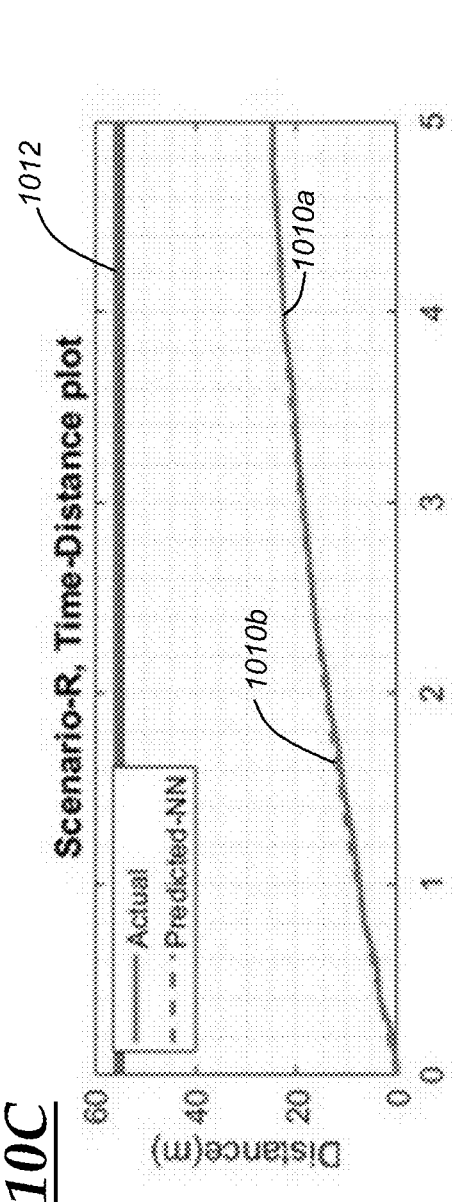
Figure 10D:
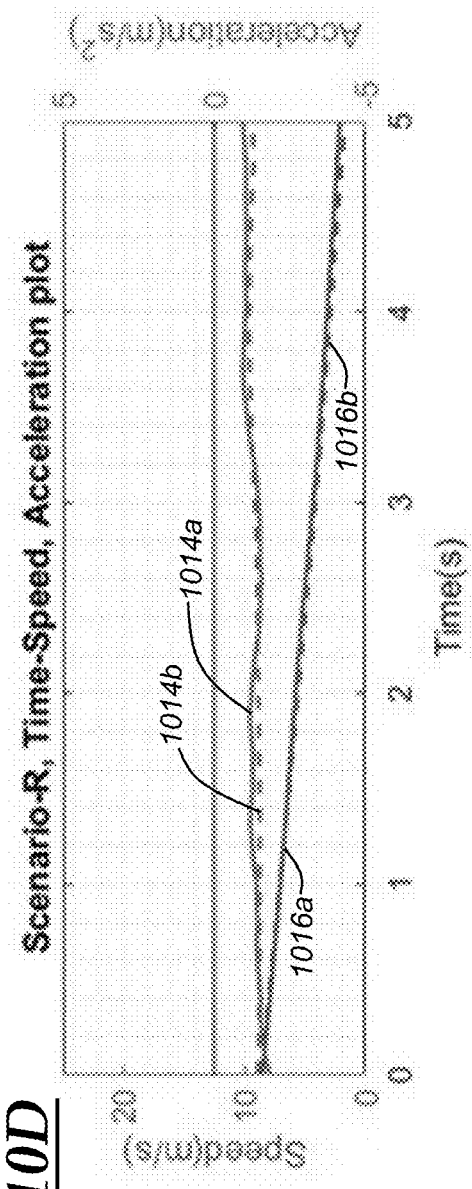
Figures 11A, 11B:
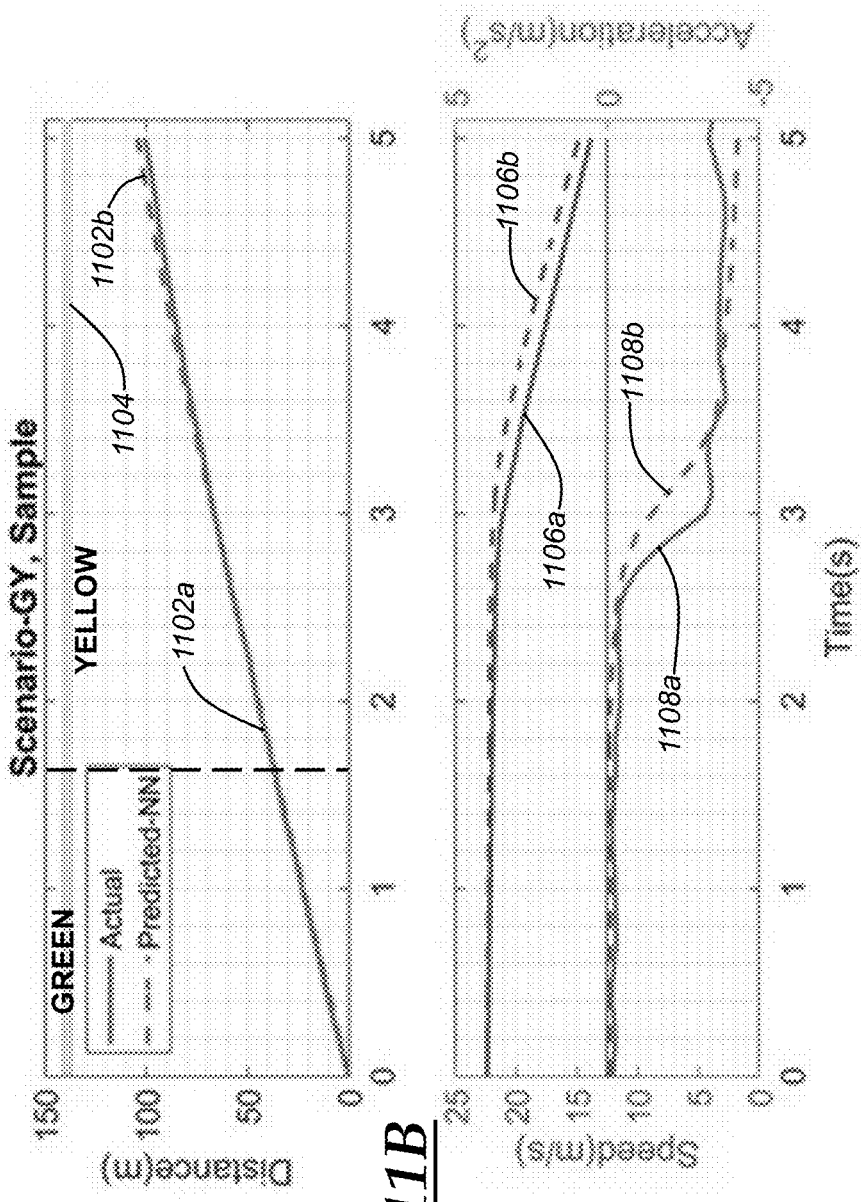
FIGS. 11A-11D depict predicted and actual trajectories of the deterministic model for a GY scenario according to two samples.
Figures 11C, 11D:
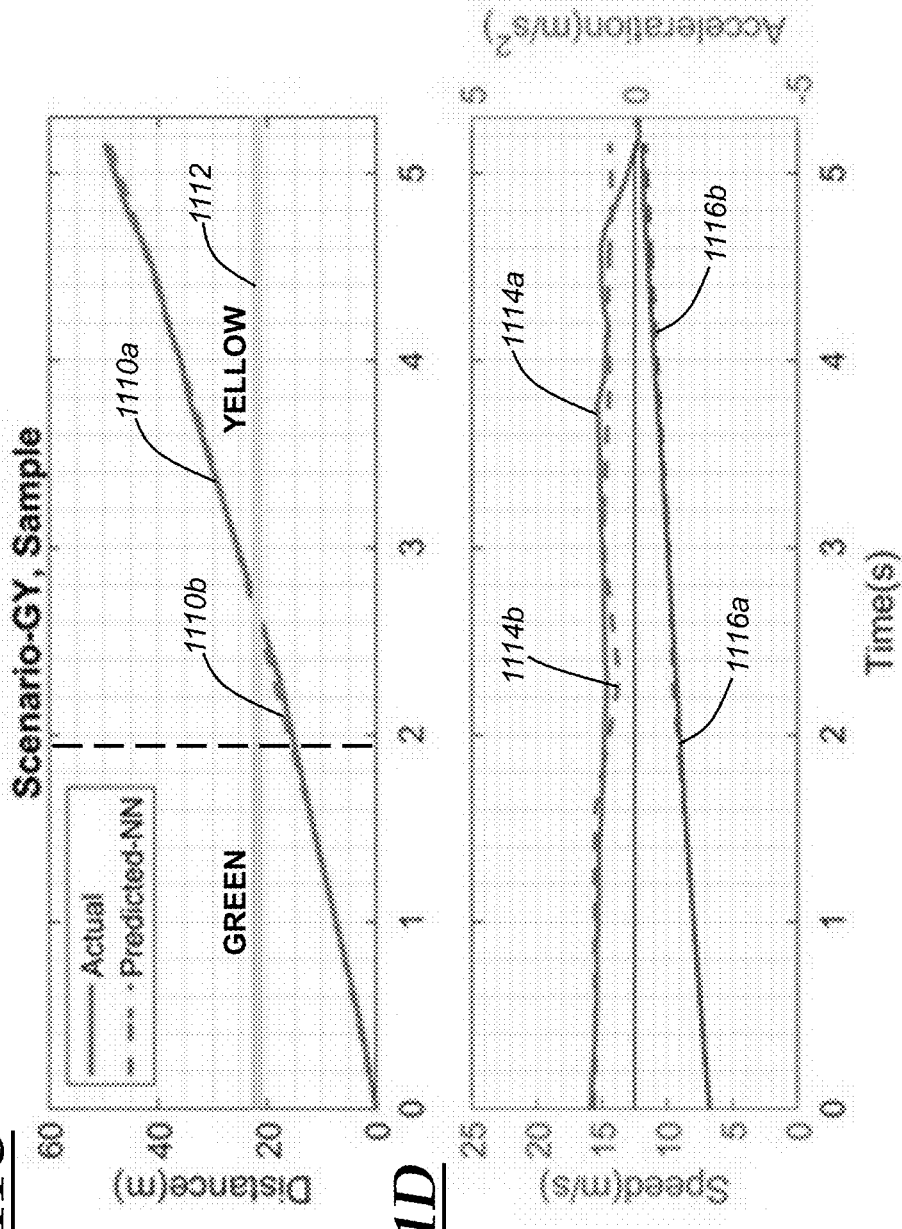
Figures 12A, 12B:
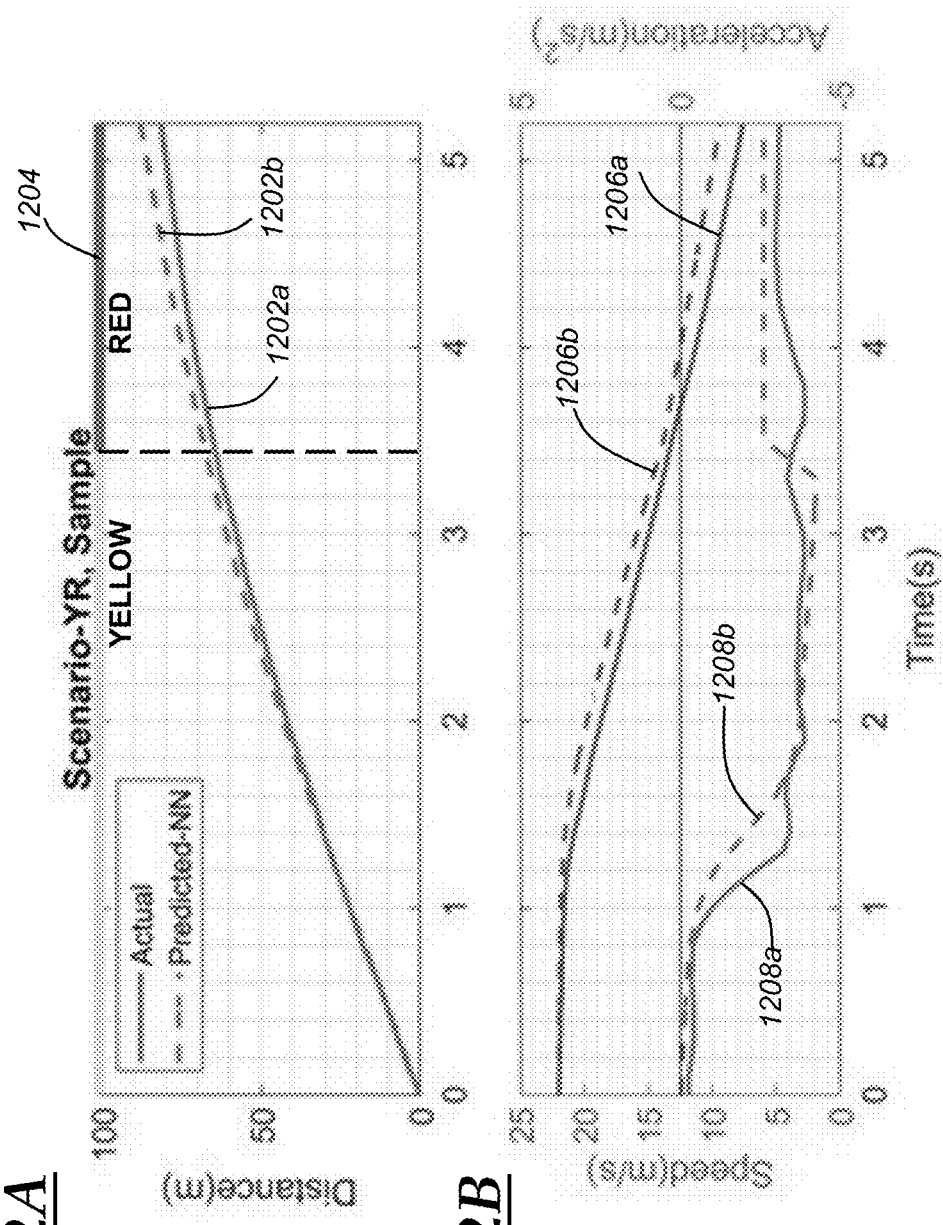
FIGS. 12A-12D depict predicted and actual trajectories of the deterministic model for a YR scenario according to two samples.
Figures 12C, 12D:
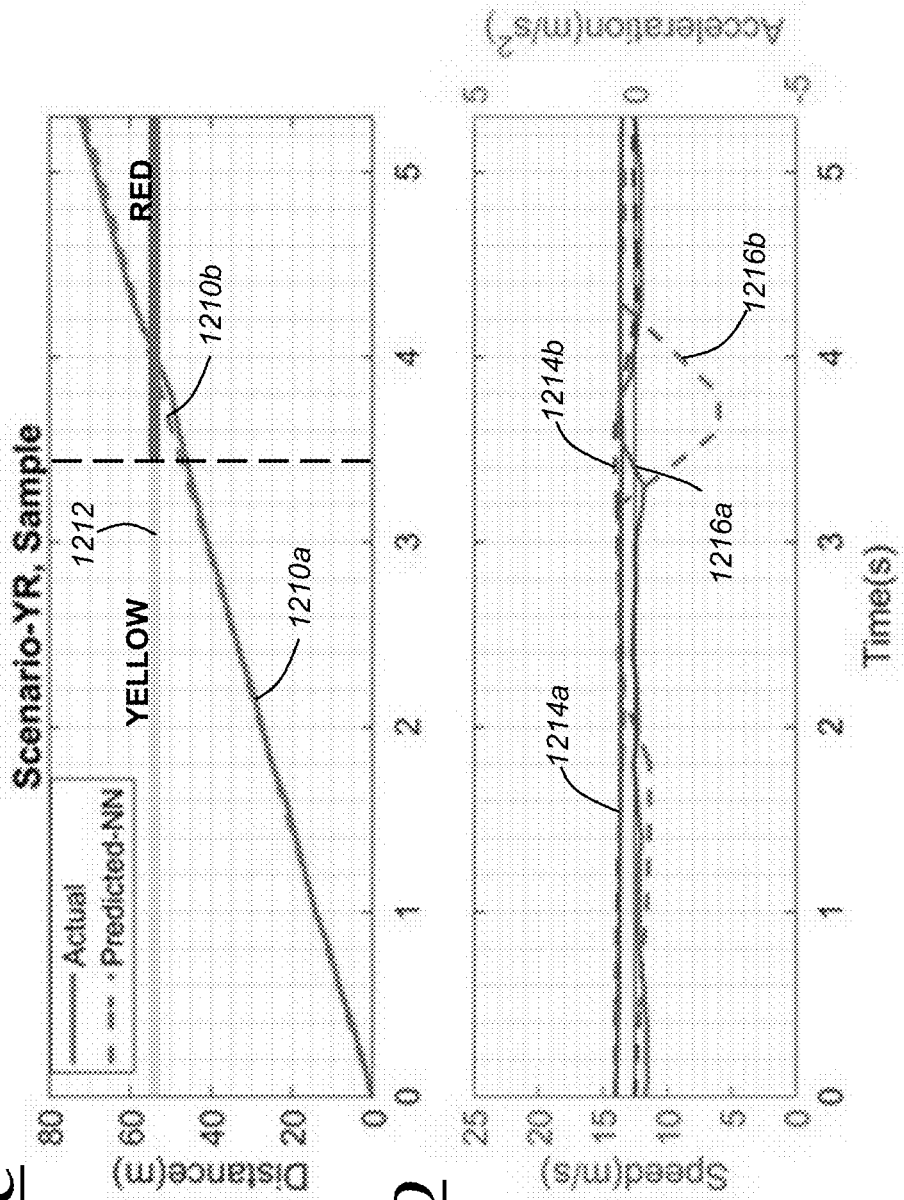
Figure 13A:
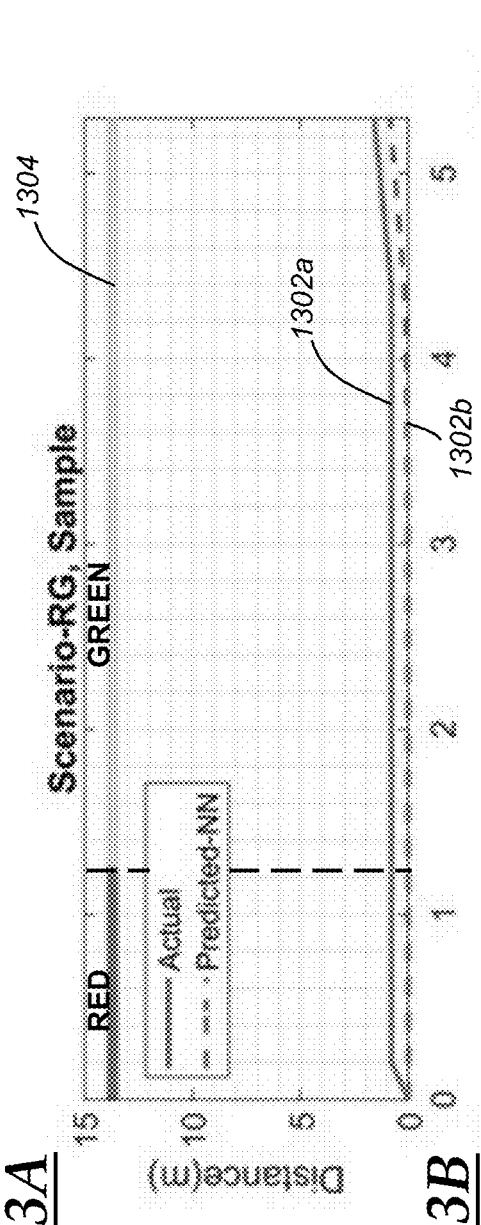
FIGS. 13A-13D depict predicted and actual trajectories of the deterministic model for a RG scenario according to two samples.
Figure 13B:
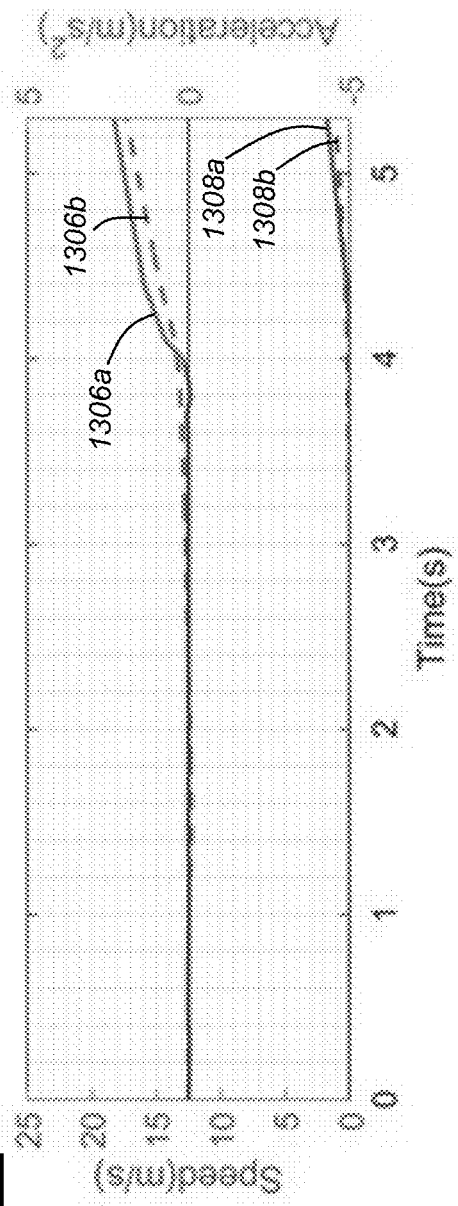
Figures 13C, 13D:
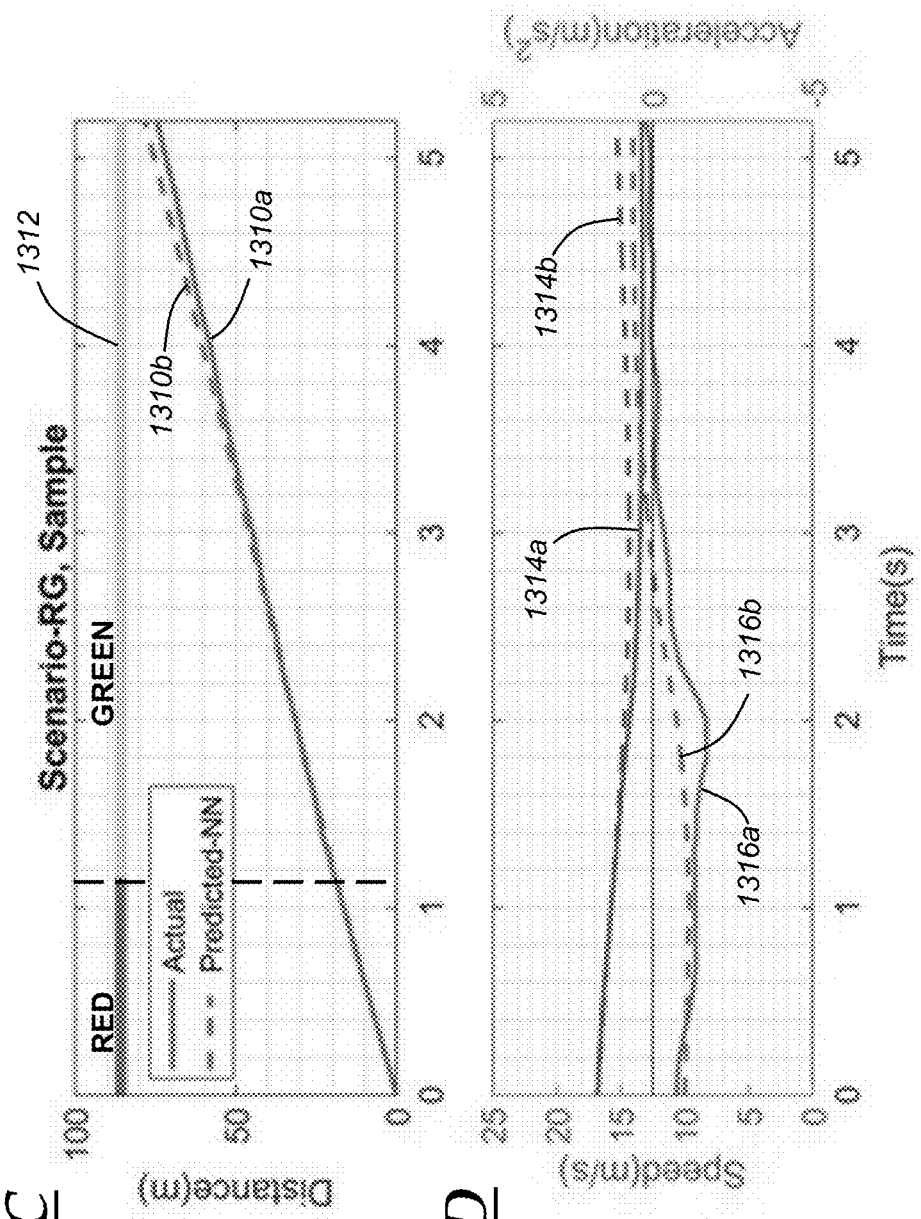
Figure 14A:
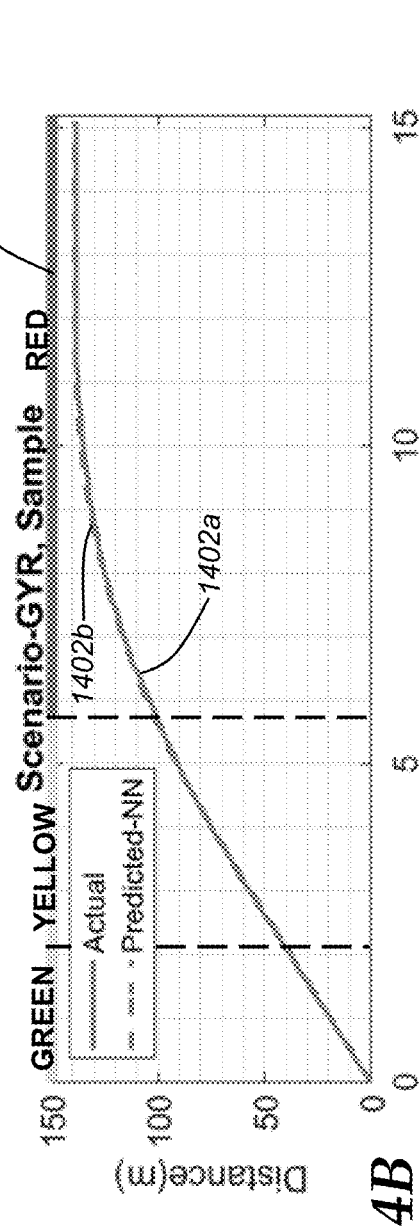
FIGS. 14A-14B depict predicted and actual trajectories of the deterministic model for a GYR scenario according to one sample.
Figure 14B:
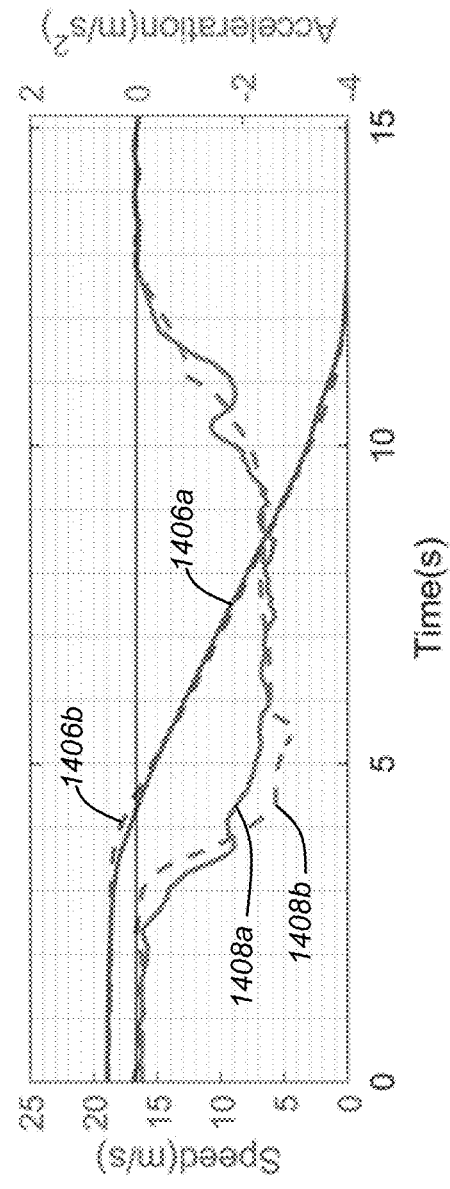

Results. In this section, prediction results are presented for all the base scenarios (i.e., G, Y, R, GY, YR, RG), and an extended scenario GYR to evaluate long-term performances. The resulting trajectories of the deterministic model (or policy) (or a model or policy that predicts the most-probable trajectories) for the scenarios G, Y, R are presented in FIGS. 8A-D, 9A-D, and 10A-D. The resulting trajectories of deterministic model (or policy) for the scenarios GY, YR, RG are depicted in FIGS. 11A-D, 12A-D, and 13A-D. FIGS. 8A-D depict trajectories of the deterministic model for the scenario G according to two samples, with the first sample corresponding to FIGS. 8A-B and the second sample correspond to FIGS. 8C-D. Likewise, FIGS. 9A-B depict trajectories of the deterministic model for the scenario Y according to a first sample, FIGS. 9C-D depict trajectories of the deterministic model for the scenario Y according to a second sample, FIGS. 10A-B depict trajectories of the deterministic model for the scenario R according to a first sample, FIGS. 10C-D depict trajectories of the deterministic model for the scenario R according to a second sample. Also, in a likewise manner, FIGS. 11A-D, 12A-D, and 13A-D depict trajectories of the deterministic model for the scenarios GY, YR, and RG, respectively, for two samples. FIGS. 14A-B depict trajectories of the deterministic model for the scenario GYR for one sample. For FIGS. 8A-13D, all trajectories were obtained at time t=0 by running the iterative predictions and propagations of the dynamics every 0.2 s, over the prediction horizon (5 s).

Each of FIGS. 8A, 8C, 9A, 9C, 10A, 10C, 11A, 11C, 12A, 12C, 13A, 13C, and 14A depict a time-distance plot showing the actual trajectory (solid line) (802a, 810a, 902a, 910a, 1002a, 1010a, 1102a, 1110a, 1202a, 1210a, 1302a, 1310a, 1402a), the predicted trajectory (dashed line) (802b, 810b, 902b, 910b, 1002b, 1010b, 1102b, 1110b, 1202b, 1210b, 1302b, 1310b, 1402b), and the traffic light (804, 812, 904, 912, 1004, 1012, 1104, 1112, 1204, 1212, 1304, 1312, 1404). Each of FIGS. 8B, 8D, 9B, 9D, 10B, 10D, 11B, 11D, 12B, 12D, 13B, 13D, and 14B depict a time-speed plot and a time-acceleration plot showing the actual speed (solid line) (806a, 814a, 906a, 914a, 1006a, 1014a, 1106a, 1114a, 1206a, 1214a, 1306a, 1314a, 1406a), the predicted speed (dashed line) (806b, 814b, 906b, 914b, 1006b, 1014b, 1106b, 1114b, 1206b, 1214b, 1306b, 1314b, 1406b), the actual acceleration (solid line) (808a, 816a, 908a, 916a, 1008a, 1016a, 1108a, 1116a, 1208a, 1216a, 1308a, 1316a, 1408a), the predicted acceleration (dashed line) (808b, 816b, 908b, 916b, 1008b, 1016b, 1108b, 1116b, 1208b, 1216b, 1308b, 1316b, 1408b). In FIGS. 11A, 11C, 12A, 12C, 13A, 13C, and 14 the vertical dashed line indicates a phase change of the traffic signal.

From the training data, a large number of distinct sample trips for each base scenario and the extended scenario were obtained. Among all the trips, six (6) sample trips for the scenarios GY, YR, and RG were selected and their prediction results are depicted in FIGS. 11A-D, 12A-D, and 13A-D. FIGS. 8A-D, 9A-D, and 10A-D show deterministic (or most-probable) trajectory predictions on sample trips for the scenario G, Y, and R. The two scenario G examples depict when vehicle coasts in green phases through the signalized intersections. The scenario Y in the first example (FIGS. 9A-B) depicts an instance when vehicles slows down as it approaches to the intersection. The scenario Y in the second example (FIGS. 9C-D) describes an instance where a vehicle passes through the intersection, maintaining its speed. The scenario R in the first example (FIGS. 10A-B) describes an example when a vehicle is at stop. The scenario R in the second example (FIGS. 10C-D) describes a prediction instance where a vehicle slows down as it approaches to the intersection.

FIGS. 11A-D, 12A-D, and 13A-D shows deterministic (or most-probable) trajectory predictions on sample trips for the scenarios GY, YR, and RG. The scenario GY in the first example (FIGS. 11A-B) presents an instance when a vehicle reacts to a phase shift to yellow and decides to stop before the intersection. The scenario GY in the second example (FIGS. 11C-D) depicts an instance when a vehicle decides to pass through the intersection by speeding up. The scenario YR in the first example (FIGS. 12A-B) depicts an instance when a vehicle slows down as it approaches to the intersection. The scenario YR in the first example (FIGS. 12C-D) is an example where the human driver chose to pass through the intersection in a RED phase. The prediction algorithm was able to predict this behavior that violates a traffic rule. The scenario RG in the first example (FIGS. 13A-B) describes an example when a vehicle departs as the phase shifted to GREEN. Here, one could infer that the vehicle is at a queue based on the position of the vehicle and the length of the vehicle as it is stationary. Again, the prediction algorithm described herein was able to predict the moment when the vehicle started the departure, capturing the existence of a queue formed near the intersection. The scenario RG in the first example (FIGS. 13C-D) describes an instance where the phase was originally red and shifted to green, which made the vehicle slowed down for the first few seconds.

FIGS. 14A-B shows a deterministic (or most-probable) trajectory prediction on a sample trip for the GYR scenario. The prediction horizon is 15 s, meaning that the 15 s long trajectory were obtained at t=0. Predictions were made every 0.2 s. Although the prediction horizon (15 s) is much longer than the sample trips in FIGS. 8A-13D, the most-probable position, speed, and acceleration predictions were qualitatively almost identical to the actual position, speed, and acceleration profile of the human driver. Note that transient response of the human-driver in the phase shift from green to yellow (as shown as the delayed deceleration, around t=3.5 s), and general trends in the phase shifts GY and YR were captured.

Results for particular models. The discussion below is divided into four (4) sections. In Section A, the resulting trajectory predicts are presented for 4 examples sampled from our dataset to visualize the impact of $X^{TL}$. Furthermore, the utilization of phases and timings of TLs is shown to help the proposed model to accurately predict long-term trajectories. In Section B, a set of metrics to evaluate the performance of trajectory predictions are described. And, an ablation study is discussed Section C. The ablation study was designed to test the 4 variants of our deterministic models ($f_d$, $f_d^{NoFV}$, $f_d^{NoTL}$, $f_d^{NoFVTL}$) on the test set (total 3,111 sample episodes of the seven scenarios discussed above). In Section D, a demonstration is provided on how the probabilistic prediction algorithm can be utilized to tackle a scenario with competing policies, such as the yellow-light dilemma zone scenario, which is discussed below.

Section A. In order to investigate the impact of $X^{TL}$, four (4) variants of the deterministic policy models are trained, and those four (4) models are each used to compute the trajectory predictions over a fixed prediction horizon via Equation 6. The four policy models are $f_d$, $f_d^{NoFV}$, $f_d^{NoTL}$, $f_d^{NoFVTL}$, which are each named depending on which features are used as the context C. Denoting $C^{mode}$ as the context input for a deterministic policy model $f_d^{mode}$, $C^{NoFVTL}:=[TOD]$, $C^{NoTL}:=[X^{FV}, TOD]$, $C^{NoFV}:=[X^{TL}, TOD]$, $C:=[X^{FV}, X^{TL}, TOD]$. The proposed models of $f_d$, and $f_d^{NoFV}$ provide more accurate predictions of the trajectory of the host vehicle, which is discussed more below.

Figure 15A:
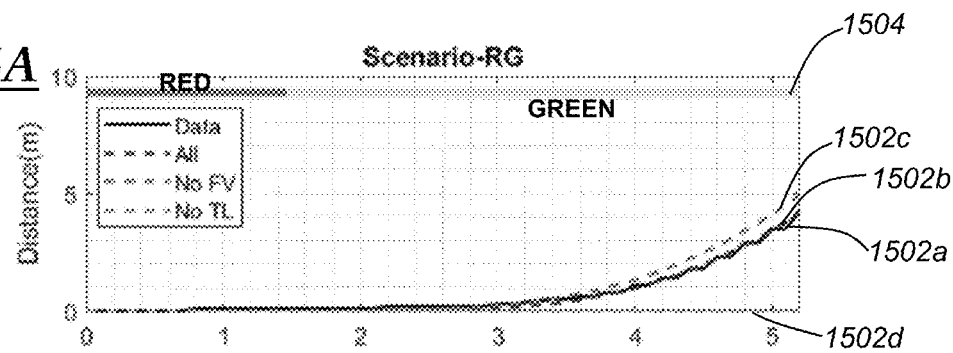
FIGS. 15A-15B depict predicted and actual trajectories of various models for a RG scenario according to one sample.
Figure 15B:
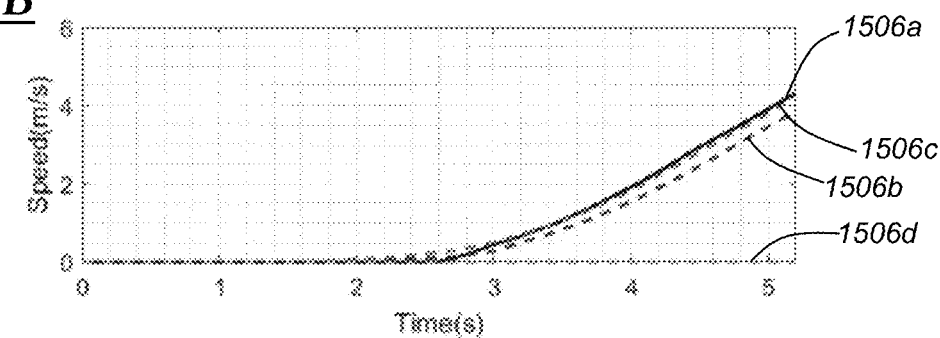

FIGS. 15A-18B presents the trajectory predictions for four (4) examples (1 RG (FIGS. 15A-15B), 1 YR (FIGS. 16A-16B), 2 GYR scenarios (FIGS. 17A-18B)) sampled from our dataset. The four trajectories that are depicted in each scenario represents ground-truth, three $X_{0:t}^{HV}$ each from $f_d$, $f_d^{NoFV}$, and $f_d^{NoTL}$. $f_d^{NoFV}$ does not use the front vehicle state $X_t^{FV}$ as input, and $f_d^{NoTL}$ does not use the traffic signal state $X_t^{TL}$ as input. The sample shown in FIGS. 15A-15B is similar to the motivational example in FIGS. 2A-2B. At t=0, the driver was stopped at a traffic light or signal in the red phase. It is reasonable to assume that a model without $X_{0:5s}^{TL}$ is likely to predict the vehicle to stay put or not move. The graph shown in FIG. 15A depicts predictions of the vehicle's position over time and the graph shown in FIG. 15B depicts predictions of the vehicle's longitudinal speed over time during a red-green (RG) scenario in which the traffic signal is in the red phase at the beginning of the prediction window and then changes to green (at time t=1.5 s in the scenario shown) as indicated by the bar 1504. This bar 1504 also represents the position of the traffic signal from the vehicle (about 9.5 m at time t=0 s in the scenario shown). The solid lines 1502a, 1506a show the actual position and speed, respectively, over time of the vehicle. The dashed lines 1502b, 1506b show the prediction of the vehicle position and speed, respectively, over time when using the context vector C having the inputs C:=[$X^{FV}$ $X^{TL}$, TOD]. The dashed line 1502c, 1506c shows the prediction of the vehicle position and speed, respectively, over time when using the context vector $C^{NoFV}$ and the dashed line 1502d, 1506d shows the prediction of the vehicle position and speed, respectively, over time when using the context vector $C^{NoTL}$. As expected, the prediction from $f_d^{NoTL}$ (indicated at 1502d, 1506d) failed to predict $X^{HV}$ accurately, whereas the other two models were able to produce predictions close to the ground-truth.

Figure 16A:
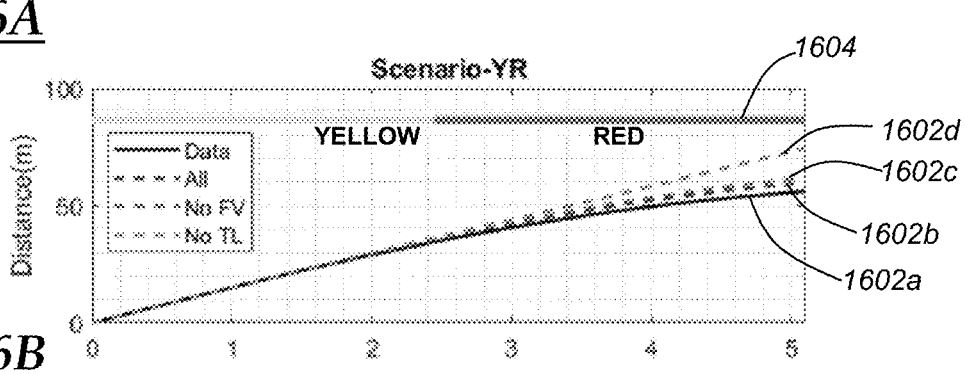
FIGS. 16A-16B depict predicted and actual trajectories of various models for a YR scenario according to one sample.
Figure 16B:
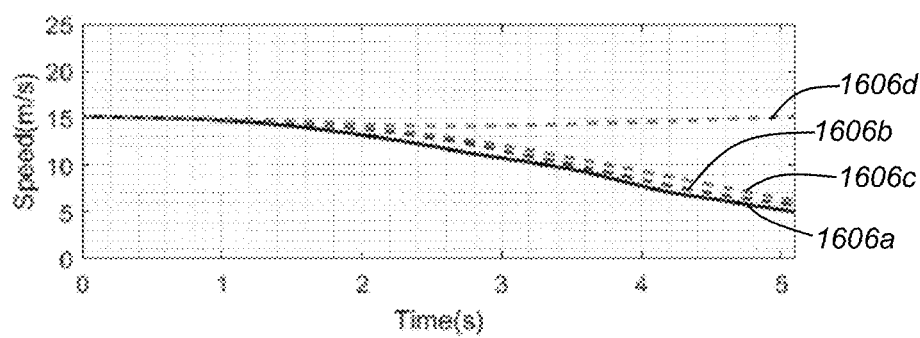

The plots of FIGS. 16A-16B are for a yellow-red (YR) scenario where the driver slowed down approaching the intersection. The graph shown in FIG. 16A depicts predictions of the vehicle's position over time and the graph shown in FIG. 16B depicts predictions of the vehicle's longitudinal speed over time during a YR scenario in which the traffic signal is in the yellow phase at the beginning of the prediction window and then changes to red (at about time t=2.5 s in the scenario shown) as indicated by the bar 1604. This bar 1604 also represents the position of the traffic signal from the vehicle (about 88 m at time t=0 s in the scenario shown). The solid lines 1602a, 1606a show the actual position and speed, respectively, over time of the vehicle. The dashed lines 1602b, 1606b show the prediction of the vehicle position and speed, respectively, over time when using the context vector C having the inputs C:=[$X^{FV}$ $X^{TL}$, TOD]. The dashed line 1602c, 1606c shows the prediction of the vehicle position and speed, respectively, over time when using the context vector $C^{NoFV}$, and the dashed line 1602d, 1606d shows the prediction of the vehicle position and speed, respectively, over time when using the context vector $C^{NoTL}$. Given $P_0$=Y (the initial phase is yellow) and that the vehicle was cruising ($v_0$=15), $f_d^{NoTL}$ predicts that the vehicle will maintain this speed, causing the prediction errors to grow over time. The other two models $f_d$, $f_d^{NoFV}$ which use $X_{0:5s}^{TL}$ took account for the phase shift at t=2.4 s, and accurately predict how the driver would react to the shift.

Figure 17A:
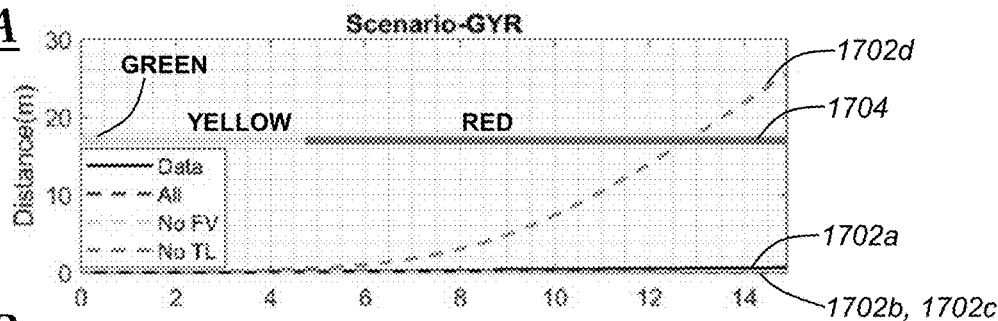
FIGS. 17A-17B depict predicted and actual trajectories of various models for a GYR scenario according to one sample.
Figure 17B:
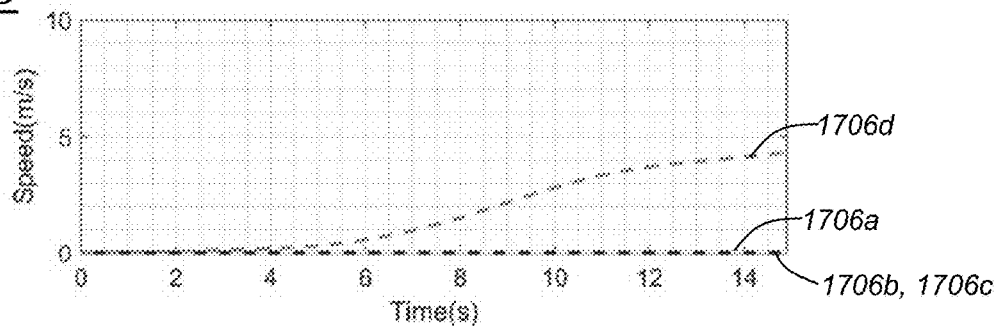

On the other hand, FIGS. 17A-18B describe scenarios that are long (about 15 s), and span a full cycle of phases or a green-yellow-red (GYR) scenario. The first example shown in FIGS. 17A-17B describes a scenario where the vehicle was initially at stop due to a queue formed at the entrance of the intersection. The graph shown in FIG. 17A depicts predictions of the vehicle's position over time and the graph shown in FIG. 17B depicts predictions of the vehicle's longitudinal speed over time during a GYR scenario in which the traffic signal is in the green phase at the beginning of the prediction window, then changes to yellow (at about time t=0.5 s in the scenario shown), and then changes to red (at about time t=4.9 s in the scenario shown), as indicated by the bar 1704. This bar 1704 also represents the position of the traffic signal from the vehicle (about 135 m at time t=0 s in the scenario shown). The solid lines 1702a, 1706a show the actual position and speed, respectively, over time of the vehicle. The dashed lines 1702b, 1706b show the prediction of the vehicle position and speed, respectively, over time when using the context vector C having the inputs C:=[$X^{FV}$ $X^{TL}$, TOD]. The dashed line 1702c, 1706c shows the prediction of the vehicle position and speed, respectively, over time when using the context vector $C^{NoFV}$, and the dashed line 1702d, 1706d shows the prediction of the vehicle position and speed, respectively, over time when using the context vector $C^{NoTL}$. Given the green phase observed at t=0, $f_d^{NoTL}$ (indicated at 1702*d*, 1706*d*) predicted that the queue will be dissipated soon and the vehicle will start to move in the future. However, what really happened was that the phase shifted to red shortly, made the vehicle stay put (ground-truth). Note, the two models which utilized $X_{0:15s}^{TL}$ were able to accurately predict the trajectory over the 15 second prediction horizon.

Figure 18A:
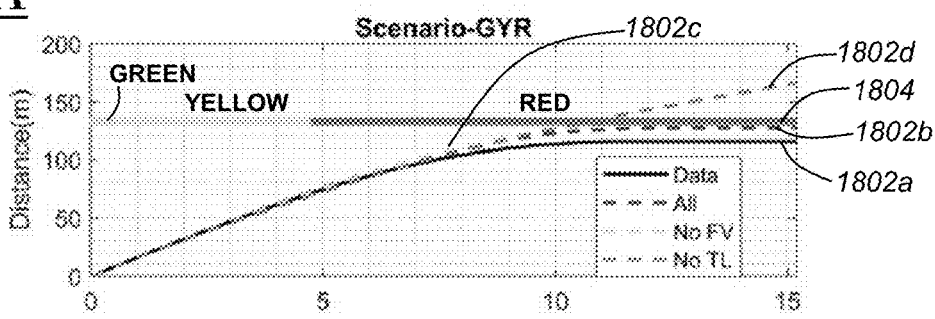
FIGS. 18A-18B depict predicted and actual trajectories of various models for another GYR scenario according to one sample.
Figure 18B:
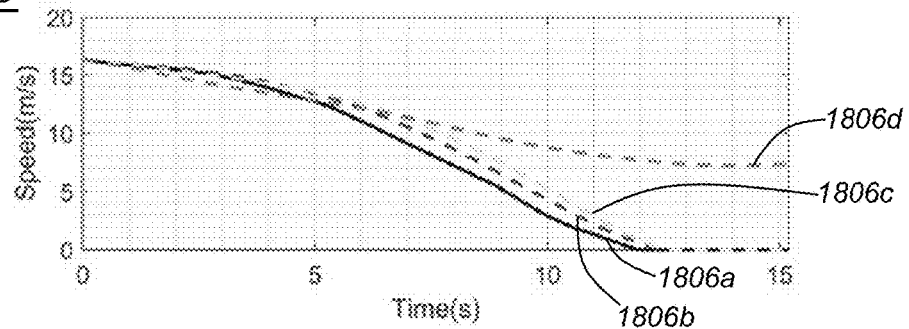

The second example shown in FIGS. 18A-18B is for another GYR scenario, but with the vehicle initially approaching the intersection at $v_0$=16 (m/s). The model $f_d^{NoTL}$ predicted that the vehicle will cross the intersection, given $P_{t=0}$=G (the initial phase is green). In reality, the vehicle made a stop before the intersection. Again, $f_d$, $f_d^{NoFV}$ accommodated the future phases and timings of TL, successfully predicted that the vehicle would make a stop before the intersection. The graph shown in FIG. 18A depicts predictions of the vehicle's position over time and the graph shown in FIG. 18B depicts predictions of the vehicle's longitudinal speed over time during a GYR scenario in which the traffic signal is in the green phase at the beginning of the prediction window, then changes to yellow (at about time t=0.5 s in the scenario shown), and then changes to red (at about time t=4.9 s in the scenario shown), as indicated by the bar 1804. This bar 1804 also represents the position of the traffic signal from the vehicle (about 135 m at time t=0 s in the scenario shown). The solid lines 1802*a*, 1806*a* show the actual position and speed, respectively, over time of the vehicle. The dashed lines 1802*b*, 1806*b* show the prediction of the vehicle position and speed, respectively, over time when using the context vector C having the inputs C:=[$X^{FV}$ $X^{TL}$, TOD]. The dashed line 1802*c*, 1806*c* shows the prediction of the vehicle position and speed, respectively, over time when using the context vector $C^{NoFV}$, and the dashed line 1802*d*, 1806*d* shows the prediction of the vehicle position and speed, respectively, over time when using the context vector $C^{NoTL}$. As demonstrated, the impact of $X^{TL}$ is significant: uncertainties in $X^{TL}$ can cause high prediction errors, especially in long-term predictions. The results suggest that the existing predicting methods can perform poor without the knowledge of future $X^{TL}$, highlighting why the problem is critical and needs to be solved. The proposed models can be used to solve this problem; that is, the models which utilize future $X^{TL}$ are able to predict reactions of human drivers to traffic signals or lights (TLs) in diverse scenarios and greatly improve the accuracy of the predictions.

Figure 19:
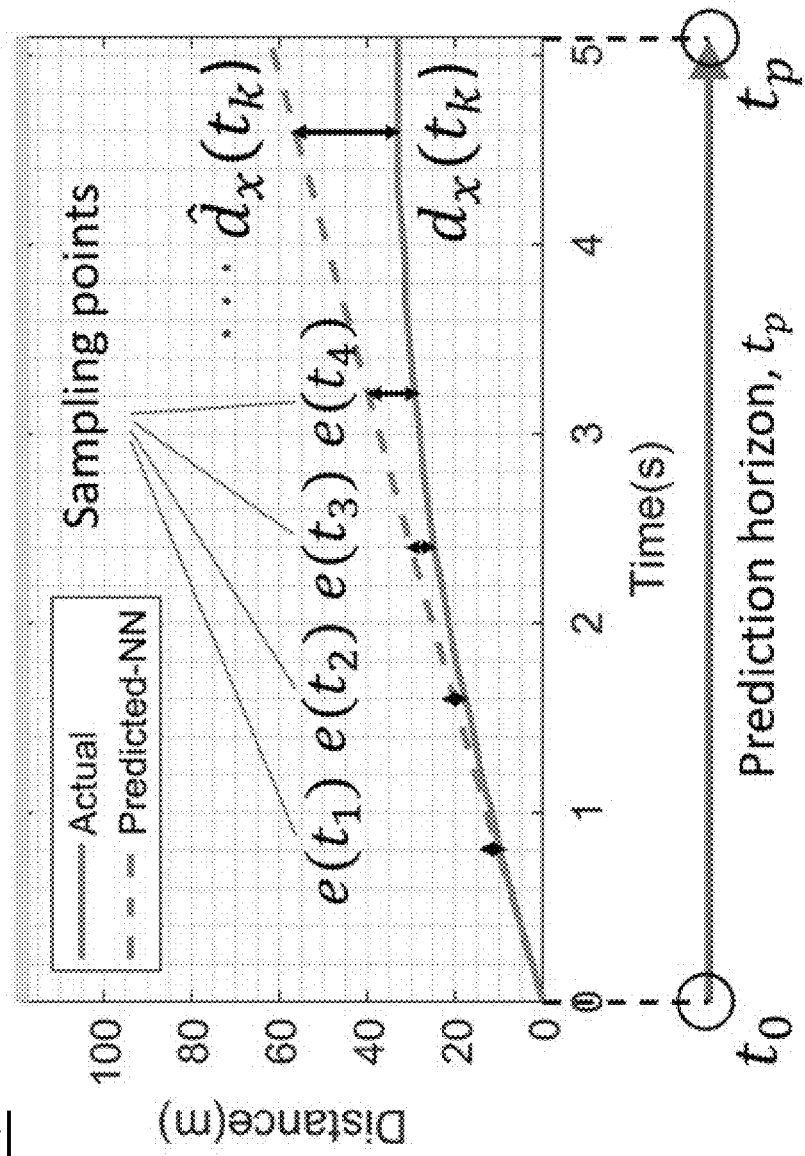
FIG. 19 depicts a graph illustrating calculation of three performance metrics used to measure performance of the AI vehicle trajectory prediction model or application.
Figure 20:
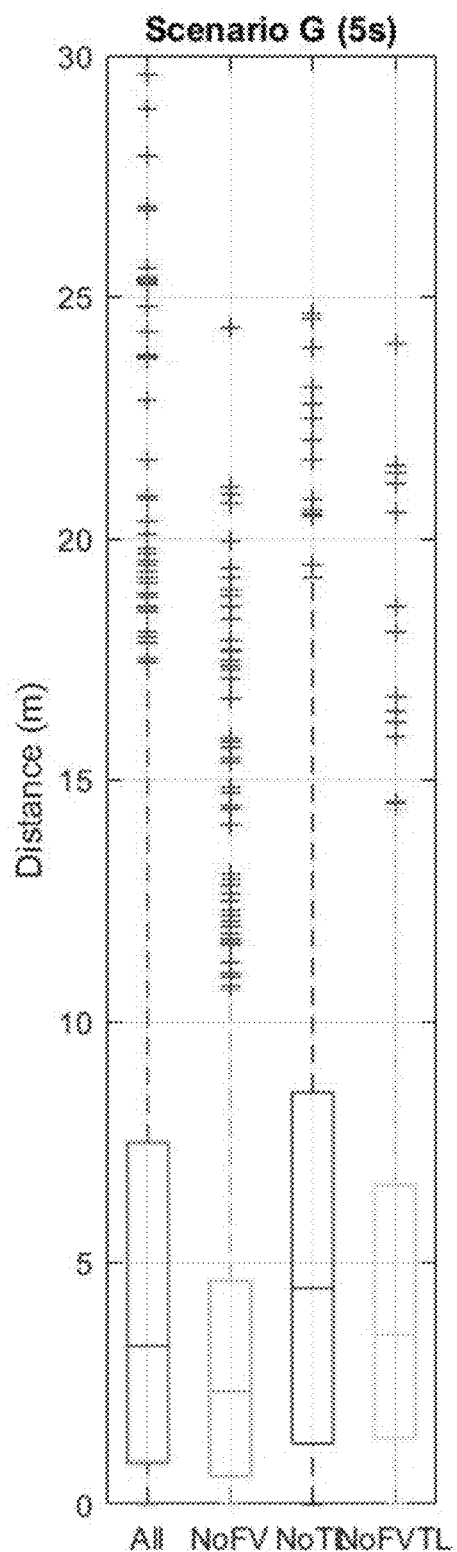
FIGS. 20-25 represent results from an ablation study that is used to compare the prediction errors of various models used for six scenarios (G, R, GY, YR, RG, GYR)
Figure 21:
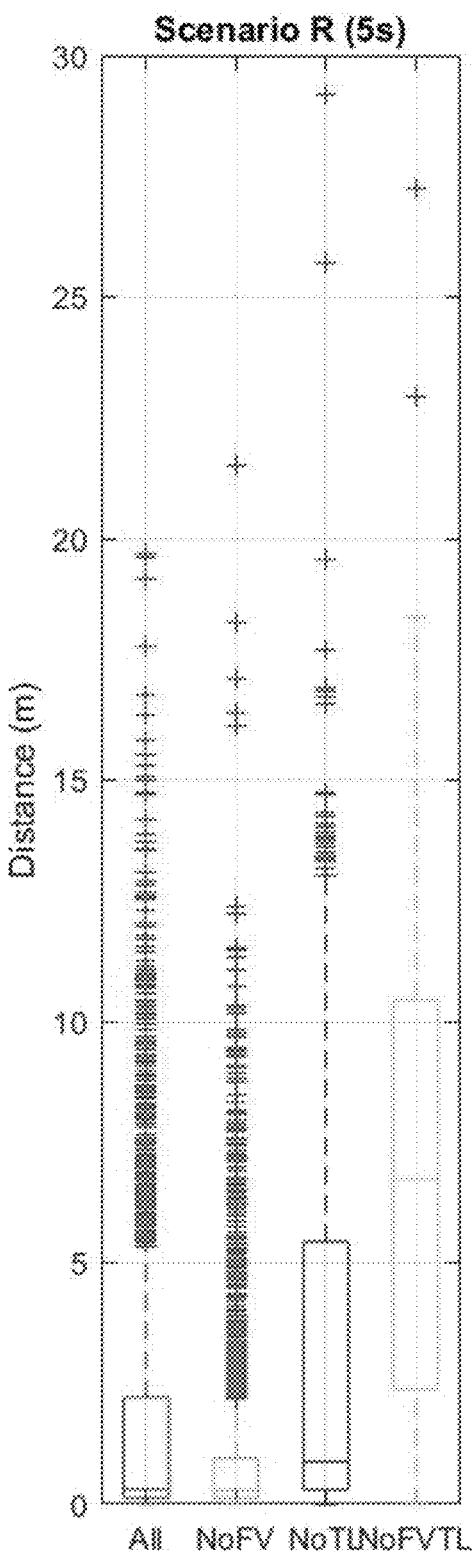
Figure 22:
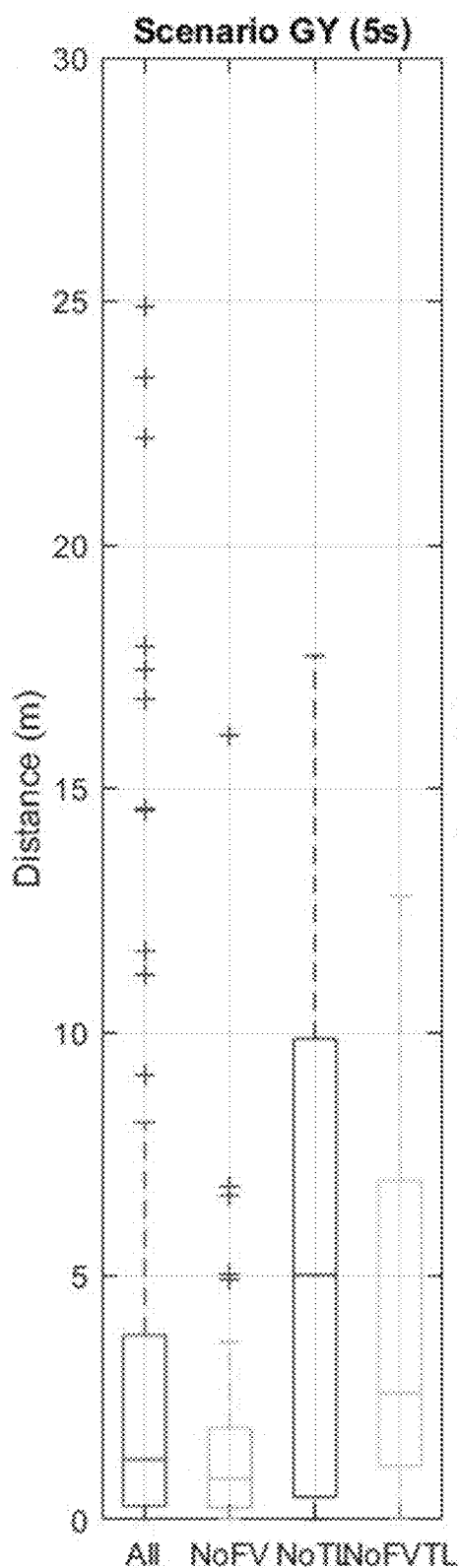
Figure 23:
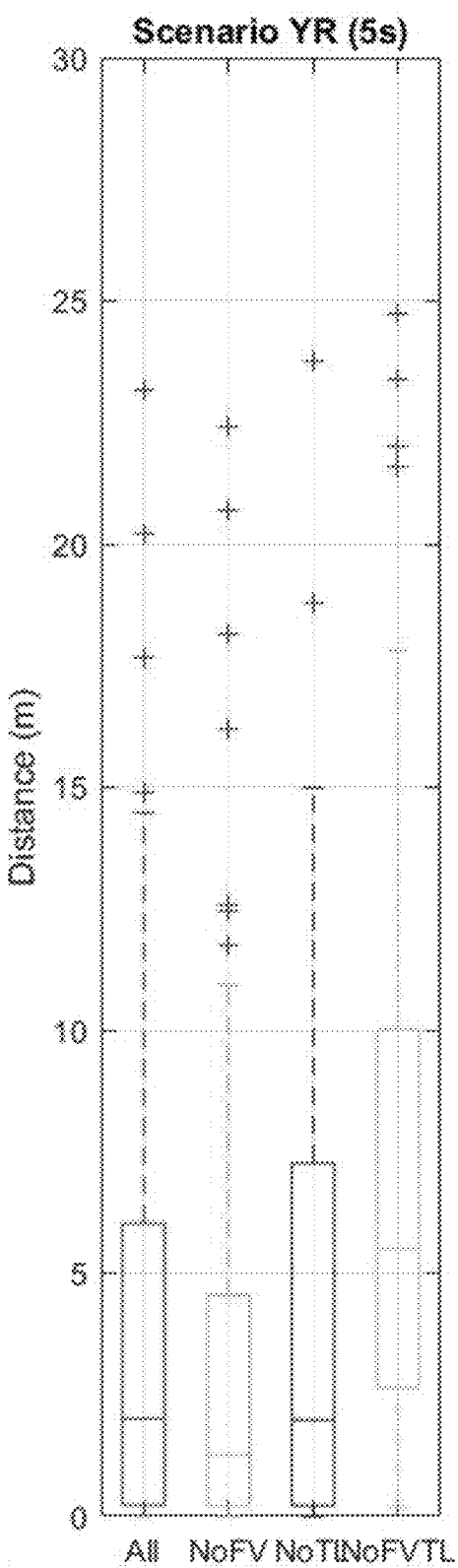
Figure 24:
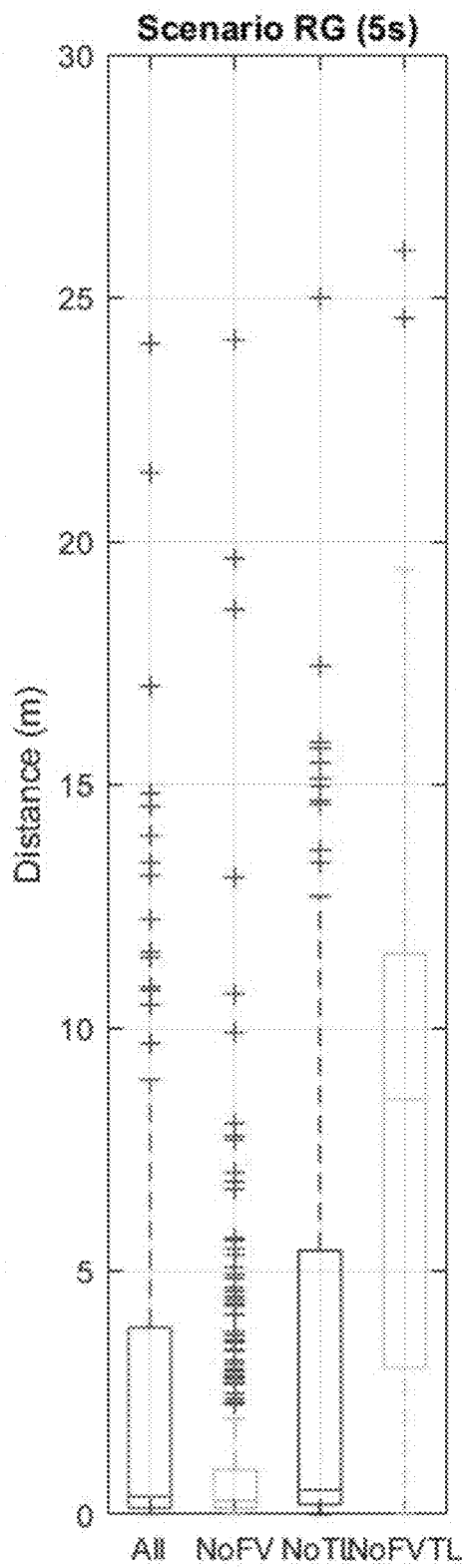
Figure 25:
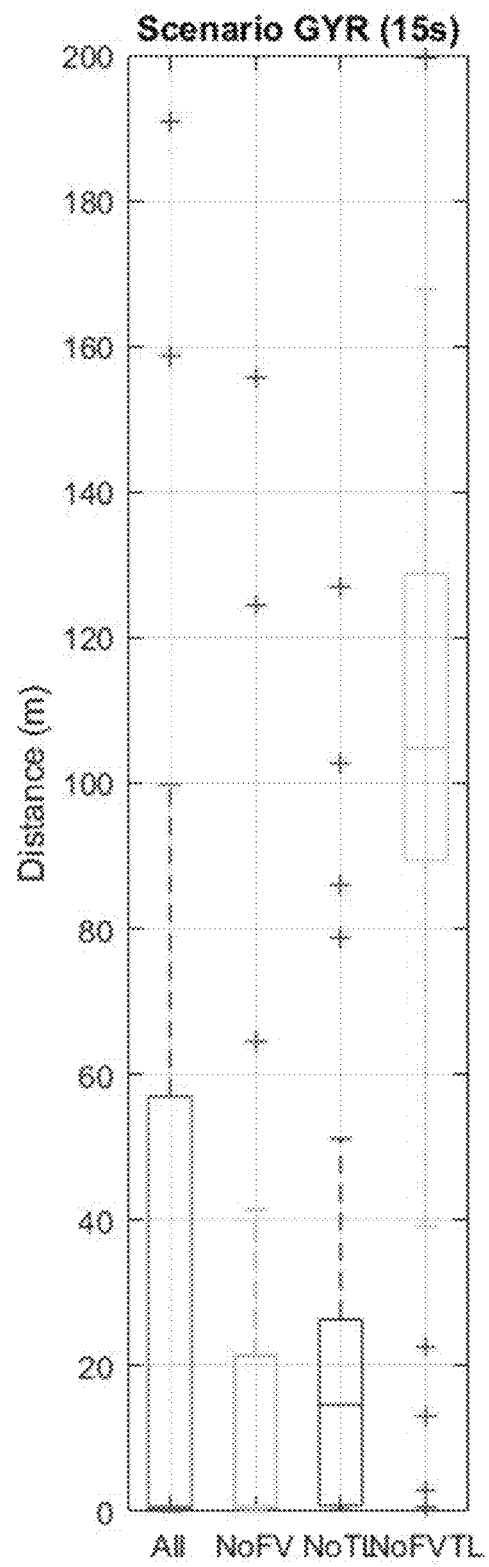

Section B. In order to make fair performance comparisons, the following three evaluation metrics were used: mean absolute error (MAE), time weighted absolute error (TWAE), and absolute deviation at the end of the prediction window (ADN) defined in Equations 8, 9, and 10, where $\hat{X}_k^{HV}$, $X_k^{HV}$ each represents the predicted and the actual state at the k-th step. For the graphical description, refer to FIG. 19.

$$MAE := \frac{\sum_{k=1}^{N}|\hat{X}_k^{HV} - X_k^{HV}|}{N} \qquad \text{(Equation 8)}$$

$$TWAE := \frac{\sum_{k=1}^{N}(t_k|\hat{X}_k^{HV} - X_k^{HV}|)}{\sum_{k=1}^{N} t_k} \qquad \text{(Equation 9)}$$

$$ADN := |\hat{X}_N^{HV} - X_N^{HV}| \qquad \text{(Equation 10)}$$

$\forall k$: $\Delta t_k$=0.2 s, $\tau$=2 s was used (history). For a scenario with a prediction window T=5 s (or $t_N$=5 s), the last index N is 25.

Section C. The goal of the ablation study is to investigate the impact of $X^{TL}$ in the trajectory prediction problem and evaluate the proposed models quantitatively. The resulting box plots for the statistics on the performance of the deterministic (or most-probable) trajectory predictions for 6 scenarios (G, R, GY, YR, RG, GYR) are shown in FIGS. 20-25.

In FIGS. 20-25, there is shown evaluations on ADN for the four models ($f_d$, $f_d^{NoFV}$, $f_d^{NoTL}$, $f_d^{NoFVTL}$, which correspond to "All", "NoFV", "NoTL", "NoFVTL", respectively) on the test set. The sample size for the scenarios are 688 for scenario G (FIG. 20), 1909 for scenario R (FIG. 21), 68 for scenario GY (FIG. 22), 81 for scenario YR (FIG. 23), 362 for scenario RG (FIG. 24), and 32 for scenario GYR (FIG. 25), totaling 3,111 sample episodes. Note, the scenario Y is not depicted due to the inconsistent and short prediction horizon. During testing, it was observed that the phase Y usually lasts anywhere between 2.5 s to 4 s. The first 2 s are used as inputs, which means the prediction horizon for the scenario Y is only 0.5 s to 2 s. Second, we present the results on the performance evaluation of the four models on MAE, TWAE, and ADN on the same test set. Tables I and II (FIGS. 26-27) each serves the result for position and velocity errors.

ADN has the largest error among the three metrics (the magnitude of error: MAE<TWAE<ADN). FIGS. 20-25 each depicts a box plot for ADN. In a box plot, the top and bottom edges of the box represents the $1^{st}$, $3^{rd}$ quartiles, and the median is represented by the horizontal line in the middle of the band. The ends of the whisker extend to data that is outside typical values but that are not considered outliers (referred to as "extreme points"). The outliers are indicated by '+'.

As shown in FIGS. 20-25, across all scenarios, the two models $f_d$, $f_d^{NoFV}$ which utilizes $X^{TL}$ outperform the other two models $f_d^{NoTL}$, $f_d^{NoFVTL}$, which don't take advantage of the future phases and timings information. Interestingly, the winner in the exemplary scenarios is not $f_d$, but it is $f_d^{NoFV}$, which performs the best on all characteristics of boxplot including the $1^{st}$, $3^{rd}$ quartiles, the median, and the upper limit of the extreme points. Our interpretation is that the exclusion of $X^{FV}$ increases the prediction accuracy, due to the uncertainty in $X_{t>0}^{FV}$.

The numbers presented in Tables II and III (FIGS. 26-27) agree with (or corroborate) the results from FIGS. 20-25 across all scenarios. At least in the exemplary scenario, $f_d^{NoFV}$ is the winner for almost all metrics, or at least on par with $f_d$. In summary, the knowledge of future states of traffic lights significantly increase the accuracy of trajectory predictions, as evidenced in the ablation studies: trajectory predictions with the winner model have roughly 2-6 times smaller (position) MAE, TWAE, AND for T=5 s scenarios (G, R, GY, YR, RG), and roughly 9-21 times smaller MAE, TWAE, AND for T=15 s scenario (GYR), compared to trajectory predictions via $f_d^{NoTL}$.

Section D. The outliers observed in FIGS. 20-25 occur mostly because of edge cases and competing policies. Examples of the edge cases include a driver approaching the intersection in $P_{\forall t}$=R with a high speed and executing a sudden break right before the entrance of the intersection rather than gradually slowing down it approaches the intersection. Another example is that a driver in the middle of the road in $P_{\forall t}$=G moving much slower than the average speed of the traffic for unknown reasons. The outliers occur from competing policies are exemplified by the yellow light dilemma scenario where a driver can either cross the intersection or stop before the intersection.

Figure 28:
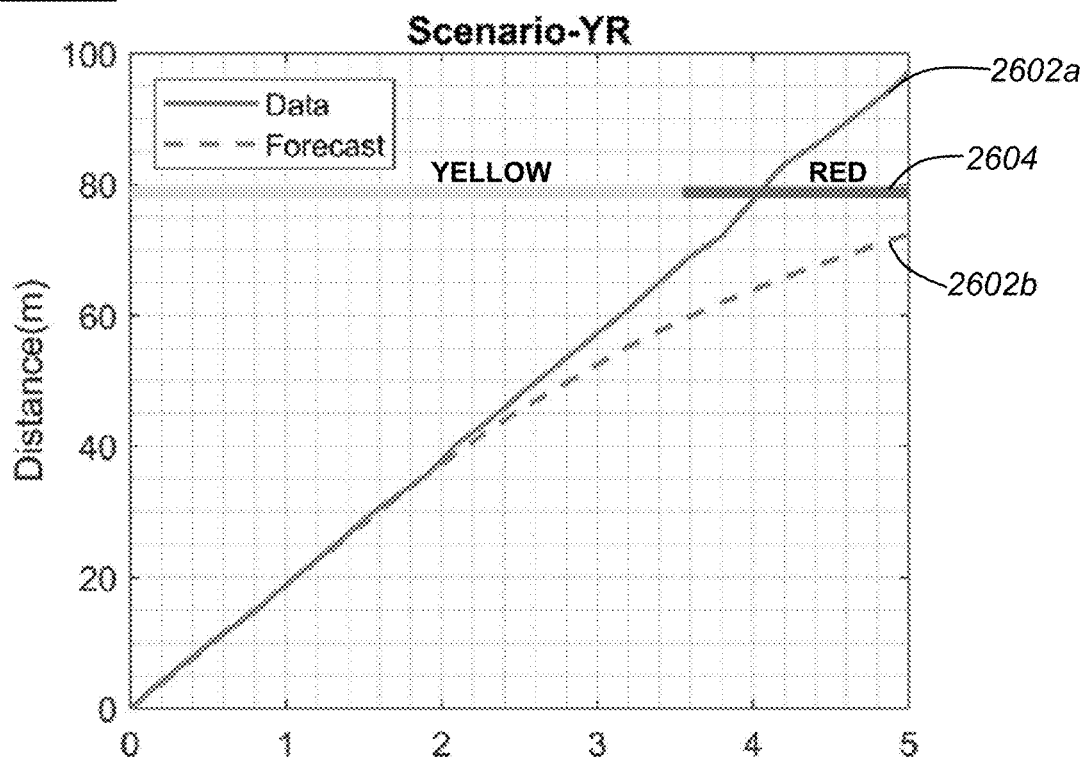
FIGS. 28-29 depict a sample trip observed that represents the yellow light dilemma scenario in which the traffic signal changes from yellow to red.
Figure 29:
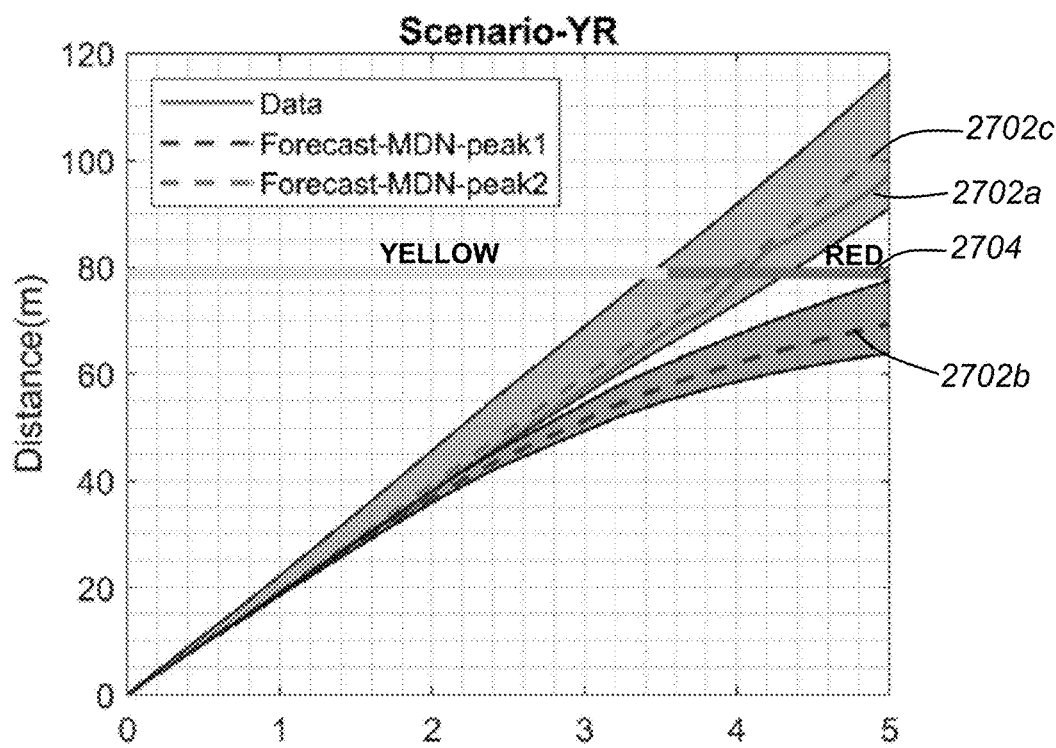

FIGS. 28-29 describe a sample trip observed in our dataset that represents the yellow light dilemma scenario in which the traffic signal (indicated at 2602 and 2702 in FIGS. 28 and 29, respectively) changes from yellow to red (at about time t=3.5 s). In FIG. 28, the traffic signal is at position 80 m as indicated at 2604. As shown in FIG. 28, the most-probable trajectory prediction obtained using $f_d^{NoFV}$ (indicated at 2602b) predicts that the vehicle would make a stop before the intersection; however, the driver actually crossed the intersection even after the phase shifted to red (as indicated at 2602a). This is an example where the proposed probabilistic human policy models come in handy. As shown in FIG. 29, the prediction made by a probabilistic model includes a first MDN peak (indicated at 2702b) in which the vehicle is predicted to stop at the traffic signal and a second MDN peak (indicated at 2702c) in which the vehicle is predicted to proceed through the traffic signal. The actual position is represented at 2702a. The traffic signal is at position 80 m as indicated at 2704.

The probabilistic models are capable of reproducing a multi-modal distributions, thus capture the other competing policy (cross). The probabilistic predictions are not only capable of capturing competing policies, but also able to reason the uncertainties of the predictions and provide contexts on the predictions as the probabilities of the predictions can be estimated. However, in at least some scenarios, the deterministic models are still useful: the solutions (at least according to some embodiments) are simple, cost-efficient, and easy to interpret. They can serve as nominal trajectories of human drivers in situations that can be approximated uni-modal or described with a normal distribution. The nominal trajectories can be used in a trajectory planning algorithm which does not allow uncertainties in surrounding environments. For the scenarios with 5 s prediction horizon, the time to compute a most-probable trajectory prediction is less than 10 msecs on a single-core personal laptop with i7-6500U 2.50 GHz CPU, and 8 GB RAM without a parallelization. However, it takes several seconds (5-10 s for 1,000 rollout trajectories) to construct the pdf for the probabilistic predictions on the same machine due. One can significantly reduce the time via parallel computing (GPU).

One of the remaining challenges for autonomous driving is how to accurately predict trajectories of vehicles near traffic lights in various states of traffic lights. The trajectory prediction problem where the existing methods perform poor was described above. This problem addressed this gap in conventional systems by proposing an approach where the future states of traffic lights are leveraged. Specifically, both a deterministic and probabilistic human policy model were proposed, each of which simulate how human drivers take actions in terms of accelerations depending on diverse driving scenarios near TLs. These models are trained on a real-world naturalistic driving dataset and are utilized to obtain longitudinal trajectory predictions based on the idea of utilizing the future traffic signal phase and timing information obtained from V2I communications. The human policy models are learned using a recurrent neural network, and a Gaussian-mixture based Mixture Density Network. It is shown that the utilization of future phases and timings of TLs can significantly improve the quality of the trajectory predictions through the ablation study. The ablation study, which was discussed above, also highlights that the proposed methods are comprehensive models that tackle the diverse scenario of the trajectory prediction problem described above. It is worth noting that, at least in some embodiments or implementations, the proposed models are not necessarily replacements for other state of the art trajectory prediction models, but rather the great addition to any method that concerns vehicle trajectory predictions near TLs.

The predicted trajectories then can be utilized for various applications in decision makings, trajectory planning, and controls of a host vehicle (either a self-driving car or a human-driven car) or another vehicle. The above models can be used as an extension of the work presented in G. Oh and H. Peng, "Eco-driving at signalized intersections: What is possible in the real-world?" in 2018 21st International Conference on Intelligent Transportation Systems (ITSC). IEEE, 2018, pp. 3674-3679; the energy-optimal planning algorithm presented in that paper can be improved by leveraging the trajectory prediction framework (discussed above) to model other vehicles in the scenes. In conclusion, the proposed human policy model helps one better understand and predict behaviors of human drivers in the vicinity of traffic lights, and can be leveraged to improve autonomous driving in urban city driving, including decision-making, planning, and control of host vehicles.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A method for determining a predicted trajectory of a human-driven host vehicle as the human-driven host vehicle approaches a traffic signal, wherein the method is carried out by one or more electronic controllers, and wherein the method comprises the steps of:
   obtaining a host vehicle-traffic light distance $d_x$ and a longitudinal host vehicle speed $v_x$ that are each taken when the human-driven host vehicle approaches the traffic signal;
   obtaining a traffic light signal phase $P_t$ and a traffic light signal timing $T_t$, wherein the traffic light signal phase $P_t$ represents a phase of the traffic signal taken when the human-driven host vehicle approaches the traffic signal, and wherein the traffic light signal timing $T_t$ represents an amount of time elapsed since a last phase change of the traffic signal taken when the human-driven host vehicle approaches the traffic signal;

obtaining a time of day TOD;

providing the host vehicle-traffic light distance $d_x$, the longitudinal host vehicle speed $v_x$, the traffic light signal phase $P_t$, the traffic light signal timing $T_t$, and the time of day TOD as input into an artificial intelligence (AI) vehicle trajectory prediction application, wherein the AI vehicle trajectory prediction application implements an AI vehicle trajectory prediction model; and determining the predicted trajectory of the human-driven host vehicle using the AI vehicle trajectory prediction application.

2. The method of claim 1, wherein the method further includes obtaining a front vehicle state $X^{FV}$, wherein the front vehicle state includes a front-host vehicle distance $r_t$ and a front-host vehicle speed $\dot{r}_t$, and wherein the providing step further includes providing the front vehicle state $X^{FV}$ as input into the AI vehicle trajectory prediction application.

3. The method of claim 2, wherein the front vehicle state $X^{FV}$ is obtained at the one or more electronic controllers based on front vehicle base information that is obtained at the front vehicle and then sent via vehicle-to-vehicle (V2V) communications to the one or more electronic controllers.

4. The method of claim 1, wherein the traffic light signal phase $P_t$ and the traffic light signal timing $T_t$ are obtained from a traffic light control system that is present at an intersection where the traffic light is located.

5. The method of claim 1, wherein the predicted trajectory is obtained at an autonomous vehicle that is approaching the traffic light and that is separate from the human-driven host vehicle.

6. The method of claim 5, wherein the method is carried out at the autonomous vehicle as the human-driven host vehicle approaches the traffic light.

7. The method of claim 6, wherein the autonomous vehicle obtains the traffic light signal phase $P_t$ and the traffic light signal timing $T_t$ from a traffic signal system located at an intersection where the traffic light is located.

8. The method of claim 7, wherein the autonomous vehicle receives the traffic light signal phase $P_t$ and the traffic light signal timing $T_t$ via vehicle-to-infrastructure (V2I) communications from roadside equipment that is a part of the traffic signal system.

9. The method of claim 6, wherein the autonomous vehicle receives the traffic light signal phase $P_t$ and the traffic light signal timing $T_t$ from a traffic signaling control system that is located remotely from the traffic light.

10. The method of claim 6, wherein the host vehicle-traffic light distance $d_x$, the longitudinal host vehicle speed $v_x$ are obtained at the autonomous vehicle via V2V communications with the host vehicle.

11. The method of claim 1, wherein the vehicle-traffic light distance $d_x$, the longitudinal host vehicle speed $v_x$, the traffic light signal phase $P_t$, and the traffic light signal timing $T_t$ are each associated with an associated time that is no more than a predetermined amount different than another one of the associated times.

12. The method of claim 1, wherein the AI vehicle trajectory prediction model is or includes a neural network.

13. The method of claim 12, wherein the AI vehicle trajectory prediction model is a deterministic or a model that predicts one or more most-probable trajectories.

14. The method of claim 12, wherein the AI vehicle trajectory prediction model is a probabilistic model that returns a probability distribution of predicted trajectories, and wherein the predicted trajectory is obtained by sampling a trajectory from the probability distribution of predicted trajectories.

15. The method of claim 14, wherein the neural network is a mixture density network.

16. The method of claim 12, wherein the neural network is a deep neural network.

17. The method of claim 1, wherein the method further includes the step of causing an autonomous vehicle to obtain the predicted trajectory of the human-driven vehicle, wherein the autonomous vehicle is configured to:

obtain the predicted trajectory of the human-driven vehicle, and carry out an autonomous vehicle operation based on the predicted trajectory of the human-driven vehicle.

18. A method for determining a predicted trajectory of a human-driven host vehicle as the human-driven host vehicle approaches a traffic signal, wherein the method is carried out by one or more electronic controllers, and wherein the method comprises the steps of:

obtaining a host vehicle-traffic light distance $d_x$ and a longitudinal host vehicle speed $v_x$ that are each taken when the human-driven host vehicle approaches the traffic signal, wherein the host vehicle-traffic light distance $d_x$ and the longitudinal host vehicle speed $v_x$ each have an associated time;

obtaining a front vehicle state $X^{FV}$, wherein the front vehicle state includes a front-host vehicle distance $r_t$ and a front-host vehicle speed $\dot{r}_t$;

receiving one or more wireless signals that indicate a traffic light signal phase $P_t$ and a traffic light signal timing $T_t$, wherein the traffic light signal phase $P_t$ represents a phase of the traffic signal taken when the human-driven host vehicle approaches the traffic signal, and wherein the traffic light signal timing $T_t$ represents an amount of time elapsed since a last phase change of the traffic signal taken when the human-driven host vehicle approaches the traffic signal, wherein the traffic light signal phase $P_t$ and the traffic light signal timing $T_t$ each have an associated time, wherein the associated times of the host vehicle-traffic light distance $d_x$, the longitudinal host vehicle speed $v_x$, the traffic light signal phase $P_t$, the traffic light signal timing $T_t$, the front vehicle state includes a front-host vehicle distance $r_t$, and the front-host vehicle speed $\dot{r}_t$ are within a maximum allowable time difference with respect to one another;

obtaining a time of day TOD;

providing the host vehicle-traffic light distance $d_x$, the longitudinal host vehicle speed $v_x$, the traffic light signal phase $P_t$, the traffic light signal timing $T_t$, the front vehicle state $X^{FV}$, and the time of day TOD as input into an artificial intelligence (AI) vehicle trajectory prediction application, wherein the AI vehicle trajectory prediction application implements an AI vehicle trajectory prediction model, and wherein the AI vehicle trajectory prediction model is or includes a neural network; and determining the predicted trajectory of the human-driven host vehicle using the AI vehicle trajectory prediction application.

19. The method of claim 18, wherein the host vehicle-traffic light distance $d_x$ and the longitudinal host vehicle speed $v_x$ are both obtained at an autonomous vehicle through receiving one or more wireless signals from the human-driven host vehicle via vehicle-to-vehicle (V2V) communications.

20. The method of claim 18, wherein the host vehicle-traffic light distance $d_x$ and the longitudinal host vehicle speed $v_x$ are both obtained at the autonomous vehicle through receiving one or more wireless signals from a remote server.

* * * * *